US011631146B2

(12) United States Patent
Hauser et al.

(10) Patent No.: US 11,631,146 B2
(45) Date of Patent: Apr. 18, 2023

(54) CUSTOMIZABLE COMMUNICATIONS PLATFORM

(71) Applicant: Geneva Technologies, Inc., Monument, CO (US)

(72) Inventors: Justin Hauser, New York, NY (US); Jordan Caron, New York, NY (US); David Lee, New York, NY (US); Daniel Cushing, Monument, CO (US); Samuel Liebeskind, Monument, CO (US); Matthew Handler, Monument, CO (US); Austin Yu, Monument, CO (US)

(73) Assignee: Geneva Technologies, Inc., New York, NY (US)

( * ) Notice: Subject to any disclaimer, the term of this patent is extended or adjusted under 35 U.S.C. 154(b) by 182 days.

(21) Appl. No.: 17/098,079

(22) Filed: Nov. 13, 2020

(65) Prior Publication Data

US 2021/0217106 A1    Jul. 15, 2021

Related U.S. Application Data

(60) Provisional application No. 62/936,173, filed on Nov. 15, 2019.

(51) Int. Cl.
| | |
|---|---|
| *G06F 15/16* | (2006.01) |
| *G06Q 50/00* | (2012.01) |
| *H04L 41/0893* | (2022.01) |
| *H04L 51/046* | (2022.01) |
| *H04L 61/45* | (2022.01) |

(52) U.S. Cl.
CPC ......... *G06Q 50/01* (2013.01); *H04L 41/0893* (2013.01); *H04L 51/046* (2013.01); *H04L 61/4555* (2022.05)

(58) Field of Classification Search
None
See application file for complete search history.

(56) References Cited

U.S. PATENT DOCUMENTS

| | | | |
|---|---|---|---|
| 7,668,939 B2 * | 2/2010 | Encarnacion | ...... H04N 21/6587 709/221 |
| 2002/0023230 A1 | 2/2002 | Bolnick et al. | |
| 2007/0156677 A1 * | 7/2007 | Szabo | ................. G06F 16/3323 707/999.005 |
| 2008/0208848 A1 | 8/2008 | Choi | |

(Continued)

OTHER PUBLICATIONS

PCT International Search Report and Written Opinion in International Appln. No. PCT/US2020/060562, dated Jan. 13, 2021, 11 pages.

(Continued)

*Primary Examiner* — Ruolei Zong
*Assistant Examiner* — Andrew Woo
(74) *Attorney, Agent, or Firm* — Fish & Richardson P.C.

(57) ABSTRACT

In an example method, a communications platform generates a plurality of logical structures. The communication platform receives, from a first user, first content to be shared within a first logical structure of the plurality of logical structures. The communications platform determines one or more second users associated with the first logical structure, and transmits contents of the first logical structure including the first content to the one or more second users.

38 Claims, 44 Drawing Sheets

(56) References Cited

U.S. PATENT DOCUMENTS

| | | | |
|---|---|---|---|
| 2009/0113468 | A1 | 4/2009 | Steelberg et al. |
| 2009/0248677 | A1 | 10/2009 | Grynberg |
| 2018/0246983 | A1* | 8/2018 | Rathod .............. G06F 16/9566 |

OTHER PUBLICATIONS

PCT International Preliminary Report on Patentability in International Appln. No. PCT/US2020/060562, dated May 27, 2022, 10 pages.
Get.slack.help, [online], "Getting started for new members," Available on or before Dec. 14, 2018, via Internet Archive: Wayback Machine URL<https://web.archive.org/web/20181214072824/https:/get.slack.help/hc/en-us/articles/218080037-Getting-started-for-new-members>, Retrieved on Feb. 2, 2021, URL<https://get.slack.help/hc/en-us/articles/218080037-Getting-started-for-new-members>, 5 pages.
Get.slack.help, [online], "Getting started for workspace creators," Available on or before May 23, 2019, via Internet Archive: Wayback Machine URL<https://web.archive.org/web/20190523192259/https://get.slack.help/hc/en-us/articles/217626298-Getting-started-for-workspace-creators>, Retrieved on Feb. 2, 2021, URL<https://get.slack.help/hc/en-us/articles/217626298-Geiting-started-for-workspace-creators>, 10 pages.
Get.slack.help, [online], "Roles and permissions in Slack," Available on or before Jun. 24, 2018, via Internet Archive: Wayback Machine URL<https://web.archive.org/web/20180624202133/https://get.slack.help/hc/en-us/articles/201314026-Roles-and-permissions-in-Slack>, Retrieved on Feb. 2, 2021, URL<https://get.slack.help/hc/en-us/articles/201314026-Roles-and-permissions-in-Slack>, 6 pages.
Get.slack.help, [online], "What is Slack?," Available on or before Jun. 18, 2019, via Internet Archive: Wayback Machine URL<https://web.archive.org/web/20190618152658/https://get.slack.help/hc/en-us/articles/115004071768-What-is-Slack->, Retrieved on Feb. 2, 2021, URL<https://get.slack.heip/hc/en-us/articles/115004071768-What-is-Slack->, 5 pages.
Tomsguide.com, [online], "Discord: Everything You Need to Know," Available on or before Jan. 9, 2019, via Internet Archive: Wayback Machine URL<https://web.archive.org/web/20190109232712/https:/www.tomsguide.com/us/what-is-discord,review-5203.html>, Retrieved on Feb. 2, 2021, URL<https://www.tomsguide.com/us/what-is-discord,review-5203.html>, 5 pages.

* cited by examiner

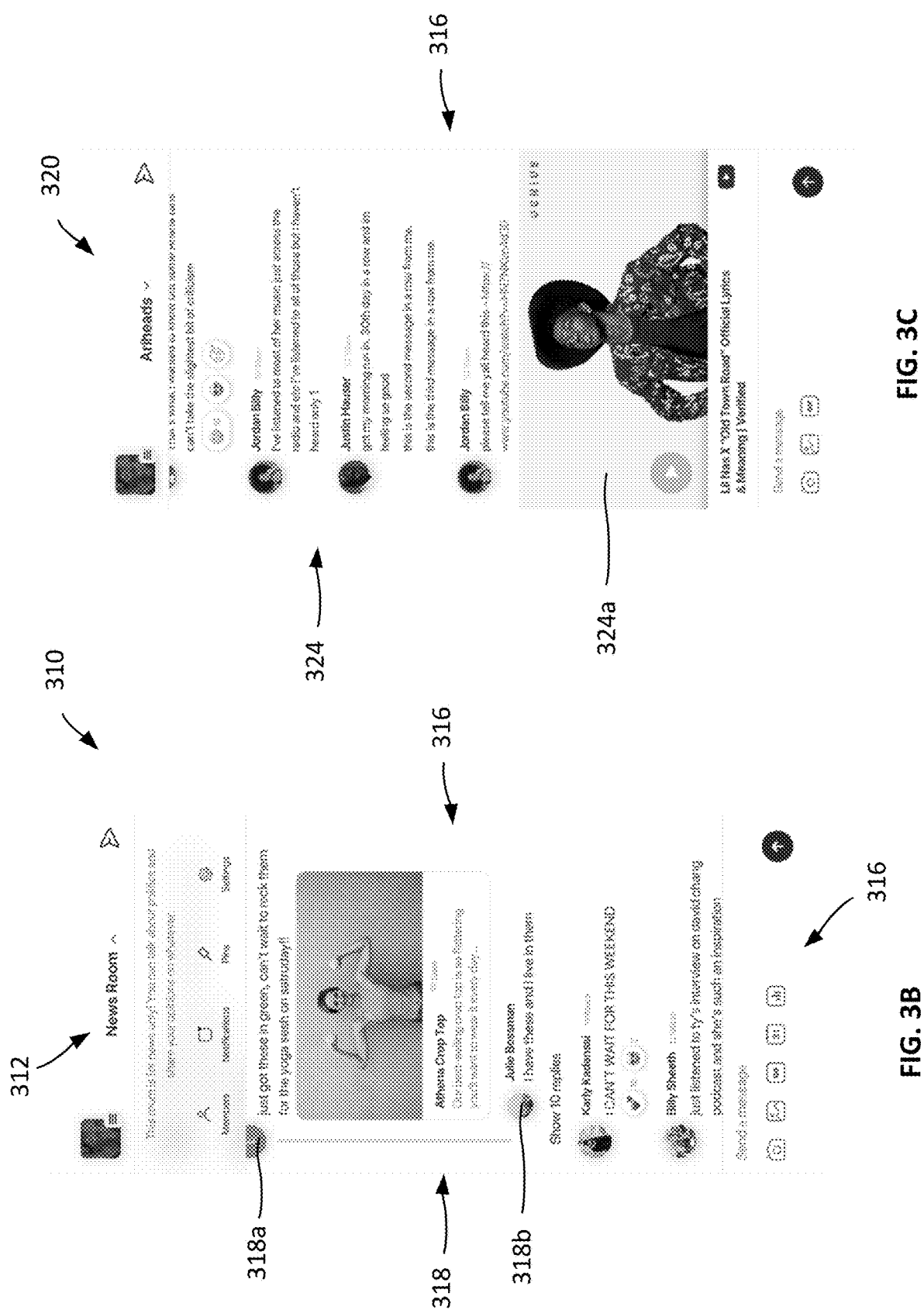

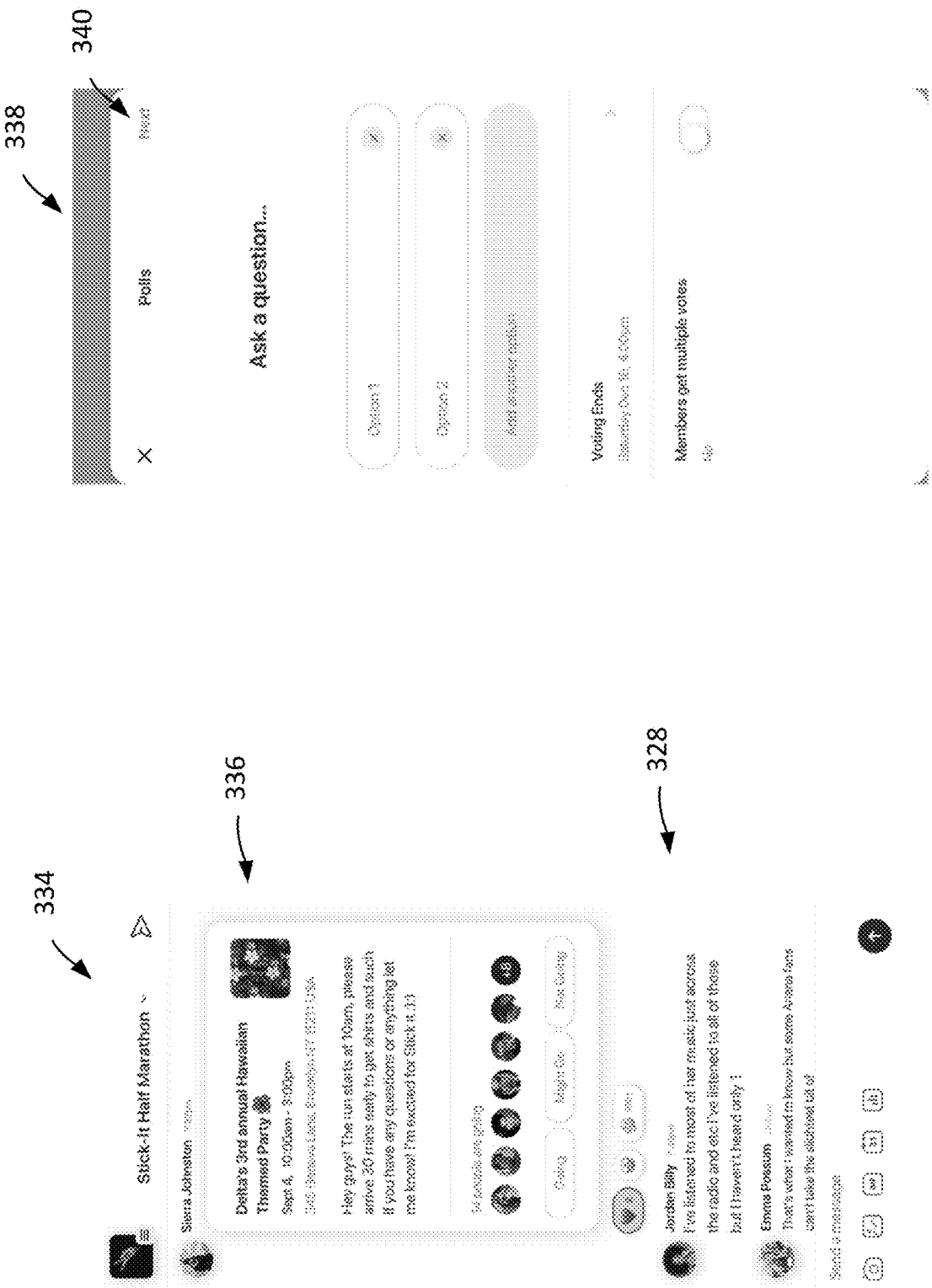

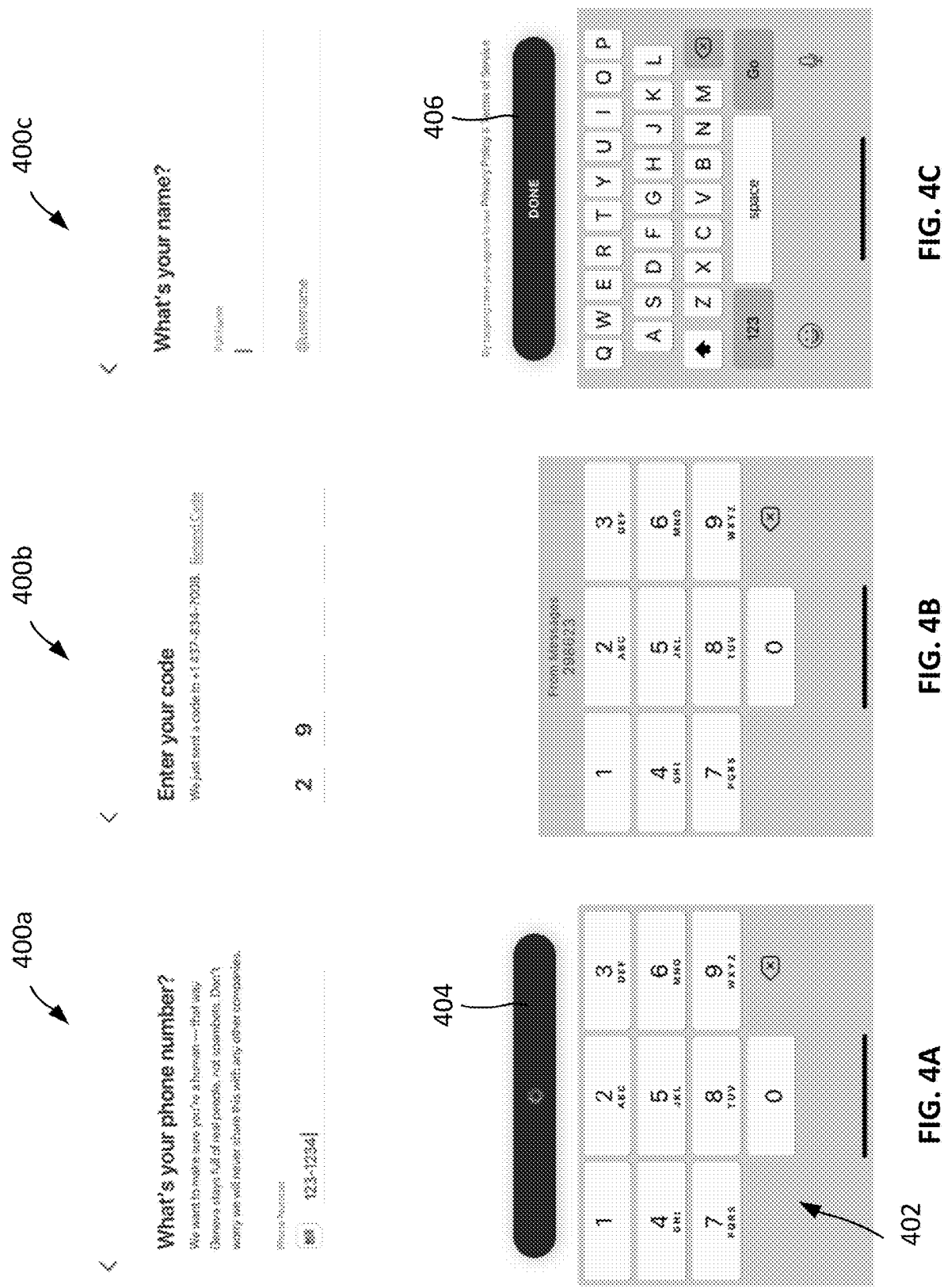

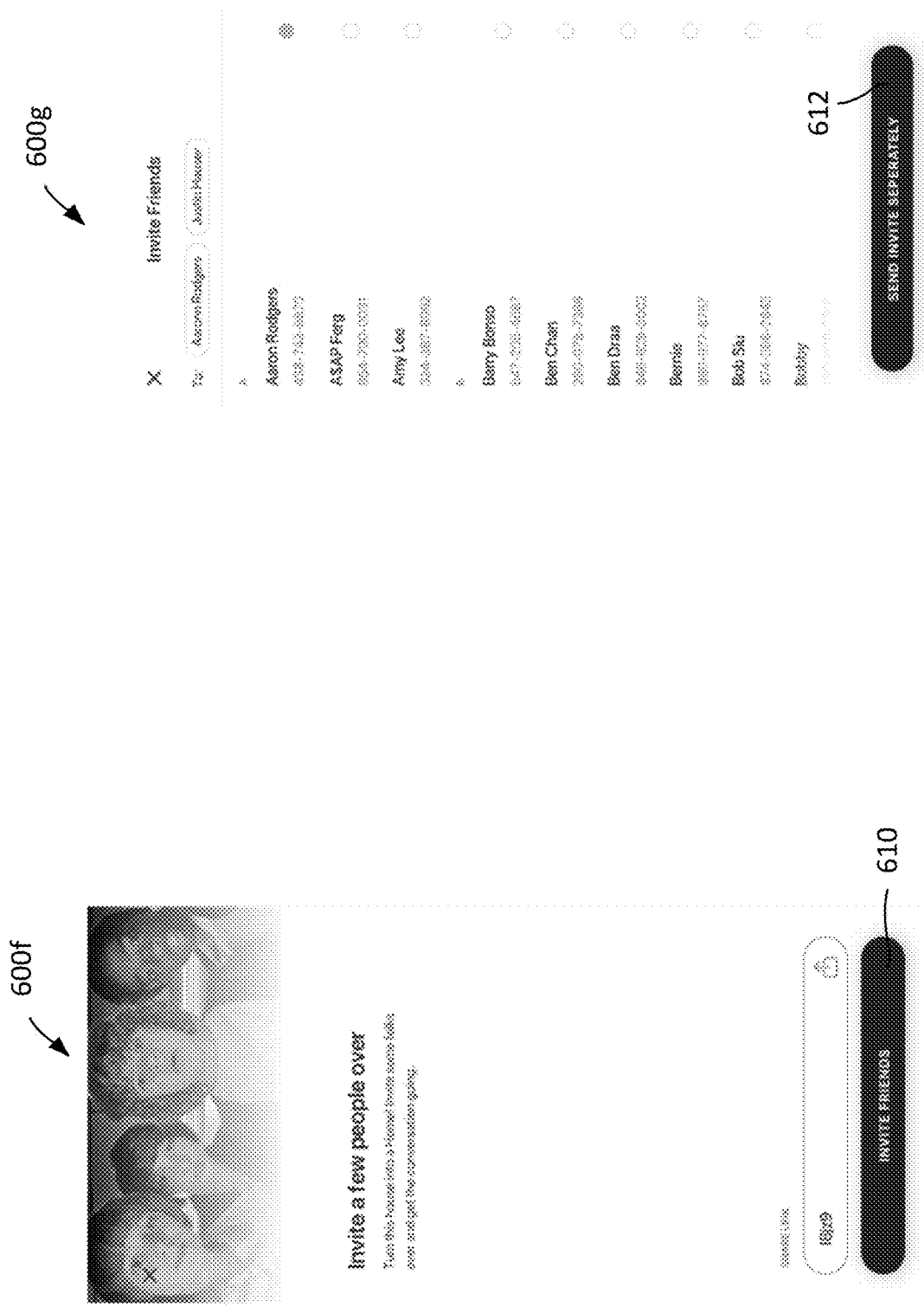

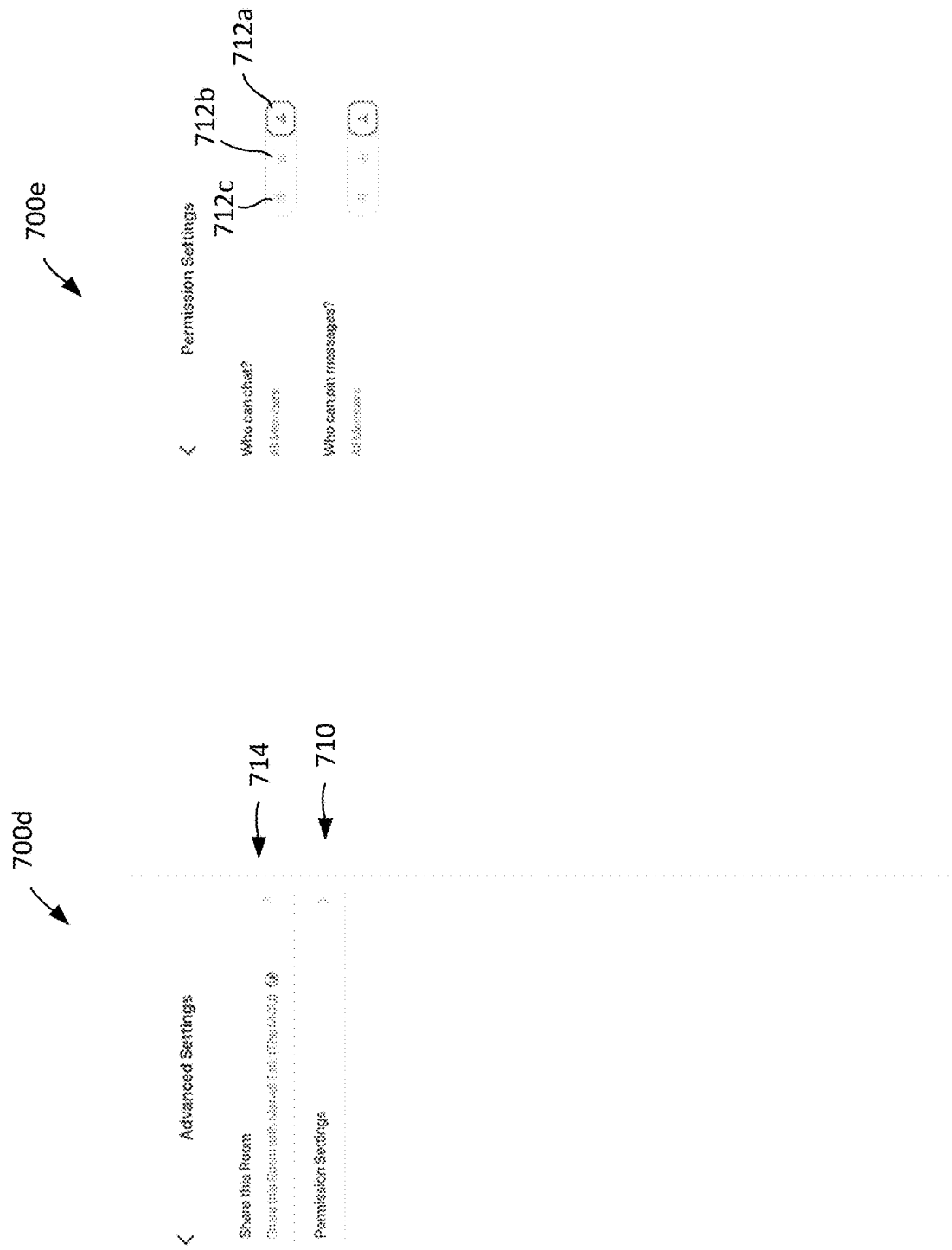

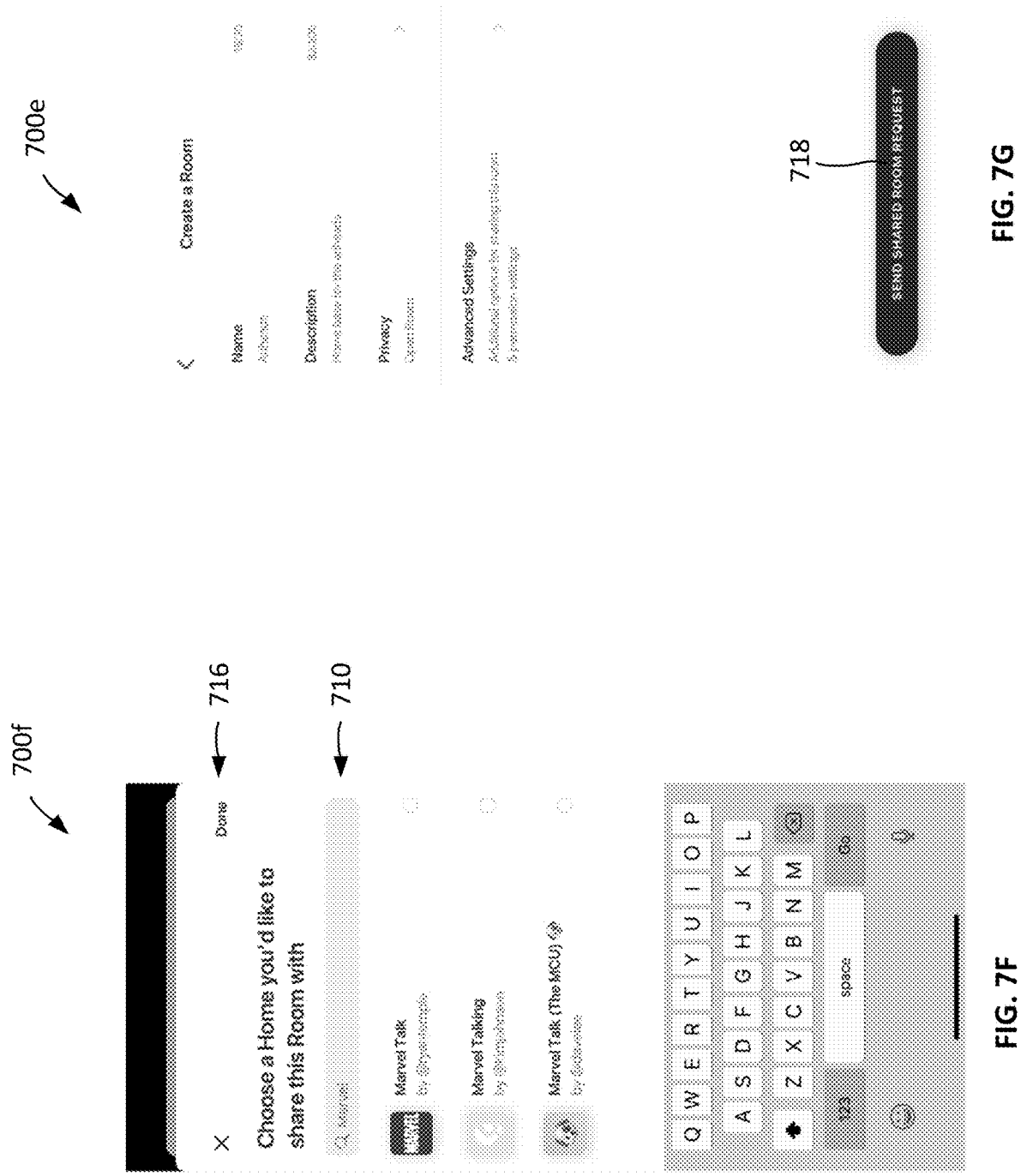

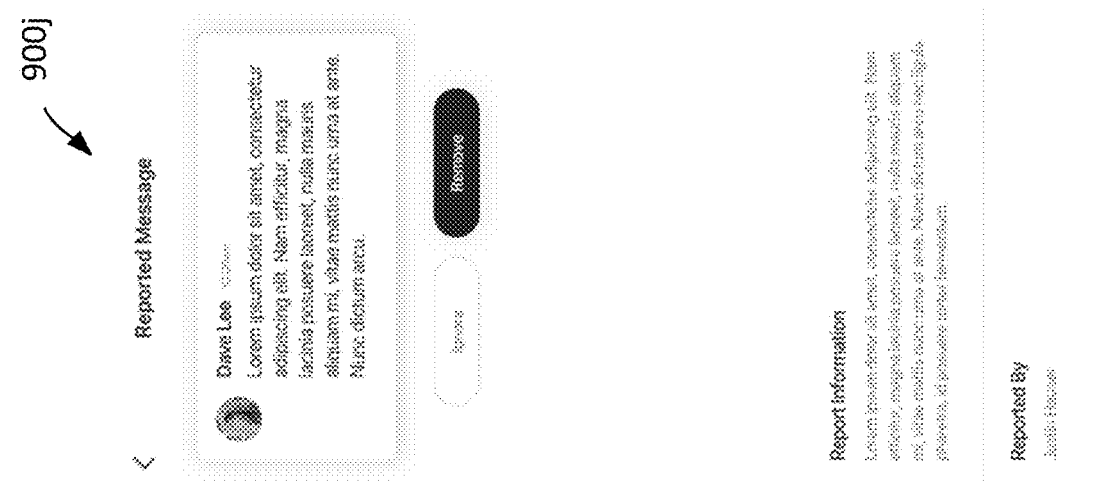
FIG. 9H  FIG. 9I  FIG. 9J

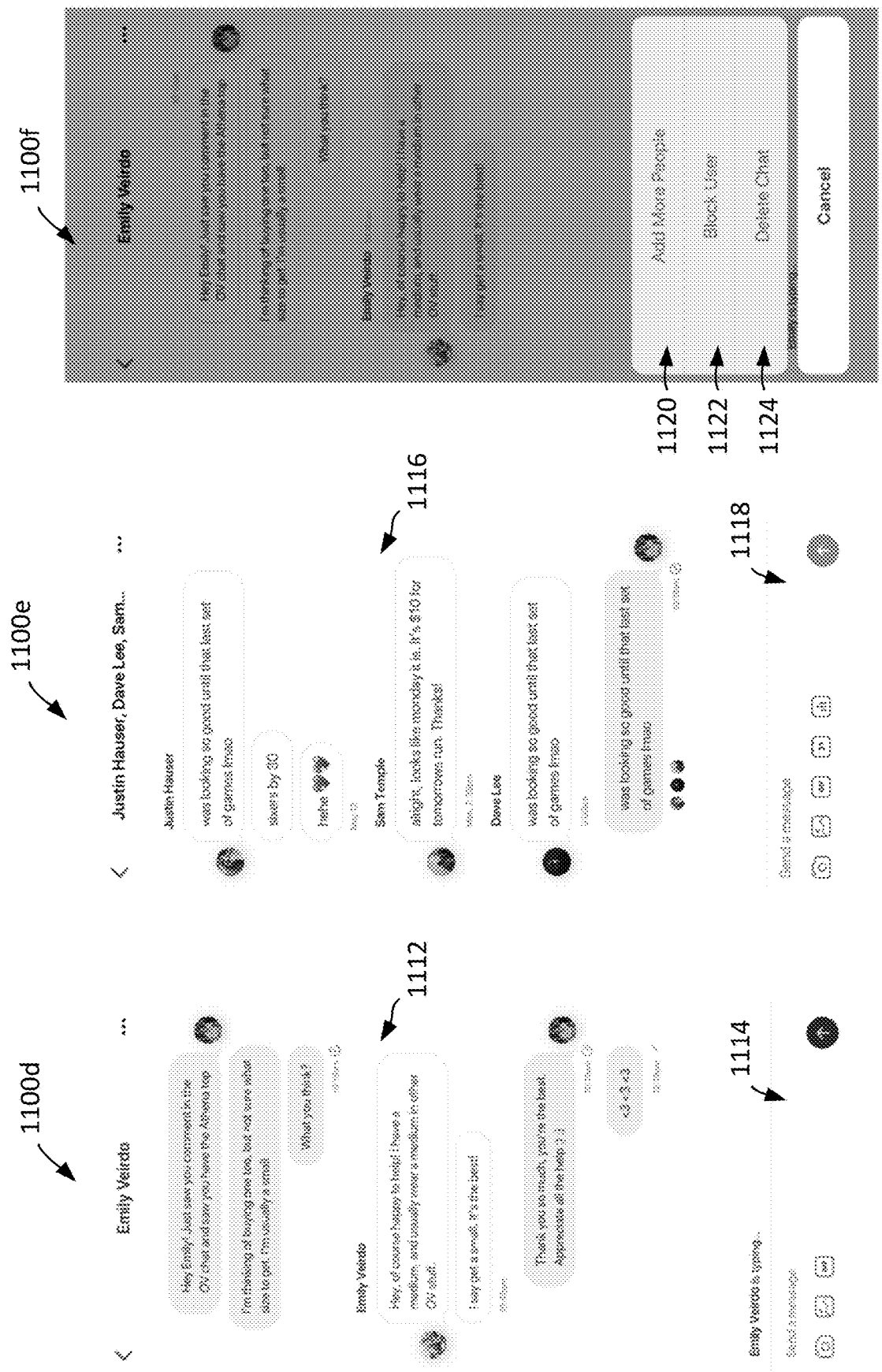

FIG. 12B

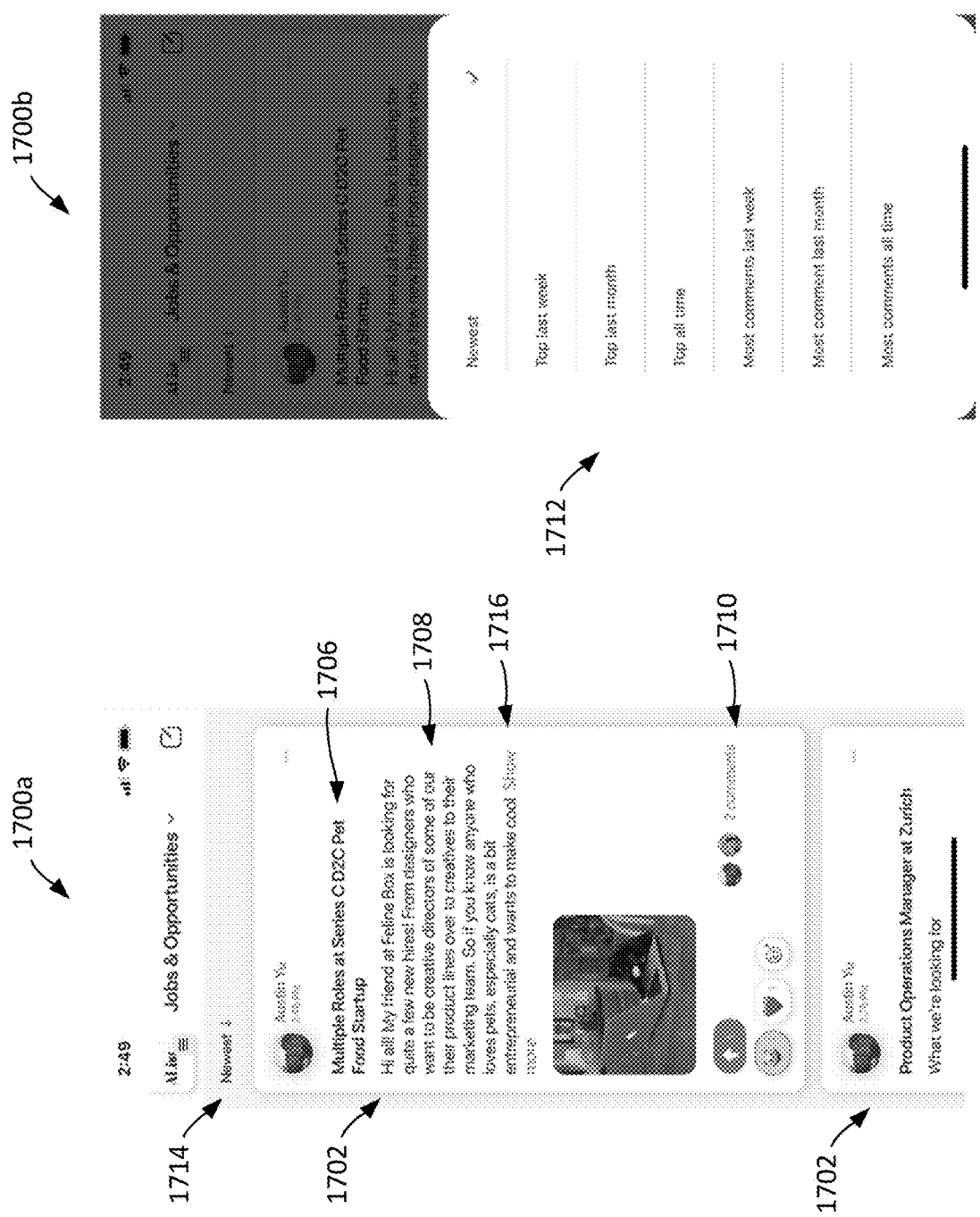

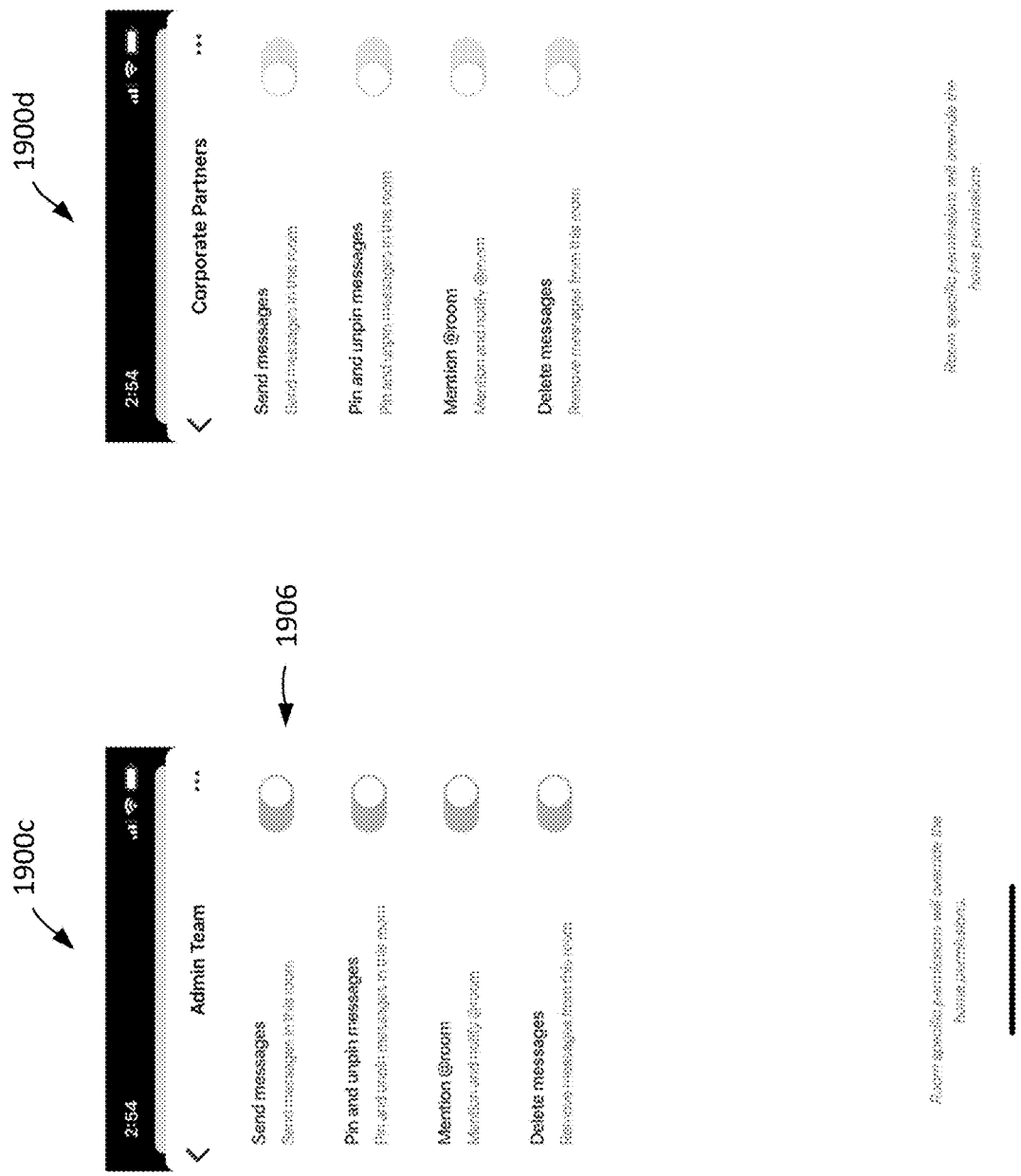

CUSTOMIZABLE COMMUNICATIONS PLATFORM

TECHNICAL FIELD

This disclosure relates to communications platforms, and more specifically to communications platforms enabling users to interact with one another through the exchange of text, images, audio, video, and other data.

BACKGROUND

A communications platform is a computerized platform that enables users to exchange information one with another. As an example, a communications platform can receive content from one or more users, and distribute the content to one or more other users. In some cases, a communications platform can operate over a computerized network, such as the Internet.

SUMMARY

A communications platform enables users to quickly and intuitively share content with one another, in any context of their choosing. As an example, some users can interact with the communications platform to share work related content, entertainment related content, educational content, information regarding products and services that are available to purchase, and/or any other content of the users' choosing. Accordingly, the communications platform acts as a universal platform for exchanging information between users, across all aspects of their lives.

The communications platform enables users to share content with one another in real-time or substantially real time. Further, the communications platform enables users to customize the manner in which content is shared. For example, users can create logical structures and control the users that have access to the logical structures, the content that is shared within the logical structures, and the manner in which content is shared within the logical structures. Further, users can nest one or more logical sub-structures within the logical structures to organize and/or control content distribution with greater granularity.

In some implementations, users can monetize content with respect to their logical structures. As an example, users can create logical structures that restrict access to those that pay an access fee. As another example, users can create logical structures that offer products or services for sale. The communications platform can track completed payments or sales that were made via the communications platform, and can pay some or all of the transaction amount to the creator or administrator of those logical structures.

One or more of the implementations described herein can provide various technical benefits. For example, implementations of the communications platform described herein can enable users to quickly and efficiently communicate over a computerized communications network (e.g., the Internet) in real time or substantially real time. Further, users can share a wide variety of content (e.g., text, images, video, audio, and other content) in an organized and intuitive manner. Further, users can control the distribution of content and the manner in which content is shared, such that content is transmitted between devices in accordance with specific rules (e.g., privacy rules, distribution rules, etc.). This increases the security of the system, and safeguards content from unauthorized or unintended access. As such, implementations of the communications platform provide a more secure and more robust form of computerized communication.

In an aspect, a method includes generating, using a communications platform, a plurality of logical structures, and receiving, from a first user using the communications platform, first content to be shared within a first logical structure of the plurality of logical structures. The method also includes determining, using the communications platform, one or more second users associated with the first logical structure, and transmitting, using the communications platform, contents of the first logical structure including the first content to the one or more second users.

Implementations of this aspect can include one or more of the following features.

In some implementations, the method can further include receiving, from a third user using the communications platform, second content to be shared within a second logical structure of the plurality of logical structures; determining, using the communications platform, one or more fourth users associated with the second logical structure; and transmitting, using the communications platform, contents of the second logical structure including the second content to the one or more fourth users.

In some implementations, the second logical structure can be nested within the first logical structure.

In some implementations, the one or more fourth users can be a subset of the one or more second users.

In some implementations, determining one or more second users associated with the first logical structure can include receiving, from each of the one or more second users, a request to access the first logical structure; and determining, for each of the one more second users, whether the second user satisfies one or more access criteria associated with the first logical structure; and enabling access to the first logical structure by each of the one or more second users that satisfies the one or more access criteria In some implementations, the one or more criteria can include an age requirement.

In some implementations, the one or more criteria can include a geographical location requirement.

In some implementations, the one or more criteria can include a payment requirement.

In some implementations, the one or more criteria can include a requirement that the second user provide a particular answer in response to a prompt.

In some implementations, the first content can include at least one of a chat message, a post, audio, or video.

In some implementations, the first content can include a combination of a chat message, a post, audio, and video.

In some implementations, the first content can include an event invitation.

In some implementations, the first content can include a poll or questionnaire.

In some implementations, the first content can include an indication of a geographical location.

In some implementations, the first content can include an image to be overlaid over other content of the logical structure.

In some implementations, the first content can be selected using a graphical user interface.

In some implementations, generating the plurality of logical structures can include receiving, from a second user, template data indicating a first type of logical structure, the template data including one or more parameters associated with the first type of logical structure; generating the first type of logical structure based on the template data; receiving, from a third user, a request to generate a second logical structure according to the first type; and generating the second logical structure using the template data.

In some implementations, the one or more parameters can include an indication of a type of content that can be shared within the first type of logical structure.

In some implementations, the one or more parameters can include an indication of a visual appearance of the first type of logical structure.

In some implementations, the first content can include an indication of a first product or service for sale.

In some implementations, the indication of the first product or service for sale can be generated, at least in part, by: determining a plurality of products or services for sale in the plurality of logical structures; presenting the plurality of products or services for sale to the first user; receiving, from the first user, a selection of the first product or service for sale among the plurality of products or services for sale; and generating the indication of the first product or service for sale based on the selection.

In some implementations, the plurality of products or services for sale can be determined, at least in part, using an electronic commerce platform different from the communications platform.

In some implementations, the method can further include modifying the first content based on one or more rules.

In some implementations, the one or more rules can include an indication of one or more words to be removed from the first content.

In some implementations, the method can further include receiving, from the first user, a command to disassociate a particular second user among the one or more second users from the first logical structure; and responsive to receiving the command, preventing transmission of the contents of the first logical structure to that second user.

In some implementations, the method can further include receiving, from the first user, a command to enable a particular second user among the one or more second users to share content within the first logical structure; and responsive to receiving the command, enabling that second user to share content within the first logical structure.

In some implementations, the method can further include presenting, to an additional user, at least some of the logical structures among the plurality of logical structures; receiving, from the additional user, a selection of one of the presented logical structures; associating the additional user with the selected logical structure; and transmitting the contents of the first logical structure including the first content to the additional user.

In some implementations, presenting at least some of the logical structures among the plurality of logical structures can include determining, for each of the logical structures, an estimated interest in the logical structure by the additional user; and presenting at least some of the logical structures among the plurality of logical structures according to the estimated interest.

In some implementations, the estimated interest in a logical structure can be determined based on the additional user's association with one or more other logical structures among the plurality of logical structures.

In some implementations, the method can further include receiving, from a first user, second content to be shared with a third user independent from the plurality of logical structures; and transmitting the second content from the first user to the third user independent from the plurality of logical structures.

In some implementations, the method can further include enabling each user of the communications platform to access the contents of the first logical structure.

In some implementations, the method can further include indicating, to one or more third users not associated with the first logical structure, an existence of the first logical structure; and preventing the one or more third users from accessing the contents of the first logical structure.

In some implementations, the method can further include not indicating, to one or more third users not associated with the first logical structure, an existence of the first logical structure; and preventing the one or more third users from accessing the contents of the first logical structure.

In some implementations, the method can further include receiving, from the first user, a request to transfer ownership of the first logical structure to a third user; responsive to receive the request, transmitting a notification to the third user regarding the request; receiving, from the third user, an indication that the third user consents to the request; and responsive to receiving the indication that the third user consents to the request, transferring ownership of the first logical structure to the third user.

In some implementations, the method can further include receiving, from the first user, a request to transfer ownership of the first logical structure to a third user upon death or incapacity of the first user; determining that the first user has died or has become incapacitated; and responsive to determining that the user has died or has become incapacitated, transferring ownership of the first logical structure to the third user.

In some implementations, the method can further include retrieving, using the communications platform, data regarding one or more second logical structures implemented using a second communications platform different from the communications platform; and generating, using the communications platform, one or more third logical structures based on the data regarding the one or more second logical structures.

In some implementations, retrieving the data regarding the one or more second logical structures can include retrieving contents of the one or more second logical structures. Generating the one or more third logical structures can include presenting the contents of the one or more second logical structures in the one or more third logical structures.

In some implementations, the contents of the one or more second logical structures can be retrieved using an automated application executed on the second communications platform and having access to the one or more second logical structures.

In some implementations, the method can further include receiving, from a third user using the communications platform, second content to be shared within a second logical structure of the plurality of logical structures, where the second logical structure is nested within the first logical structure; determining, using the communications platform, one or more fourth users associated with the second logical structure, where the one or more fourth users are not associated with the first logical structure; and transmitting, using the communications platform, contents of the second logical structure including the second content to the one or more fourth users.

In some implementations, the first logical structure can be nested within a second logical structure. The method can further include displaying a first indication of the first logical structure in a directory listing associated with the second logical structure; and displaying a second indication of the first logical structure in a directory listing associated with a third logical structure different from the second logical structure.

In some implementations, the method can further include receiving, from a third user, a selection of the first indication or the second indication, and responsive to receiving the selection of the first indication or the second indication, transmitting the contends of the first logical structure including the first content to the third user.

The details of one or more embodiments are set forth in the accompanying drawings and the description below. Other features and advantages will be apparent from the description and drawings, and from the claims.

DESCRIPTION OF DRAWINGS

FIG. 3B-3I are diagrams of example graphical user interfaces (GUI) for sharing and presenting content in a logical structure.

FIGS. 4A-4C are diagrams of example GUIs for creating an account.

FIGS. 6A-6G are diagrams of example GUIs for creating and accessing a top-level logical structure.

FIGS. 7A-7G are diagrams of example GUIs for creating and accessing a logical sub-structure.

FIGS. 9A-9L are diagrams of example GUIs for moderating a logical structure.

FIGS. 11A-11H are diagrams of example GUIs for exchanging direct messages between users.

FIGS. 12A and 12B show example sets of abilities that can be granted to users to the communications platform.

FIGS. 17A-17D are diagrams of example GUIs for sharing and presenting posts.

FIGS. 19A-19D are diagrams of example GUIs for adjusting role-based permissions.

Like reference symbols in the various drawings indicate like elements.

DETAILED DESCRIPTION

General Overview:

A communications platform enables users to quickly and intuitively share content with one another, in any context of their choosing. As an example, some users can interact with the communications platform to share work related content (e.g., to communicate with one another regarding the carrying on of a business). Further, some users can interact with the communications platform to share entertainment related content (e.g., to communicate with one another regarding games, sports, movies, music, fashion, etc.). Further still, some users can interact with the communications platform to share educational content (e.g., to communicate with one another regarding academic materials, such as school work and research). Further still, some users can interact with the communications platform to share information regarding products and services that are available to purchase. Further still, some users can interact with the communications platform to share any other content of their choosing. Accordingly, the communications platform acts as a universal platform for exchanging information between users, across all aspects of their lives.

The communications platform enables users to share content (e.g., text, images, video, audio, and/or other content) with one another in real-time or substantially real time. Further, the communications platform enables users to customize the manner in which content is shared. For example, users can create logical structures (e.g., "homes" within which content can be shared) and control the users that have access to those logical structures, the content that is shared within the logical structures, and the manner in which content is shared within those logical structures. Further, users can nest one or more logical sub-structures within the logical structures (e.g., "rooms" nested within homes) to organize and/or control content distribution with greater granularity.

In some implementations, users can monetize content with respect to their logical structures. As an example, users can create homes and/or rooms that restrict access to those that pay an access fee (e.g., a one time or recurring fee). As another example, users can create logical structures that offer products or services for sale. The communications platform can track completed payments and sales that were made via the communications platform, and can pay some or all of the transaction amount (e.g., some or all of the proceeds, a commission, or referral fee) to the creator or administrator of those logical structures.

The communications platform can be operated in conjunction with one or more computer systems. As an example, the communications platform can be implemented on one or more server systems, and can communicate with one or more client systems via one or more computerized networks (e.g., the Internet). Users of the client systems can interact with one another by transmitting data to and/or receiving data from the communications system.

Figure 1:
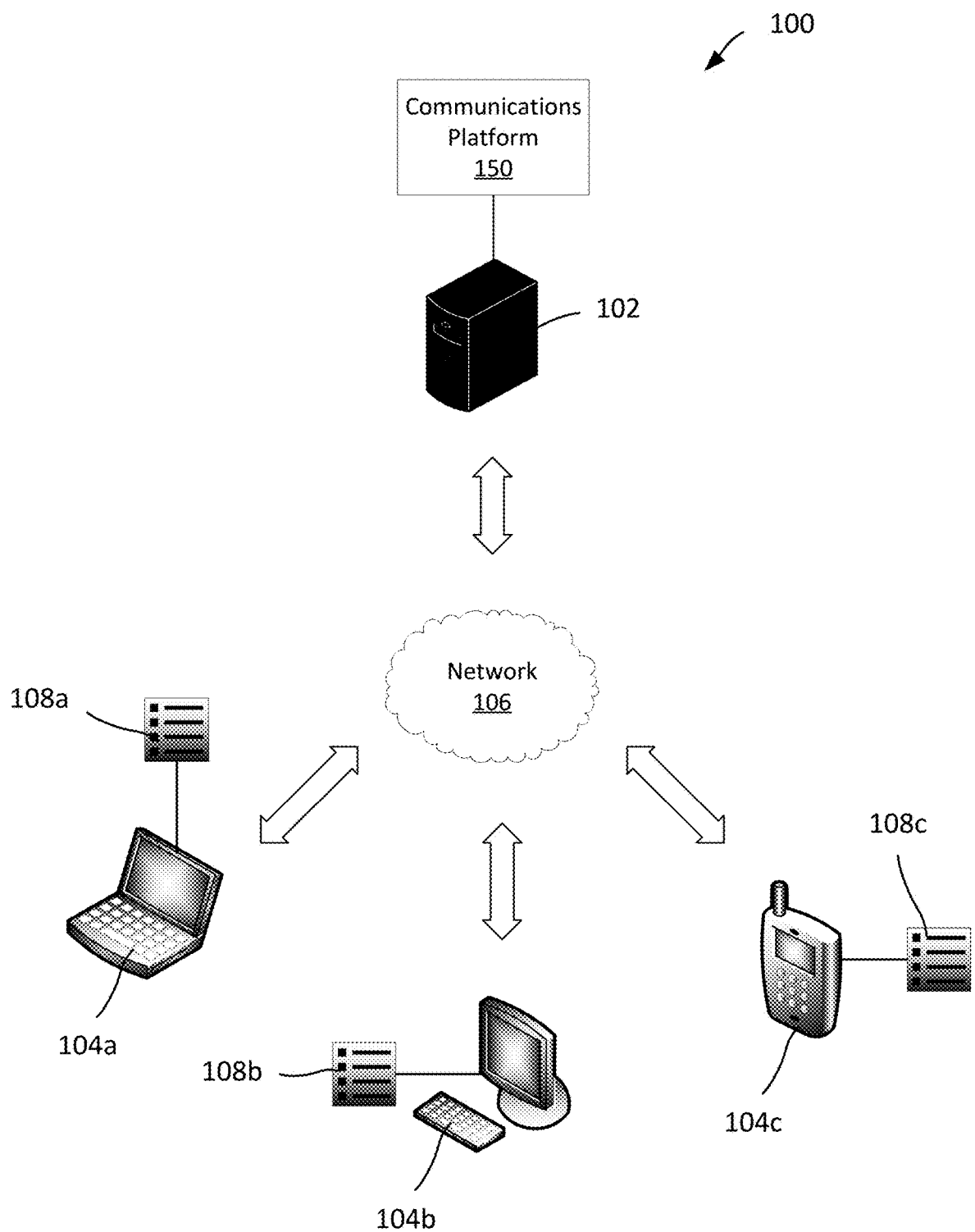
FIG. 1 is a diagram of an example system for implementing a communications platform.

An example system 100 for implementing a communications platform is shown in FIG. 1. The system 100 includes a communications platform 150 maintained on a server system 102 that includes one or more server computers.

The server system 102 is communicatively connected to client devices 104a-104c through the network 106. Each client device 104a-104c includes a respective user interface 108a-108c. Users can interact with the user interfaces 108a-

108c to view data (e.g., data on the server system 102 and the platform 150, and/or data on the other client devices 104a-104c). Users can also interact with the user interfaces 108a-108c to transmit data to other devices (e.g., to the server system 102 and the platform 150 and/or to the other client devices 104a-104c). Users can interact with the user interfaces 108a-108c to issue commands (e.g., to the server system 102 and the platform 150 and/or to the other client devices 104a-104c). In some implementations, a user can install a software application onto a client device 104a-104c in order to facilitate the performance of these tasks (e.g., an "app" associated with the platform 150).

A client device 104a-104c can be any electronic device that is used by a user to view, process, transmit and receive data. Examples of the client devices 104a-104c include computers (such as desktop computers, notebook computers, server systems, etc.), mobile computing devices (such as cellular phones, smartphones, tablets, personal data assistants, notebook computers, and wearable computers such as smartwatches), and other computing devices capable of transmitting and receiving data from the network 106. The client devices 104a-104c can include devices that operate using one or more operating systems (e.g., Microsoft Windows, Apple OSX, Linux, Unix, Android, Apple iOS, Apple iPadOS, Apple watchOS, etc.) and/or architectures (e.g., x86, PowerPC, ARM, etc.) In some implementations, one or more of the client devices 104a-104c need not be located locally with respect to the rest of the system 100, and one or more of the client devices 104a-104c can be located in one or more remote physical locations. In some implementations, each of the client devices 104a-104c can communicate with a geo-positioning system (e.g., a global positioning system [GPS], Wi-Fi triangular system, and so forth) in order to determine its geographical location.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

The server system 102 is illustrated as a single component. However, in practice, it can be implemented on one or more computing devices. A server system 102 can be, for instance, a single computing device that is connected to the network 106, and a communications platform 150 can be maintained and operated on the single computing device. In some implementations, a server system 102 can include multiple computing devices that are connected to the network 106, and a communications platform 150 can be maintained and operated on some or all of the computing devices. For instance, the server system 102 can include several computing devices, and the platform 150 can be distributed on one or more of these computing devices. In some implementations, a server system 102 need not be located locally to the rest of the system 100, and portions of a server system 102 can be located in one or more remote physical locations.

Figure 2:
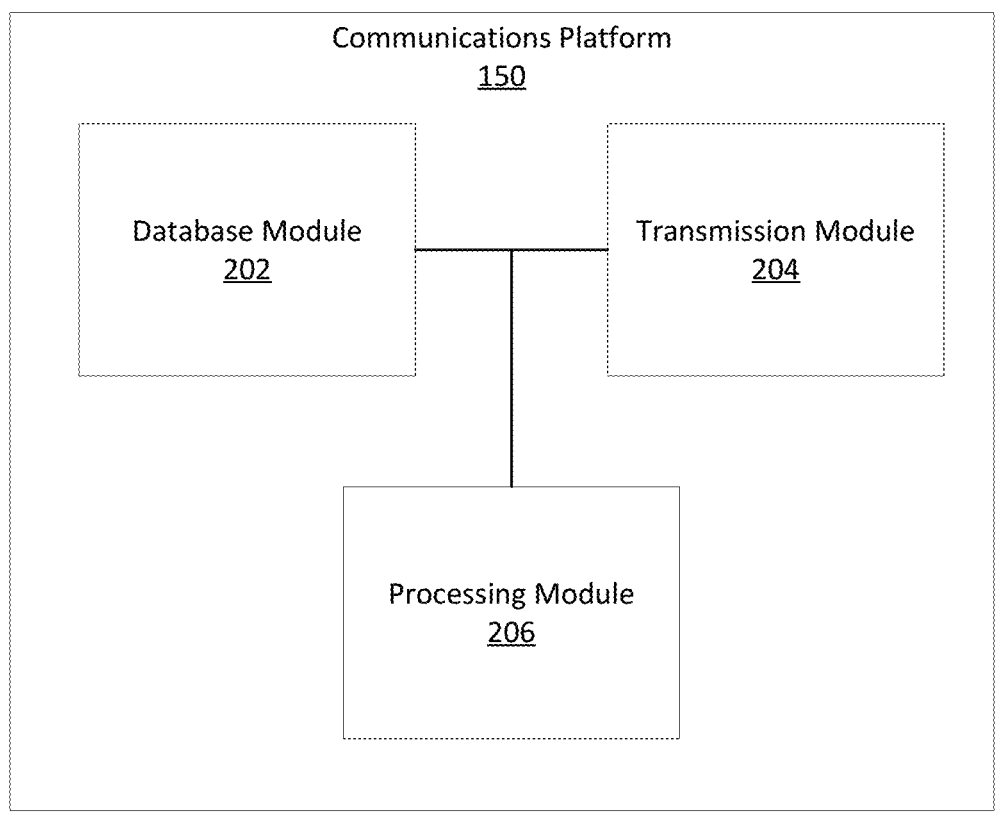
FIG. 2 is a diagram of an example communications platform.

FIG. 2 shows various aspects of the platform 150. The platform 150 includes several modules that perform particular functions related to the operation of the system 100. For example, the platform 150 can include a database module 202, a transmission module 204, and a processing module 206.

The database module 202 maintains information related to the operation of the system 100. As examples, the database module 202 can store information regarding one or more users of the system 100, such as a user's identity credentials (e.g., user name and password), contact information (e.g., e-mail address, physical address, phone number, and so forth), demographic information (e.g., age, gender, geographical region, and so forth), preferences (e.g., system preferences, privacy preferences, and so forth), and location information (e.g., geographical coordinates, such as those determined using a global positioning system (GPS), Wi-Fi triangulation system, or other geo-positioning system). As another example, the database module 202 can store content shared by the users of the system 100, such as text, images, video, audio, and other content. As another example, the database module 202 can store information describing the relationship between one or more users, content, and/or one or more logical structures (e.g., homes and rooms). For instance, the relationship information can indicate that a particular user is associated with one or more other users, has transmitted and/or received particular content, and has access to one or more particular homes or rooms having particular content. Although different examples of information are described above, these are merely illustrative. In practice, the database module 202 can store any information related to the platform 150, its users, and the content shared on the platform 150.

The transmission module 204 allows for the transmission of data to and from the platform 150. For example, the transmission module 204 can be communicatively connected to the network 106, such that it can transmit data to the client devices 104a-104c, and receive data from the client devices 104a-104c via the network 106. As an example, information inputted by users on the client devices 104a-104c can be transmitted to the platform 150 through the transmission module 204. This information can then be processed (e.g., using the processing module 206) and/or stored (e.g., using the database module 202). As another example, information from the platform 150 (e.g., information stored on the database module 202) can be transmitted to one or more of the client devices 104a-104c through transmission module 204.

The processing module 206 processes data stored or otherwise accessible to the platform 150. For instance, the processing module 206 can execute automated or user-initiated processes that manipulate data pertaining to one or more users and/or the content shared by those users. As an example, the processing module 206 can manipulate data stored on the database module 202, or data that is received from the transmission module 204. Likewise, processed data from the processing module 206 can be stored on the database module 202 and/or sent to the transmission module 204 for transmission to other devices. Example processes that can be performed by the processing module 206 are described in greater detail below.

As described above, implementations of the communication platform 150 enable users to share content with one another in real-time or substantially real time. Further, users can create nested logical structures to compartmentalize the sharing of content, such that content is shared in specific contexts and/or with specific users. Logical structures can include, for example, one or more organizational units such as "homes," with each home containing one or more organizational sub-units such as "rooms." Logical structures can be defined using software, hardware, or a combination thereof.

Figure 3A:
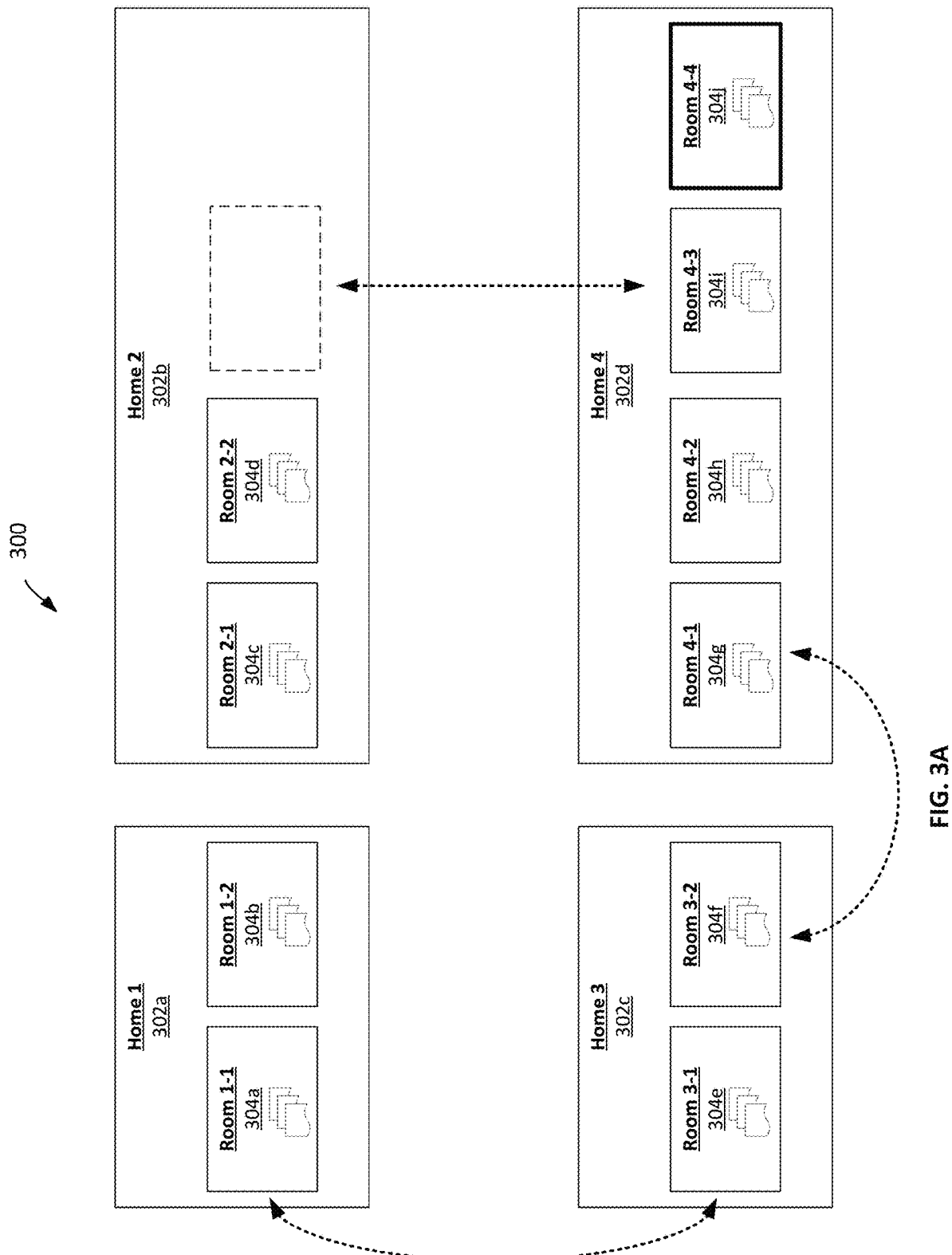
FIG. 3A is a diagram of example nested logical structures that can be implemented by a communications platform.

As an example, FIG. 3A is a schematic diagram of nested logical structures 300 that can be implemented by the platform 150. The nested logical structures 300 include a number of first level logical structures 302a-302d (e.g., "homes") and a number of second level logical structures 304a-304j (e.g., "rooms") nested in respective ones of the first level logical structures 302a-302d.

Users can selectively control the manner in which content is shared with respect to each of the logical structures 300. For instance, users can specify, with respect to each logical structure, the users that have access to that logical structure, the content that is shared within that logical structure, and the manner in which content is shared within that logical structures (e.g., in accordance with certain rules and/or restrictions specific that that logical structure).

As an example, a user can create a first level logical structure 302a ("Home 1"). Further, the user can specify that a certain group of users can access the logical structure 302a and share content within the logical structure 302a in accordance with certain rules and restrictions. Further, the user can create a second level logical structure 304a (e.g., "Room 1-1") within the logical structure 302a, and specify that a first subset of the users can access the logical structure 304a and share content within the logical structure 304a in accordance with a different set of rules and restrictions. Further, the user can create an additional second level logical structure 304b (e.g., "Room 1-2") within the logical structure 302a, and specify that a second subset of the users can access the logical structure 304b and share content within the logical structure 304b in accordance with a different set of rules and restrictions. Accordingly, the user can specify— on a logical structure by logical structure basis—which users have access to which logical structure, and control the manner in which content is shared.

Although two nested levels of logical structures are shown in FIG. 3A, this is merely an illustrative example. In practice, the platform 150 can enable users to define logical structures according of any number of nested levels (e.g., one, two, three, four, or more).

In some implementations, content shared within a particular logical structure can be completely isolated from one or more other logical structures. As an example, referring to FIG. 3A, content shared within the logical structure 304b (e.g., "Room 1-2" nested within "Home 1") is completely isolated from the logical structure 304c (e.g., "Room 2-1" nested within "Home 2"). Accordingly, only users who have access to the logical structure 304b can view the content shared within it, whereas users who only have access to the logical structure 304c cannot view that content. This can be useful, for example, as it enables users to maintain a degree of privacy and/or control with respect to the content shared within each logical structure.

In some implementations, content shared within a particular logical structure can be selectively shared within one or more additional logical structures. As an example, referring to FIG. 3A, content shared within the logical structure 304a (e.g., "Room 1-1" nested within "Home 1") is also shared within the logical structure 304e (e.g., "Room 3-1" nested within "Home 3"). Accordingly, users who have access to the logical structure 304a and/or the logical structure 304e can view the content shared within either or both of those logical structures, whereas users who only have access to other logical structures cannot view that content. As another example, content shared within the logical structure 304f (e.g., "Room 3-2" nested within "Home 3") is also shared within the logical structure 304g (e.g., "Room 4-1" nested within "Home 4"). Accordingly, users who have access to the logical structure 304f and/or the logical structure 304g can view the content shared within either or both of those logical structures, whereas users who only have access to other logical structures cannot view that content. This can be useful, for example, as it enables users to publicize content among a larger population of users, while still maintaining a degree of privacy and/or control with respect to the content shared within each logical structure.

In some implementations, the sharing of content between multiple logical structures can be dynamically modified. For example, a user can specify that content be shared between two logical structures. In response, the platform 150 can aggregate content from the two logical structures together (e.g., by copying content from one logical structure to another, and vice versa, on the platform 150 and/or the client devices 104a-104c), such that users who have access to either or both logical structures can view the aggregated content in a single logical structure. Further, the platform 150 can aggregate the list of users who are associated with each room together into a single list. This gives the appearance that there is a single joint logical structure that combines the content and users of both of the logical structure together.

Further, the user can subsequently specify that content no longer be shared between the two logical structures. In response, the platform 150 can segregate content from the two logical structures (e.g., remove or delete the content that had been copied from another logical structure from the platform 150 and/or the client devices 104a-104c), such that users can only view content that was shared specifically in the logical structure for which he has access. Further, the platform 150 can segregate the list of users who are associated with each room. This gives the appearance that the joint logical structure was severed into separate logical structures.

In some implementations, when a "child" logical structure is nested within a "parent" logical structure, only users who can access the parent logical structure can access the child logical structure. For example, referring to FIG. 3A, only the users having access to the logical structure 302b (e.g., "Home 2") can also access the logical structure 304c (e.g., "Room 2-1").

However, this need not always be the case. For example, the platform 150 can permit users to designate certain child logical structures as "external" logical structures. External logical structures can be accessed by users who are not associated with the parent logical structure.

As an example, FIG. 3A shows an external logical structure 304i (e.g., "Room 4-3") nested within the logical structure 302d (e.g., "Home 4"). The external logical structure 304i is shared between the logical structures 302a and 302c. Accordingly, users that can access either (or both) of the logical structures 302a and 302c can also access the external logical structure 304i. This type of external logical structure can be referred to as a "shared room." A shared room can be useful, for example, in enabling different groups of users associated with different respective homes to interact with these other (e.g., in a shared collaborative environment). In some implementations, a room can be shared among three or more different homes.

In some implementations, shared rooms can be created according to an invitation or permission system. For example, the administrator of a first home can create a shared room within the first home, and specify that the shared room be shared with a second home. In response, the platform 150 transmits an invitation to the administrator of the second home notifying him of the creation of the shared room. The administrator of the second home can accept the shared room, or decline the shared home. If the administrator of the second home accepts the shared room, the shared room is displayed in the directory listings of both the first and second homes (e.g., giving users the appearance of a single room shared between both homes). If the administrator of the second home declines the shared room, the shared room is removed (e.g., after the administrator of the first home is notified to the declined invitation). In some implementations, users cannot exchange content within a shared room until after the room sharing invitation is accepted by the appropriate administrators (e.g., to prevent the exchange of content without the administrators' permission).

In some implementations, users are provided with a personal and customizable directory listing of a home (e.g., listing each of the rooms within the home). The user can customize his directory listing by selectively hiding or "unhiding" rooms in his directory listing (e.g., hide rooms that he is not interested in and show rooms that he is interested in). Further, the user can customize his directory listing by grouping one more rooms together, "collapsing" one or more groups (e.g., so that the name of the group is visible, but the rooms within the group are hidden), and/or "expanding" one or more groups (e.g., so that the rooms within the group are visible). Further, the user can reorder the rooms in his directory listing. This enables a user to organize his directory listing, such that he can view and select certain rooms more conveniently. The user's directory listing is personal of the user, and does not affect other user's ability to hide or unhide rooms as they see fit on their own respective directory listings.

Figures 3D, 3E:
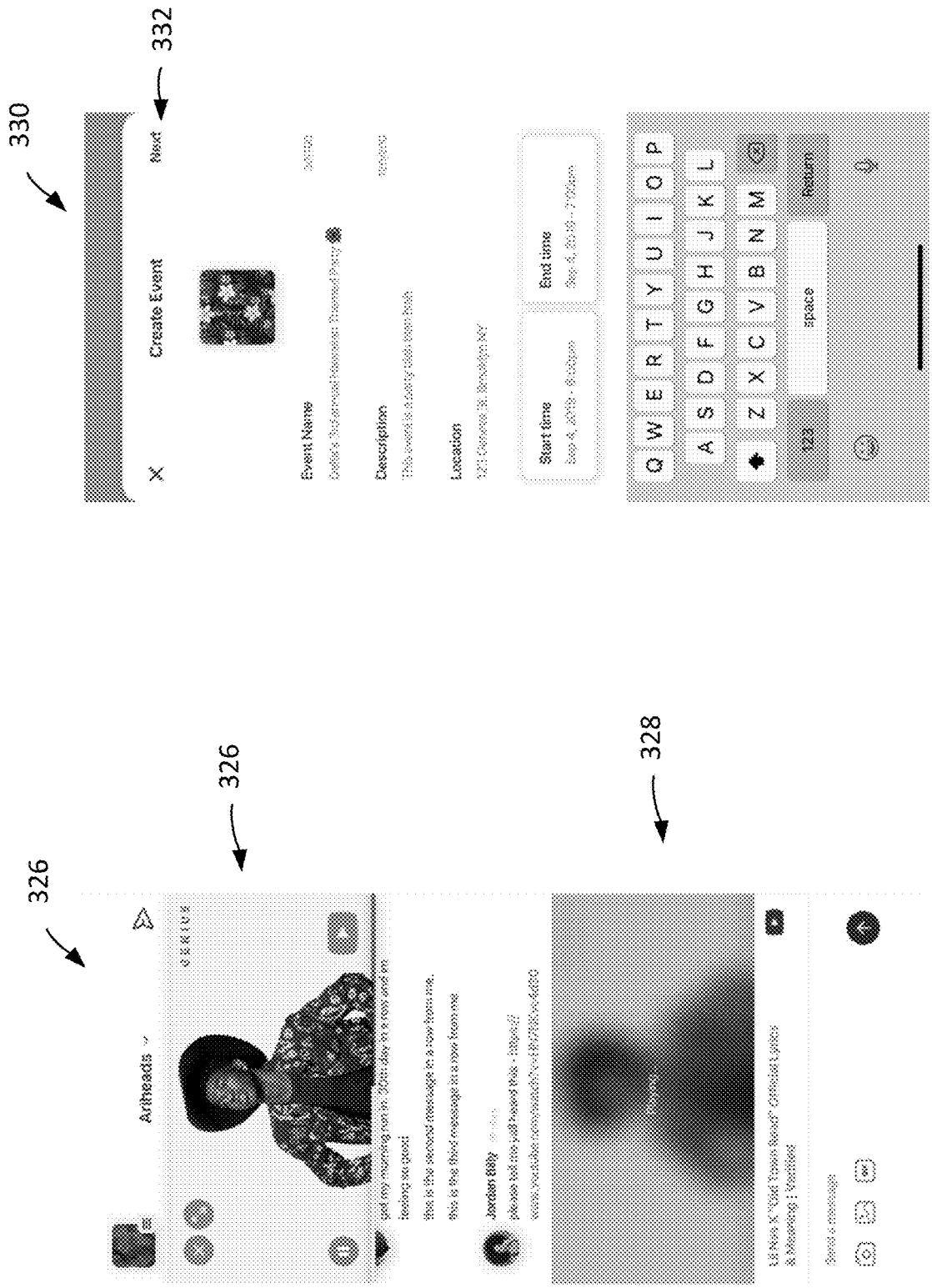
Figures 3H, 3I:
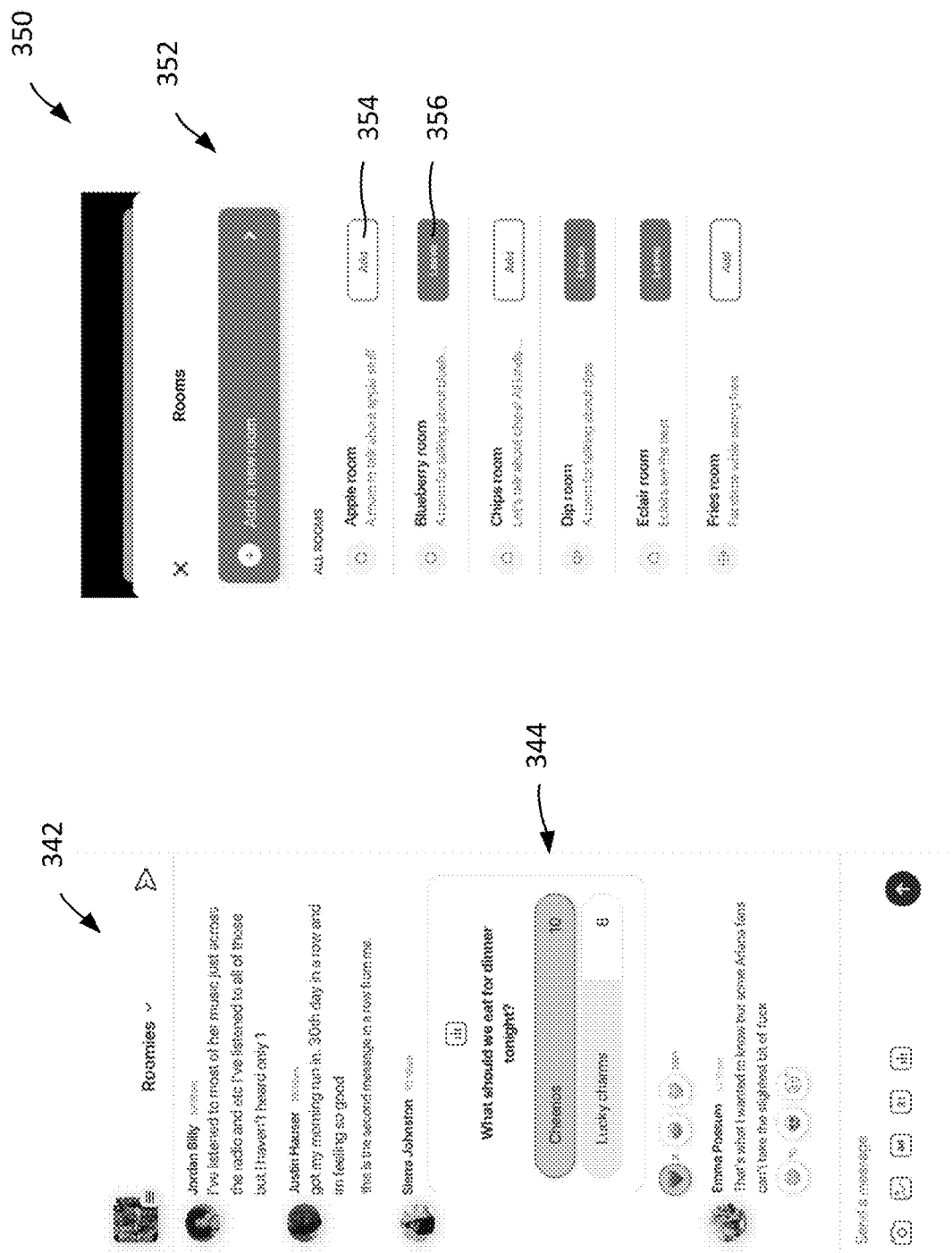

Further, in some implementations, a user can add a room or leave a room directly from the directory listing. For example, as shown in FIG. 3I, the platform 150 can present a GUI 350 showing a directory of rooms 352. The user can selectively add a room by selecting an "add" screen element 354. Further, the user can selectively leave a room by selecting a "leave" screen element 356.

In some implementations, the creator or administrator of a home can specify a default directory listing for that home. Users can customize their personal directory listings according to their individual preferences, as described above.

As another example, FIG. 3A shows another external logical structure 304j (e.g., "Room 4-4"). The external logical structure 304j can be accessed by users associated with any other logical structure and/or users who are not associated with any other logical structure at all. This type of external logical structure can be referred to as a "visiting room" or a "block party" room. A visiting room or block party room m can be useful, for example, in enabling diverse groups of users to interact with each other, regardless of their affiliations with other logical structures (or lack thereof).

In some implementations, an external logical structure must be designated as such at the time of creation. For example, when a user first creates a logical structure, he must designate that logical structure as an "external" logical structure (e.g., either a "shared" room or a "visiting" room) at the time of creation. After the logical structure is created, the platform 150 restricts users from changing the designation. In some implementations, a logical structure can be designated as an external logical structure even after creation.

In some implementations, the creator or administrator of a home can specify a custom Uniform Resource Locator (URL) for that home. As an example, this custom URL can be a subdomain of the platform 150's domain (e.g., https://app.geneva.com/fictionalfilmpodcast). As another example, this custom URL can be a subdomain of the domain of another website (e.g., https://fictionalfilmpodcast.com/community.) This is beneficial, for example, in making users in the home feel like the home is "owned" by the creator or administrator of the home, and in giving users a unique Web address for the home that is easy to remember.

In some implementations, the creator or administrator of a home can specify custom stylistic or design elements for that home. As an example, the creator or administrator of a home may be able to select from a range of themes or patterns provided by the platform 150 to change the appearance of the home or rooms. As another example, the creator or administrator of a home may be able to add customized Cascading Style Sheets (CSS) instructions to change the appearance of any or all elements of the home.

Users of the platform 150 can create logical structures (e.g., homes and rooms) and share content with other users with respect to those logical structures. Further, users of the platform 150 can share content in other ways, such as through "direct messages" between one another (e.g., outside of the context of a logical structure). Example processes for creating logical structures and sharing content are described in greater detail below.

Sharing of Content:

In some implementations, the platform 150 can display a visual "toolbox" that enables the users to selectively share particular types of content. As an example, the platform 150 can present a GUI to a user that includes one or more graphical icons, each representing different types of content that can be shared using the platform 150. The user can select one or more of those icons to share the selected type of content.

Various types of content can be shared within logical structures. As an example, shared content can include text, images, video, audio, or a combination thereof. In some cases, content can be shared in the form of a "post" (e.g., a unit of content shared by a particular user at a particular point in time). Each post can include one or more portions of text, images, videos, and audio, either individually or in any combination. Further, a post can have different portions (e.g., a title, a body section including various forms of content, a user comment section, etc.). In some cases, content can be shared in the form of a chat message (e.g., a message in a chronological or threaded conversation between multiple users). Each chat message can include one more portions of text, images, videos, and audio, either individually or in any combination. Further details regarding posts and chat messages are described below.

In some implementations, the platform 150 can enable users to search for content to share. As an example, the platform 150 can present a search interface to a user (e.g., a search box), and allow the user to input search criteria (e.g., a text string). The platform 150 identifies content fitting the search criteria (e.g., images, videos, audio, or other content that matches or is similar to the inputted search criteria). The user can select one or more of the search results, and instruct the platform 150 to share the selected content with other users.

In some implementations, shared content can include offers to sell products or services. As an example, content can include text, images, video, audio, or a combination thereof advertising one or more products or services that are available for purchase. Users can review the offer and complete a purchase (e.g., either directly with the party offering the product or service for sale, or indirectly using the platform 150 as an intermediary).

In some implementations, shared content can include information regarding past, present, and/or future events. As an example, the platform 150 can enable users to create an event data item, and populate the event data item with information regarding an event (e.g., the event's name, the event's start time and end time, the event's location, a description of the event, images of the event, audio of the event, videos of the event, users who are planning on attending the event, admission fees associated with the event, and any other information regarding the event). The user can share the event data item with other users to publicize the event. In some implementations, a user can create an event data item for a single event. In some implementations, a user can create an event data item for a recurring event (e.g., multiple events that occur according to a particular pattern or schedule). In some implementations, event data items can be displayed to users in a calendar. In some implementations, each home can have a shared calendar that displays events specific to that home (e.g., an aggregate of the past, present, and future events associated with that home). Each of the users of the home can access the calendar to view events associated with that home. In some implementations, event data items can be exported from the platform 150 to third parties (e.g., a third party that provides computerized calendar services to its users).

Further, users can indicate to the platform 150 whether they plan to attend the event (e.g., by selecting from options such as "going," "not going," and "tentative"). Based on these responses, the platform 150 maintains and updates a list of anticipated attendees, and distributes the list to one or more users (e.g., the anticipated attendees, the user who created the event data item, etc.). This is beneficial, for example, as it enables users to track who will attend each event more accurately and manage their events more efficiently. In some implementations, users wishing to attend an event having an admission fee can submit payment to the platform 150 (e.g., by providing payment information such as credit card information, debit card information, etc.). The platform 150 can pay some or all of the transaction amount to the user that created the event. Example graphical user interfaces (GUIs) for creating and sharing event data items are shown and described with respect to FIGS. 3E and 3F and FIGS. 16A-16F.

In some implementations, shared content can include location information. As an example, users can use the platform 150 to share location information from one another, such as their current locations, historical locations, locations of points of interest, locations of events, etc. In some implementations, the platform 150 can display shared location using a graphical map (e.g., using a "pin" to identify locations on the map).

In some implementations, shared content can include questionnaires or polls. As an example, users can use the platform 150 to ask questions to other users (e.g., in the form of a questionnaire or poll). Other users can answer the question, such as by inputting a free-form answer or selecting from among an array of responses. The platform 150 can aggregate the answers received from multiple users, and present the results in the form of a chart or histogram (e.g., showing the selection frequency of each answer to the question). Example GUIs for creating and sharing event data items are shown and described with respect to FIGS. 3G and 3H.

In some implementations, shared content can include graphical "stickers" that can be overlaid atop over content. As an example, the platform 150 can present the user with one or more images (e.g., static images, animated images, etc.). The user can select an image, and specify that a copy of the image be positioned in a particular manner with respect to other content that had been shared in a logical structure. For example, the user can select the size of the image, the orientation of the image, and the location of the image relative to other content shared in the logical structure. In response, the platform 150 places a copy of the image in the logical structure (e.g., "sticks" the sticker on top of other content shared in the logical structure).

In some implementations, content shared within a particular logical structure can be stored as an immutable ordered list of events (e.g., posts or messages ordered chronologically). In some implementations, content can be edited or removed from the list, but cannot be reordered in the list. In some implementations, content can be displayed to a user according to the order in the list. In some implementations, content can be displayed for a user according to a different order (e.g., according to a number of positive "up votes" from users regarding the content, a net number of "up votes" from users regarding the content, a number of user comments associated with the content, or some other criteria). In some implementations, each content item can be assigned a unique identifier (e.g., a serial number or sequence of alphanumerical label) that distinguishes it from every other content item shared on the platform 150. In some implementations, content can be encrypted such that only authorized users (e.g., the sender, intended recipients, and/or the platform 150 can interpret it).

In some implementations, the platform 150 can automatically translate shared content to facilitate communications between users who speak different languages. As an example, a first user can share textual content with one or more other users. The platform 150 can automatically analyze the shared content, and determine that it was shared according to a first language. Further, the platform 150 can automatically identify that the one or more other users prefer to receive content according to a second language. The platforms 150 can automatically translate the shared content into the second language, and present the translated content to the one or more other users. This can be beneficial, for example, in overcoming language barriers between users.

In some implementations, can be performed in real time or substantially real-time using automated machine translation techniques (e.g., such that translated content is made available to users immediately upon or soon after the content being shared). In some implementations, content can be automatically translated for a user based on the user's preferences (e.g., a user selected preference with respect to his account or profile) and/or based on the location of the user (e.g., city, state, region, or country).

Content can be shared in real-time or substantially real-time. For example, once a user shares content with respect to the logical structure, the platform 150 can permit other users immediately view the shared content (e.g., by transmitting the content to the other users, either automatically, or on demand by the other users). This is beneficial, for example, as it enables users to quickly and efficiently communicate with one another without substantial delay.

Further, content can be shared in a format or organization layout that facilitates asynchronous or non-real-time communication between users, such that users can review content at their convenience (e.g., minutes, hours, days, months, etc. after content was initially shared), while still being able to intuitively follow the flow of content sharing or discussion that had occurred. This is beneficial, for example, as it enables users to interact with one another effectively, even if they are not reviewing the exchange of content in real-time.

As an example, content can be presented according to a nested or threaded structure. For instance, FIG. 3B shows an example graphical user interface (GUI) 310 for sharing and presenting content (e.g., chat messages) in a logical structure. The GUI 310 includes a title bar 312 indicating the name of the logical structure (e.g., "News Room"), and a portion 314 for inputting content to be shared with other users within the logical structure. Further, GUI 310 includes a portion 316 displaying content shared by users within the logical structure (e.g., a series of chat messages 318). The chat messages 318 can be ordered sequentially in a list format, such as in chronological order, prioritized by user name (e.g., alphabetically), or according to any other priority. The chat messages 318 also can be organized according to nested or threaded arrangement. For example, a first chat messages 318a and can arranged according to a first level (e.g., a "parent" level), and a second chat messages can 318b be nested within the first post according to a second sub-level (e.g., a "child" level). This can be useful, for example, as it enables users to organize content in a more intuitive manner (e.g., by keeping relevant content together in common threads, rather than purely in a sequential list).

Although two levels of threaded content are shown in FIG. 3B, this is merely an illustrative example. In practice, the platform 150 can enable users to share content according of any number of levels (e.g., one, two, three, four, or more).

Further, although FIG. 3B shows an example GUI for sharing and presenting content such as chat messages, a similar GUI can be used to facilitate the sharing and presentation of content such as posts. This is beneficial, for example, as it enables a user to share longer-form content with a title, body text, links, media uploads, etc., in an asynchronous manner that enforces threading.

As described herein, various types of content can be shared within logical structures, such as text, images, video, audio, or a combination thereof. Further, different types of content can be displayed currently. For example, users can submit content (e.g., posts, chat messages, etc.) having one or more portions of text, images, video, and/or audio. In the case of videos and audio, users accessing the content can watch and/or listen to the content (e.g., using one portion of a GUI), while continuing to access other content on the logical structure (e.g., using another portion of the GUI).

For example, FIG. 3C shows an example GUI 320 for sharing and presenting content in a logical structure. In this example, the GUI 320 includes a portion 322 displaying content shared by users within the logical structure (e.g., a series of chat messages 324). Further, a chat message 324a includes a portion of video content. A user can select the video in chat message 324a to play back the video. As shown in FIG. 3D, in response, the GUI 320 plays back the video in a first portion of the GUI 326. The user can continue browsing other content in the logical structure in a second portion of the GUI 328. This is beneficial, for example, as it enables a user to multi-task by viewing multiple content items concurrently.

In some implementations, the platform 150 can validate content received from a user before distributing the content with other users. This can be useful, for example, in identifying and removing dangerous or malicious content, content that may interfere with the operation of the platform 150, and/or other undesirable content prior to it being distributed to other users. As an example, the platform 150 can enable users to share content that is less than or equal to a particular threshold length or size (e.g., a particular number of characters, bits, or bytes). Upon receiving content greater than the threshold length or size, the platform 150 can modify the content prior to distributing to others (e.g., truncating the content so that it is less than or equal to the threshold length or size), or delete the content so that it is not distributed to others. In some implementations, the threshold length can be 2000 characters, 100,000 characters, or some other threshold value.

In some implementations, the platform 150 can enable users to submit "reactions" to content. As an example, users can indicate whether they "like" or "dislike" shared content, "up vote" or "down vote" shared content," and/or indicate their mood or emotion with respect to shared content (e.g., by inputting an appropriate emoji). The platform 150 can display users' reactions to content alongside the content, such that other users can ascertain the community's reactions.

As described herein, in some implementations, can share content regarding events using the platform 150. For instance, FIG. 3E shows an example GUI 330 for creating an event item regarding an upcoming event. In some implementations, a user can access the GUI 330 using the visual "toolbox" (e.g., selecting a graphical icon representing an event data item). The user can input information regarding the event using the GUI 330. For example, the user can input the name of the event, a description of the event, a location of the event, and the time that the event is scheduled to occur (e.g., the starting time and the ending time). Further, the user can input additional information regarding the event, such as images, audio, video, or other content regarding the event. When the user is satisfied with his entries, he can select the "next" option 332 to create the event. In some implementations, once an event is created, the event can be automatically added to the shared calendar for all users in that home, such that the users of the home can view the event.

An event data item can be shared within a logical structure. As an example, FIG. 3F shows a GUI 334 for sharing and presenting content in a logical structure (e.g., in a similar manner as shown and described with respect to FIGS. 3B and 3C). In this example, a user has shared an event data item 336 within the logical structure (e.g., an event data item created using the GUI 330 shown in FIG. 3E). The event data item 336 is displayed alongside other content that has been shared within the logical structure (e.g., displayed alongside text, images, video, and/or other content received from the members of the logical structure). Users can view the event data item 336 to learn about the event, such as the name of the event, a description of the event, the location of the event, the time that the event is scheduled to occur, and a list of users who are planning to attend the event. Further, users can interact with the event data item 336 (e.g., to indicate whether they plan to attend).

Figures 16A, 16B, 16C:
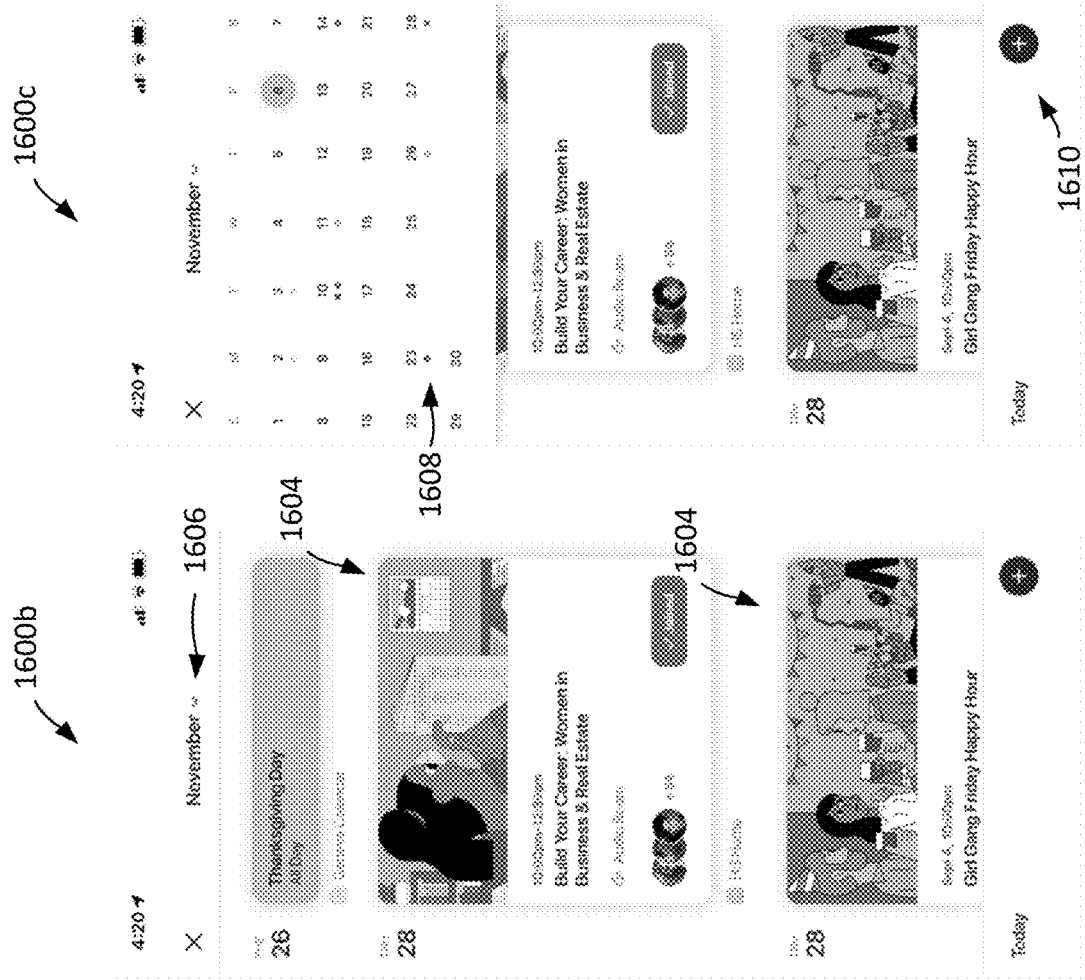
FIGS. 16A-16F are diagrams of example GUIs for sharing and presenting content regarding events.

FIGS. 16A-16E show additional GUIs for sharing and presenting content regarding events using the platform 150. For instance, FIG. 16A shows an example GUI 1600a that displays an overview of a logical structure. For example, the GUI 1600a indicates that the user is associated with a top-level logical structure "Jordan's Crying Home." Further, the GUI 1600a indicates that several logical sub-structures nested within the top-level logical structure, including a "General" room, a "Random" room, a "Share" room, a "Talk" room, and a "Hangout" room. A user can select one or more of the displayed logical sub-structures to enter them and view the content shared within them.

Further, the user can access a calendar of events by selecting an option 1602. In response, as shown in FIG. 16B, the platform 150 displays a GUI 1600b showing at least a portion of the user's calendar of events. In some implementations, the GUI 1600b may display only the events created within a subset (e.g., one) of the logical structures or sub-structures that the user is a part of. In some implementations, the GUI 1600b may display all of the events created within all of the logical structures or sub-structures that the user is a part of. For example, the GUI 1600b can include several event items 1604, each including information regarding a particular event. For example, each event item 1604 can include a title of an event, one or more images regarding the event, a description of the event, the date and time for which the event is scheduled, an indication of one or more users who are planning on attending the event (e.g., RSVPed "yes" to the event), and/or any other information about the event. The user can select one of the event items 1604 to obtain additional information regarding the event. Further, the user can interact with the event item, such as indicating whether or not he plans on attending (e.g., RSVP "yes" or "no") and/or sharing content with other regarding the event (e.g., by submitting chat messages, images, videos, etc. regarding the event).

Further, the user can instruct the platform 150 to expand the calendar of events, such that he can view events over a longer period of time. For instance, in the example shown in FIG. 16B, the GUI 1600b shows events occurring between November 26 and November 28 (e.g., in the form of a chronological list). The user can select the option 1606 to expand the calendar of events. In response, the platform 150 presents a GUI 1600c displaying additional events occurring throughout the month of November (e.g., as indicated by colored icons 1608 for particular days of the month). A user can select a particular day and/or event to view details regarding that day or event. Further, a user can select different months to view additional events (e.g., by performing a swiping or scrolling gesture with respect to the calendar).

Figures 16D, 16E, 16F:
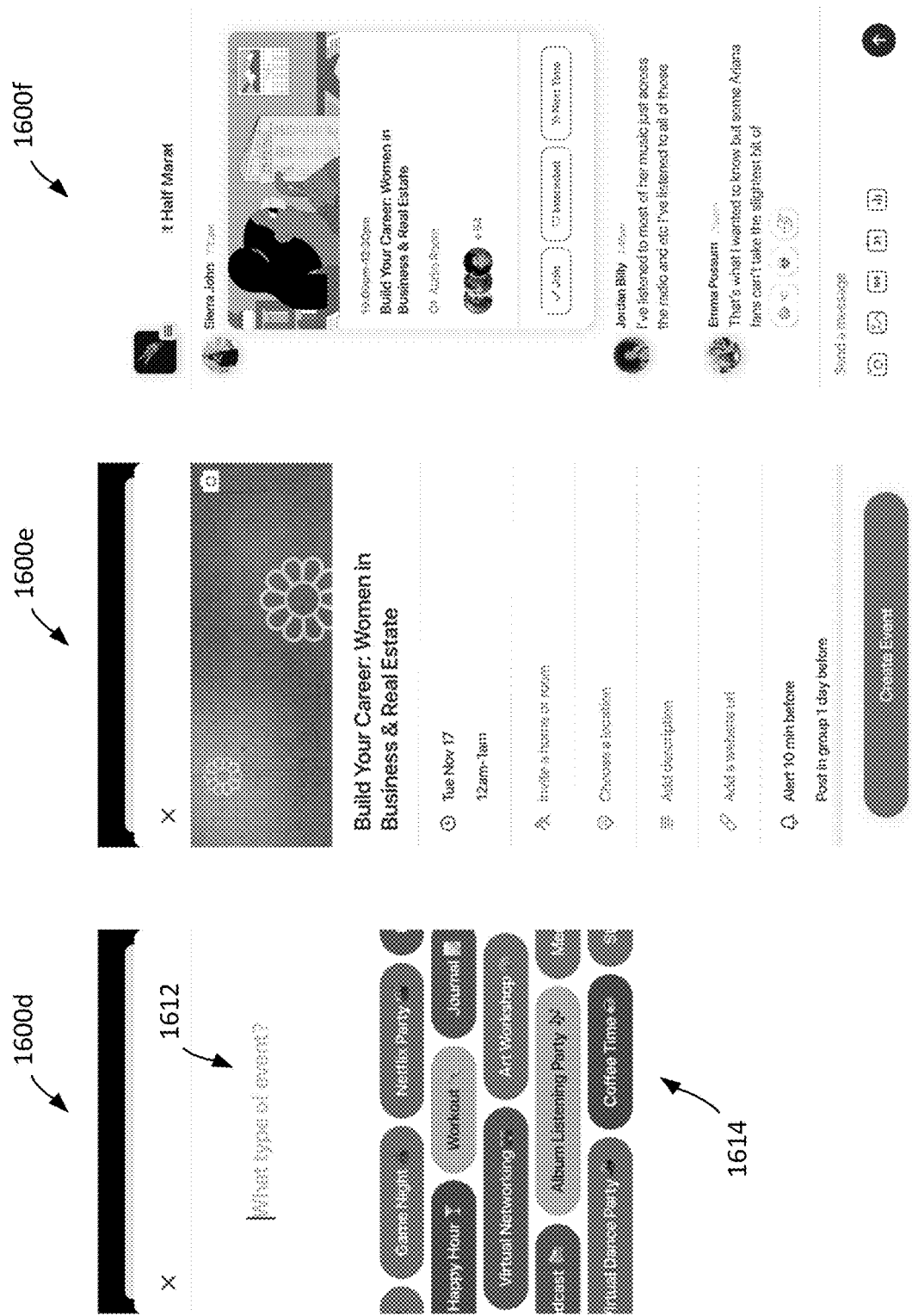

Further, the user can create a new event item. For example, referring to FIG. 16C, the user can select an option 1610 (e.g., a "+" icon). In response, as shown in FIG. 16D, the platform 150 displays a GUI 1600d for creating a new event item. The GUI 1600d prompts the user to input a type of event item that the user wishes to create (e.g., in an input box 1612). Further, the GUI 1600d provides suggested types of events that the user can select (e.g., options 1614 below the input box 1612).

After the user has inputted the type of event, the platform 150 displays a GUI 1600e prompting the user to input additional information regarding the event. For example, the GUI 1600e can prompt the user to provide a title of the event, a scheduled day and time of the event, a duration of the event, an image representing the event, a location for the event, a description of the event, and/or a website associated with event (e.g., a URL). Further, the GUI 1600e can prompt the user to select one or more users to invite to the event. In some implementations, the user can specify specific users to invite to the event. In some implementations, the user can specify that users of a particular logical structure or logical sub-structure (e.g., a home or room) be invited to an event.

The platform 150 can generate invitations based on the user's inputs. For example, as shown in FIG. 16F, the platform 150 can display a GUI 1600f to each of the invited users. The GUI 1600f includes a section 1616 that displays information regarding the event (e.g., the title of the event, the scheduled day and time of the event, an image of the event, a description of the event, a list of users who are planning on attending the event, etc.). Further, the GUI 1600f can display options 1618 that enable a user to provide feedback regarding the event. For example, the user can select an option indicating that he plans on attending the event (e.g., a "Join" option). As another example, the user can select an option indicating that he does not plan on attending the event (e.g., a "Next Time" option). As another example, the user can select an option that is generally interested in the event, but that he has not yet made a decision regarding whether to attend (e.g., an "Interested" option).

As described herein, in some implementations, a user can share polls or questionnaires using the platform 150. For instance, FIG. 3G shows an example GUI 338 for creating a poll item regarding a particular topic or question. In some implementations, a user can access the GUI 338 using the visual "toolbox" (e.g., selecting a graphical icon representing a poll item). The user can input information regarding the poll using the GUI 338. For example, the user can input a question, and one or more answers to the question that can be selected by users. Further the user can specify when users are permitted to participate in the poll (e.g., an end time for voting in the poll), and whether users can vote multiple times or on multiple options in the poll. When the user is satisfied with his entries, he can select the "next" option 340 to create the poll.

A poll item can be shared within a logical structure. As an example, FIG. 3G shows a GUI 342 for sharing and presenting content in a logical structure (e.g., in a similar manner as shown and described with respect to FIGS. 3B and 3C). In this example, a user has shared a poll item 344 within the logical structure (e.g., a poll item created using the GUI 338 shown in FIG. 3G). The poll item 344 is displayed alongside other content that has been shared within the logical structure (e.g., displayed alongside text, images, video, and/or other content received from the members of the logical structure). Users can view the poll item 344 to review details regarding the poll, such as the question being asked, the answer choices available for selection, and the selections made by other users. Further, users can interact with the poll item 334 (e.g., to vote on one of the answer choices).

Logical structures can customized to present different types of content (e.g., a "chat room" for presenting primarily text, an "audio room" for presenting primarily audio, etc.) Further, logical structures can present content according to different presentation layouts, depending on the type of content that is being presented is that logical structure. This enables users to better control how each logical structure is used, and to compartmentalize different types of content into different logical structures.

As an example, a user creating a logical structure can specify that the logical structure be a "chat room." Chat rooms are configured to facilitate rapid real-time communications between users. For example, content shared by users can be displayed in real-time in an ordered list (e.g., in chronological order).

In some implementations, users can edit content that they previously shared in a chat room. However, the platform 150 can mark edited content (e.g., with an "edited" label) so that other users are aware that the content had been edited. In some implementations, users can delete content that they previously shared in a chat room. The platform 150 can remove that content from the chat room, and replace the content with an indication that it had been removed (e.g., a "deleted" label) so that other users are aware that content had been deleted. In some implementations, removed content can be permanently deleted (e.g., such that it is not retained in any records or databases). In some implementations, removed content can be retained (e.g., temporarily or permanently) for future retrieval.

In some implementations, the platform 150 can transmit notifications to the users of a chat room upon the occurrence of certain events. As an example, the platform 150 can transmit a notification to a user of a chat room when any message has been shared in the chat room, when someone has responded to a message that he posted, when the user has been mentioned in the chat room (e.g., when a message is posted having an "@" character, followed by the user's name), and/or when an announcement has been made in the chat room (e.g., when a message is posted having an "@" character, followed by "room"). The user can customize his notifications, such that he receives them only in response to certain specified types of events. As an example, a first user can be notified when a second user that he had invited to a room accepted the invitation and jointed the room. As another example, a user can be notified when he has been added to a new room. As another example, a user can be notified when his permissions with respect to a particular room have been modified. As another example, a first user can be notified when a second user indicated that he is planning on attending an event created by the first user. As another example, a user can be notified when an event that has been shared to the room is about to begin. As an example, a user can be notified when there is a "hot" message or conversation in a room (e.g., if a particular message has been "up voted" above a particular threshold value, if a particular conversation has a large number of messages over a particular period of time, etc.). In some implementations, a user can be notified when a poll that he created in the room has received a particular number of responses. As another example, a first user can be notified when other users who are deemed "close" to the first user (e.g., sufficiently related according to a social graph) are submitting messages or other content in a room. In some implementations, the user can specify that he not receive any notifications in connection with the chat room (e.g., "muting" the chat room).

As another example, a user creating a logical structure can specify that the logical structure be an "audio room." Audio rooms are configured to facilitate the exchange of audio (e.g., spoken words, voices, music, sound effects, or other types of audio). In some implementations, users can listen to some or all of the audio shared in a logical structure in a continuous stream. In some implementations, users can listen to selected portions of audio. In some implementations, a user can listen to audio shared in the audio room, and interact with other users in the audio room by posting messages in the audio room (e.g., messages including text, images, videos, audio, etc.). In some implementations, audio rooms can be used to share live or substantially live audio content (e.g., a live performance). In some implementations, a user can selectively mute or unmute other users in the audio room (e.g., to control who may share or "broadcast" audio content to others). In some implementations, a user can give other users the ability to mute or unmute users in the audio room (e.g., to delegate control over the audio room to other users). In some implementations, a user can record some or all of the content in an audio room. In some implementations, a user can additionally share other type of content (e.g., text content) in an audio room, alongside the sharing of audio content.

The platform 150 can provide users with certain abilities or options with respect to an audio room. For example, the platform 150 can enables users to transmit audio in real-time or substantially real-time using an input device, such a microphone. Further, the platform 150 can enable users to selectively mute themselves, such that audio is not transmitted and shared in the audio room. Further, the platform 150 can enable users to specify a particular input (e.g., a particular microphone from among multiple microphones) and a particular output (e.g., a particular audio speaker from among multiple audio speakers). Further, the platform 50 can enable users to adjust the input volume, input sensitively, and output volume. In some implementations, the platform 150 can also enable users to set a user limit for the audio room (e.g., to cap the number of users that can participate in an audio room concurrently).

As another example, a user creating a logical structure can specify that the logical structure be a "video room." Video rooms are configured to facilitate the exchange of videos (e.g., television shows, movies, animations, etc.). In some implementations, users can listen to some or all of the video shared in a logical structure in a continuous stream. In some implementations, users can listen to selected portions of video. In some implementations, a user can listen to video shared in the video room, and interact with other users in the video room by posting messages in the video room (e.g., messages including text, images, videos, audio, etc.). In some implementations, video rooms can be used to share live or substantially live video content (e.g., a live performance). In some implementations, a user can selectively mute or unmute other users in the video room (e.g., to control who may share or "broadcast" video content). In some implementations, a user can give other users the ability to mute or unmute users in the video room (e.g., to delegate control over the video room to other users). In some implementations, a user can share a portion or an entire of a GUI of his device in the video room (e.g., share the "screen" of his computer or mobile device). In some implementations, a user can share pre-recorded and/or pre-uploaded video content in the video room. In some implementations, a user can record some or all of the content in a video room. In some implementations, a user can additionally share other type of content (e.g., text content) in a video room, alongside the sharing of video content.

The platform 150 can provide users with certain abilities or options with respect to a video room. For example, the platform 150 can enables users to transmit video in real-time or substantially real-time using an input device, such a video camera. Further, the platform 150 can enable users to selectively suspend the video sharing (e.g., so that they are not visible to others in the video room). Further, the platform 150 can enable users to specify a particular input (e.g., a particular video camera from among multiple video camera) and a particular output (e.g., a particular audio speaker from among multiple audio speakers). Further, the platform 50 can enable users to adjust the orientation of a camera, input volume, input sensitively, and output volume. In some implementations, the platform 150 can also enable users to set a user limit for the video room (e.g., to cap the number of users that can participate in a video room concurrently).

In some implementations, the platform 150 can offer videos of a particular scene according to multiple different perspectives or views. A user can select a particular perspective or view, and switch to different perspectives or views during the session.

In some implementations, the platform 150 can present multiple different videos (e.g., different TV shows, movies, scenes, etc.). A user can select a particular video, and switch to different videos during the session.

As another example, a user creating a logical structure can specify that the logical structure be a "post room." Post rooms are configured to facilitate the exchange of content in a nested thread format (e.g., in a similar manner as shown in FIG. 3B). In some implementations, an item of content in a post room (e.g., a "post") can include one or more content items (e.g., text, audio, and/or video). In some implementations, a post can have different portions. For instance, FIG. 17A shows an example GUI 1700*a* that displays content from a post room, including several posts 1702 (e.g., arranged in a list). Each post 1702 includes a title 1704 (e.g., a portion of text), a body section 1706 (e.g., including one or more portions of text, images, video, and/or audio), and a user comment section 1708 (e.g., including one or more user comments or chat messages associated with those content items in the post). In some implementations, the user comments can be similar to chat messages, and can be organized chronologically and/or according to a nested thread format.

The platform 150 can provide a user with multiple different options for viewing content in a post room. For instance, the order in which the posts 1702 are displayed can be modified according to a user's preferences (while keeping each of the sections of each post together). As an example, a user can specify that content be presented such as the newest content is displayed first. As another example, a user can specify that content be presented such as the older content is displayed first. As another example, a user can specify that content having the highest rating user (e.g., based on votes submitted by users, such as "up votes" or "down votes") is displayed first. As another example, a user can specify that content having the lowest rating is displayed first. As another example, a user can specify that content be ordered according to the name of the user that submitted the content (e.g., alphabetical or reverse alphabetical order). As another example, a user can specify that content be ordered according to the number of comments on the post (e.g., the most commented content can be displayed first, or the least commented content can be displayed first). An example GUI 1700*b* for selecting an order of posts in a post room is shown in FIG. 17B. For instance, a user can select a particular sorting criteria from among a list 1712. The GUI 1700*b* can be accessed, for example, by selecting an option 1714 from the GUI 1700*a*.

As shown in FIG. 17A, in some implementations, the GUI 1700*a* can hide a portion of a post 1702 (e.g., a portion of the body section 1708), and provide an option 1716 that enables a user to view the entirety of the post 1702. Upon the user selecting the option 1716, the platform 150 can expand the post 1702 (e.g., such that the entirety of the post 1702 is displayed). This can be useful, for example, as it enables the user to browse through a series of posts 1702 more quickly, and selectively retrieve additional content from a particular post of interest.

Figures 17C, 17D:
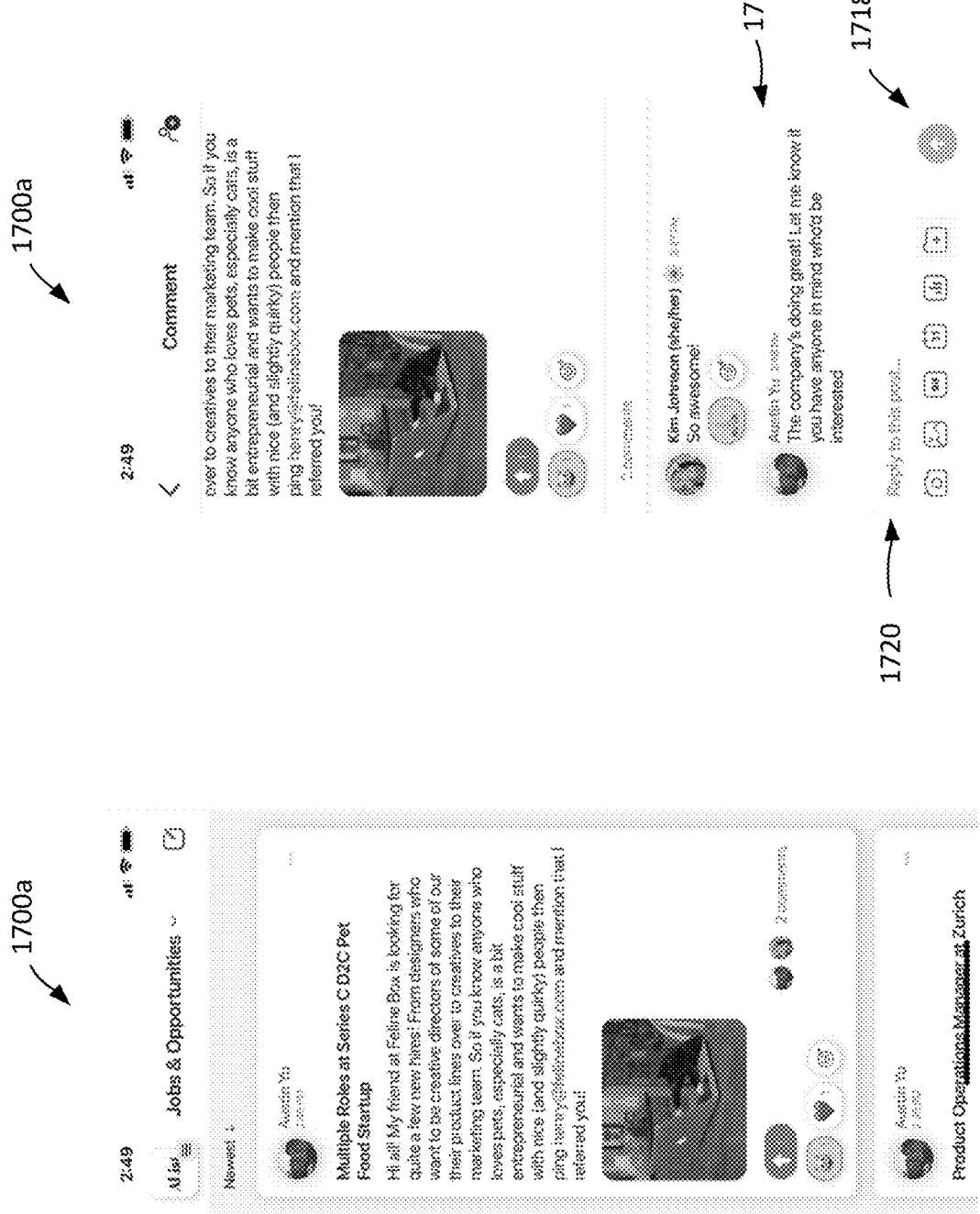

Further, the user can share content regarding a post 1702, such as a chat message. For example, as shown in FIG. 17D, the GUI 1700*a* includes an input box 1718 that enables a user to input a message regarding the post 1702 (e.g., a comment regarding the contents of the post 1702). After inputting a message, the user can select an option 1720 to instruct the platform 150 to add the message to the comments section 1716 of the post 1702, such that it can be viewed by others. Further, multiple users can input messages in a similar manner to converse with another regarding the post 1702.

The platform 150 can also present content according to different formats. For example, a user can specify that content be displayed according to a "compact" format (e.g., such that the platform 150 displays the name of the user that shared the content, the heading or title of the content, a timestamp of the content, a number of times that the content has been voted on by users, and a number of comments submitted by users in response to the content).

As another example, a user can specify that content be displayed according to a "classic" format. According to this format, the platform 150 can display the same information that is displayed in the "compact" format. Additionally, the platform 150 can display various options for interacting with the content, such as options to share the content with others, flag the content for moderation, hide the content, or submit comments regarding the content.

As another example, a user can specify that content be displayed according to a "card" format. According to this format, the platform 150 can display the same information that is displayed in the "classic" format. Additionally, the platform 150 can a summary of the content (e.g., in the form of text, images, and/or video).

In some implementations, users can edit content that they previously shared in a post room. However, the platform 150 can mark edited content (e.g., with an "edited" label) so that other users are aware that the content had been edited. In some implementations, users can delete content that they previously shared in a post room. The platform 150 can remove that content from the post room, and can either remove the content entirely or replace the content with an indication that it had been removed (e.g., a "deleted" label) so that other users are aware that content had been deleted. In some implementations, removed content can be permanently deleted (e.g., such that it is not retained in any records or databases). In some implementations, removed content can be retained (e.g., temporarily or permanently) for future retrieval.

In some implementations, the platform 150 can transmit notifications to the users of a post room upon the occurrence of certain events. As an example, the platform 150 can transmit a notification to a user of a post room when any message has been shared in the post room, when someone has responded to a message that he posted, when the user has been mentioned in the post room (e.g., when a message is posted having an "@" character, followed by the user's name), and/or when an announcement has been made in the post room (e.g., when a message is posted having an "@" character, followed by "room"). The user can customize his notifications, such that he receives them only in response to certain specified types of events. As an example, a first user can be notified when a second user that he had invited to a room accepted the invitation and jointed the room. As another example, a user can be notified when he has been added to a new room. As another example, a user can be notified when his permissions with respect to a particular room have been modified. As another example, a first user can be notified when a second user indicated that he is planning on attending an event created by the first user. As another example, a user can be notified when an event that has been shared to the room is about to begin. As an example, a user can be notified when there is a "hot' post in a room (e.g., if a particular post has been "up voted" above a particular threshold value, if a particular post has a large number of comments over a particular period of time, etc.). In some implementations, a user can be notified when a poll that he created in the room has received a particular number of responses. As another example, a first user can be notified when other users who are deemed "close" to the first user (e.g., sufficiently related according to a social graph) are submitting posts, comments, or other content in a room. In some implementations, the user can specify that he not receive any notifications in connection with the post room (e.g., "muting" the post room).

In some implementations, users can vote on the contents of a post room. For example, user can "up vote" content (e.g., to show their approval of the content) or "down vote" content (e.g., to show their disapproval of the content). The platform 150 can prioritize the display of content within the post room based on these votes. In some implementations, the creator or administrator of a post room can selectively enable or disable the voting of content by users.

In some implementations, the platform 150 can enable users to submit other "reactions" to content in a post room. As an example, users can indicate their mood or emotion with respect to shared content (e.g., by inputting an appropriate emoji). The platform 150 can display users' reactions to content alongside the content, such that other users can ascertain the community's reactions.

As another example, a user creating a logical structure can specify that the logical structure be a "marketplace room." Marketplace rooms are configured to facilitate sales of goods and/or services between users of the platform 150.

As an example, users can post messages in a marketplace room offering goods or services for sale. Each message can include information regarding the good or service for sale, such as a name of the good or service, a description of the good or service (e.g., brand, model or part number, item category, sizing or fitting information, color, condition, etc.), one or more photographs of the good or service, the location of the good, the location at which the service can be rendered, shipping information, the user offering the good or service for sale, and other information pertinent to the offer. Other users can access the marketplace room and browse the shared messages to identify the goods or services that are being offered. Further, users can purchase the good or service, either directly through the platform 150 or through a third party (e.g., a retailer) using the platform 150 as an intermediary.

In some implementations, the platform 150 can track completed payments and sales that were made in each marketplace room, and can pay some or all of the transaction amount (e.g., some or all of the proceeds, a commission, or referral fee) to the creator or administrator of those logical structures. In some implementations, the administrators of the platform 150 can retain a portion of the transaction amount (e.g., as a fee for providing the marketplace infrastructure).

In some implementations, the creator or administrator of a marketplace room and/or "hosts" of the marketplace room (e.g., users granted certain abilities with respect the room, such as moderation abilities) can selectively remove or edit messages shared in the marketplace room (e.g., to curate the goods or services that are offered for sale within the marketplace room).

In some implementations, the creator or administrator of a marketplace room and/or hosts of the marketplace room can customize the manner in which shared messages are presented to users accessing the marketplace room. For example, or administrator of a marketplace room and/or hosts of the marketplace room can specify that messages be prioritized according to chronological order (e.g., such that messages that are shared more recently are at the top of an ordered list or at the bottom of an ordered list), price (e.g., such that messages offering cheaper items for sale are at the top of an ordered list or at the bottom of an ordered list), alphabetical order (e.g., by item name, brand name, model name, etc.), or according to any other priority. In some implementations, users accessing a marketplace room can customize the manner in which messages are shared to them. For example, users can specify that messages be displayed to them according to a particular priority (e.g., recency, price, alphabetical order, etc.) and/or according to one or more search or filter criteria (e.g., keywords, price ranges, locations, brands, models or part numbers, item categories, sizes, colors, conditions, seller or merchant, etc.).

In some implementations, the platform 150 can act as an intermediary between a buyer and a seller. As an example, a seller can share a message in a marketplace room offering an item for sale. A buyer accesses the marketplace room, retrieves the message offering the item for sale, and determines that he wishes to purchase the item. The buyer transmits a command to the platform 150 indicating that he wishes to purchase the item, and provides payment information to the platform 150 (e.g., credit card information, debit card information, etc.). Using the payment information, the platform 150 obtains funds to cover the amount of the transaction (e.g., from a financial institution), and transmits some or all of the funds to the buyer. Further, the platform 150 can generates a record of the transaction (e.g., a sales receipt), and furnishes it to both the buyer and seller for their records).

In some implementations, a message offering an item or service for sale can be presented in the form of a "purchasable container" alongside other content in a logical structure (e.g., a logical structure containing data regarding an item or service for sale, and appearing as a "post" or message alongside other posts or messages). The purchasable container enables a user to view and purchase the item or service using the platforms 150, without requiring that the user leave the logical structure, and without requiring that the user interact with a third party (e.g., a third party website).

As an example, a seller can share a message in a marketplace room offering an item for sale. This message is shared with other users in the marketplace room as a purchasable container, appearing as a post or message alongside other posts or messages in the marketplace room. A buyer can select the purchasable container to view information regarding the offer. In response, the platform 150 displays additional information regarding the item in the purchasable container, without requiring that the user access an external web page or third party application. Further, the user can indicate that he wishes to purchase the item, and provide payment information using the purchasable container, again without requiring that he access an external web page or third party application. This enables users to conduct transactions with one another more easily, and without relying on systems other than the platforms 150.

In some implementations, a purchasable container can offer a single instance of a product or service for sale (e.g., a one-of item or service). In some implementations, a purchasable container can offer multiple instances of a product or service for sale (e.g., a limited quantity or stock of items or services), or an indefinite number a product or service or sale (e.g., an unspecified quantity or stock of items or services).

In some implementations, a purchasable container can offer multiple instances of a product or service according to a "group buy" format. As an example, a seller can offer a particular number of items for sale at a particular price, and specify that if a particular number of commitments to purchase the item are received by a particular deadline, the seller will meet those commitments. If the seller does not receive the requisite number of commits by the deadline, the seller rescinds the offer. This can be beneficial, for example, as it enables a seller to complete multiple transactions for a product or service simultaneously and in a more efficient manner. Further, this enables a seller to gauge whether there is sufficient interest in his products or services in the marketplace, before he is required to move forward with a transaction.

In some implementations, messages shared to a particular marketplace room can be viewed only by users that have access to the marketplace room. This can be beneficial, for example, as it enables sellers to selectively advertise their goods or services to particular groups of users, while maintaining a degree of secrecy or privacy. In some implementations, messages shared to a particular marketplace room can be viewed any user of the platform 150. This can be beneficial, for example, as it enables sellers to advertise their goods or services broadly. In some implementations, the creator or administrator of a marketplace room can specify whether messages shared within the marketplace room are shared only to users accessing the marketplace room or globally to the users of the platform 150. In some implementations, the user sharing the message within a marketplace room can specify whether the message is shared only to users accessing the marketplace room or globally to the users of the platform 150.

In some implementations, the platform 150 can transmit notifications to the users of a marketplace room upon the occurrence of certain events. As an example, the platform 150 can transmit a notification to a user of a marketplace room when any message has been shared in the marketplace room. As another example, the platform 150 can transmit a notification to a user of a marketplace room when a new product or service is offered for sale within the marketplace room. As another example, the platform 150 can transmit a notification to a user of a marketplace room when the price of a good or item has changed. As another example, the platform 150 can transmit a notification to a user of a marketplace room when the user has been mentioned in the post room (e.g., when a message is posted having an "@" character, followed by the user's name), and/or when an announcement has been made in the post room (e.g., when a message is posted having an "@" character, followed by "everyone"). The user can customize his notifications, such that he receives them only in response to certain specified types of events. In some implementations, the user can specify that he not receive any notifications in connection with the post room (e.g., "muting" the post room).

In some implementations, outside of the platform 150, sellers may utilize third party services to establish and maintain an ecommerce storefront. For example, sellers may utilize services from Shopify to create an ecommerce storefront, manage inventory, conduct sales, and/or offer post-sales support. In these circumstances, the platform 150 can interface with the third party service such that the same goods or sales are also offered for sale on the platform 150 (e.g., within a marketplace room). As an example, the platform 150 can provide an API to facilitate the transmission of data from the third party service to the platform 150. As another example, the platform 150 can utilize an API provided by the third party to extract data from the third party service. Although Shopify is described above, this is merely an illustrative example. In practice, platform 150 can interface with other third party services, either in addition to or instead of Shopify.

In some implementations, some or all of the messages offering a product or service for sale can be aggregated into a "digital warehouse." The digital warehouse is a logical structure that acts as a global catalog for the products and services that are available for purchase on the platforms 150. Users can access the digital warehouse to view the products and services that are available for purchase, obtain additional information regarding those products and services, and/or complete a transaction for those products and services. In some implementations, users can access the digital warehouse via the visual toolbox (e.g., by selecting a graphical icon corresponding to the digital warehouse).

In some implementations, the user can search through the products and services in the digital warehouse and inputting one or more search terms (e.g., a string of text), or one or more filtering criteria (e.g., type or category, brand, model, size, color, etc.). In response, the platforms 150 identifies products and services matching the user's selections, and presents the identified products and services to the user for review. The user can select one or more of the presented products and/or services, and share them with other users. For example, the user can share a purchasable container enabling other users to purchase the products and/or services, either as a "post" in a logical structure or as a message in a messaging session.

In some implementations, the platform 150 can automatically suggest certain products or services to a user. This enables users to "discover" new products or services that he may be interested in. For example, the platform 150 can present products or services that are relevant to a user's interests (e.g., by prioritizing and/or displaying content regarding those products or services more prominently). In some implementations, the platform 150 can identify products or services that the user has previously purchased, and suggest additional products or services available for purchase (e.g., products or services pertaining to similar interests). In some implementations, the platform 150 can present certain curated products or services (e.g., products or services associated with a sponsor of the platform 150) more prominently or in a prioritized manner.

Although example types of logical structures are described herein, these are merely illustrative examples. In practice, other types of logical structures can be implemented using the platform 150, either instead of or in addition to those described herein. Further, in some implementations, the platform 150 can allow users to create custom types of logical structures (e.g., templates for creating "custom rooms"). For example, users can specify the type of content that can be shared within logical structures of a particular type, the manner in which the content is shared within logical structures of that type (e.g., the layout and organization of presentation, the priority in which content is displayed, etc.). Further, users can share those templates with other users, such that others can create their own logical structures with similar settings and properties. In some implementations, users can allow other users to obtain and use their created templates without charge. In some implementations, users can sell their created templates to other users using the platform 150 as an intermediary (e.g., using a marketplace room or other mechanism). In some implementations, the platform 150 can allow users to create and share custom types of logical structures through an application programming interface (API) provided by the platform 150.

In some implementations, the platform 150 can also enable users to create and share customized applications and/or "bots" (e.g., chat bots) for use with a logical structure. As an example, a user can create and share an application that retrieves content from another source (e.g., a third party service, such as an email provider, social media platform, calendar provider, electronic commerce platform, content provider, or any other service), and displays the content in the context of a logical structure. Further, the application can enable users to interact with the content display within the logical structure (e.g., rather than requiring that the user execute another application or visit a different web page). As another example, the user can create and share a bot that parses content within a logical structure and automatically generates responses (e.g., to simulate a human user and/or to enhance the content in a logical structure). In some implementations, the platform 150 can allow users to create and share customized applications and bots through an API provided by the platform 150.

In some implementations, users can export content shared in a logical structure. As an example, a user can instruct the platform 150 to generate a copy of some or all of the content shared within a particular logical structure. In response, the platform 150 generates one or more files including the content and the layout of that content within the logical structure, and transmits it to the user. In some implementations, the user can also export other information regarding a logical structure, such as a list of users who have joined the logical structure, settings and preferences associated with the logical structure, descriptive material regarding the logical structure, or any other information regarding the logical structure.

Account Creation

Users can create and maintain accounts with respect to the communications platform 150. As an example, users can create an account that provides access to various features of the platform 150. Further, the users can personalize that account to maintain a particular identity on the platform 150. As an example, a user can create one or more user names or pseudonyms that uniquely identify that user on the platform 150. As another example, a user can provide personal information, such as his name, contact information (e.g., mailing address, phone number, e-mail address, etc.), personal content (e.g., text, images, videos, audio, etc.), and other information.

In some implementations, the platform 150 can be configured such that each user of the platform 150 has a single account. Further, during the account creation process, the platform 150 can collect a limited amount of information from each user, such as the user's name (e.g., legal name), desired user name (e.g., a pseudonym that uniquely identifies the user on the platform 150 and is displayed to each of the other users of the platform 150), and a telephone number. This can be useful, for example, as it allows users to create accounts without providing extensive information that may be potentially sensitive, while also allowing the platform 150 to sufficiently ascertain the user's identity.

In some implementations, the platform 150 can specifically require that a user provide a telephone number, but not require that the user provide an e-mail address. This may be advantageous in certain circumstances. For example, the use of telephone numbers may be advantageous in mobile computing environments (e.g., when the user is interacting with the platform 150 on a mobile device, such as a smartphone), as it facilitates account creation with relatively little friction. Further, the use of telephone numbers provides a higher degree of security, as it is generally more difficult to create new phone numbers than to create a new e-mail address. Further, users often associate telephonic interactions closely with a "communications platform." Thus, use of a telephone number may encourage users to utilize the platform 150 as a means of two-way communication (e.g., rather than as a mere publishing platform geared towards the one-way broadcasting of information). Nevertheless, in some implementations, the platform 150 can use both telephone numbers and e-mail address during the account creation process.

FIGS. 4A-4C show example GUIs 400a-400c that can be displayed to a user during an account creation process. The GUIs 400a-400c can be displayed, for example, on one or more of the client devices 104a-104c.

As shown in FIG. 4A, the GUI 400a requests that a user input his telephone number (e.g., using a keypad 402). After inputting his telephone number, the user confirms the input by selecting a screen element 404 (e.g., an interactive button displayed on the GUI 400a).

After the user confirms his telephone number, the platform 150 transmits a security code to the inputted telephone number. As an example, the security code can be an alphanumeric sequence transmitted through Short Message Service (SMS) and/or Rich Communication Services (RCS) (e.g., in the form of a "text message"). As shown in FIG. 4B, a GUI 400b requests that a user input the security code to confirm that he is associated with the telephone number.

The platform 150 compares the inputted security code to the one transmitted to the telephone number. If the security codes match, a GUI 400c requests that the user provide additional information regarding himself, including his name and a desired user name. When the user is satisfied with his entries, he selects a screen element 406 to confirm creation of his account.

If the security codes do not match, the GUI 400b can ask that the user re-input the security code (e.g., in case the user mis-entered the security code). In some implementations, the platform 150 can allow the user to input the security code a particular number of times (e.g., three). If the user is unable to provide a matching security code, the platform 150 can invalidate the security code, and require that the user request a new security code.

In some cases, the platform 150 can also transmit a cryptographic token to the user's device (e.g., alongside the security code). A user can validate his device by returning the cryptographic token to the platform 150 during the account registration process (e.g., alongside his submission of the security code). This can be beneficial, for example, as it ensures that only the user who requested the security code can redeem the security code during the account registration process.

After a user has created his account, the user can customize his account with personal information. Further, a user can view and modify his preferences and settings with respect to the platform 150.

Figures 5A, 5B, 5C:
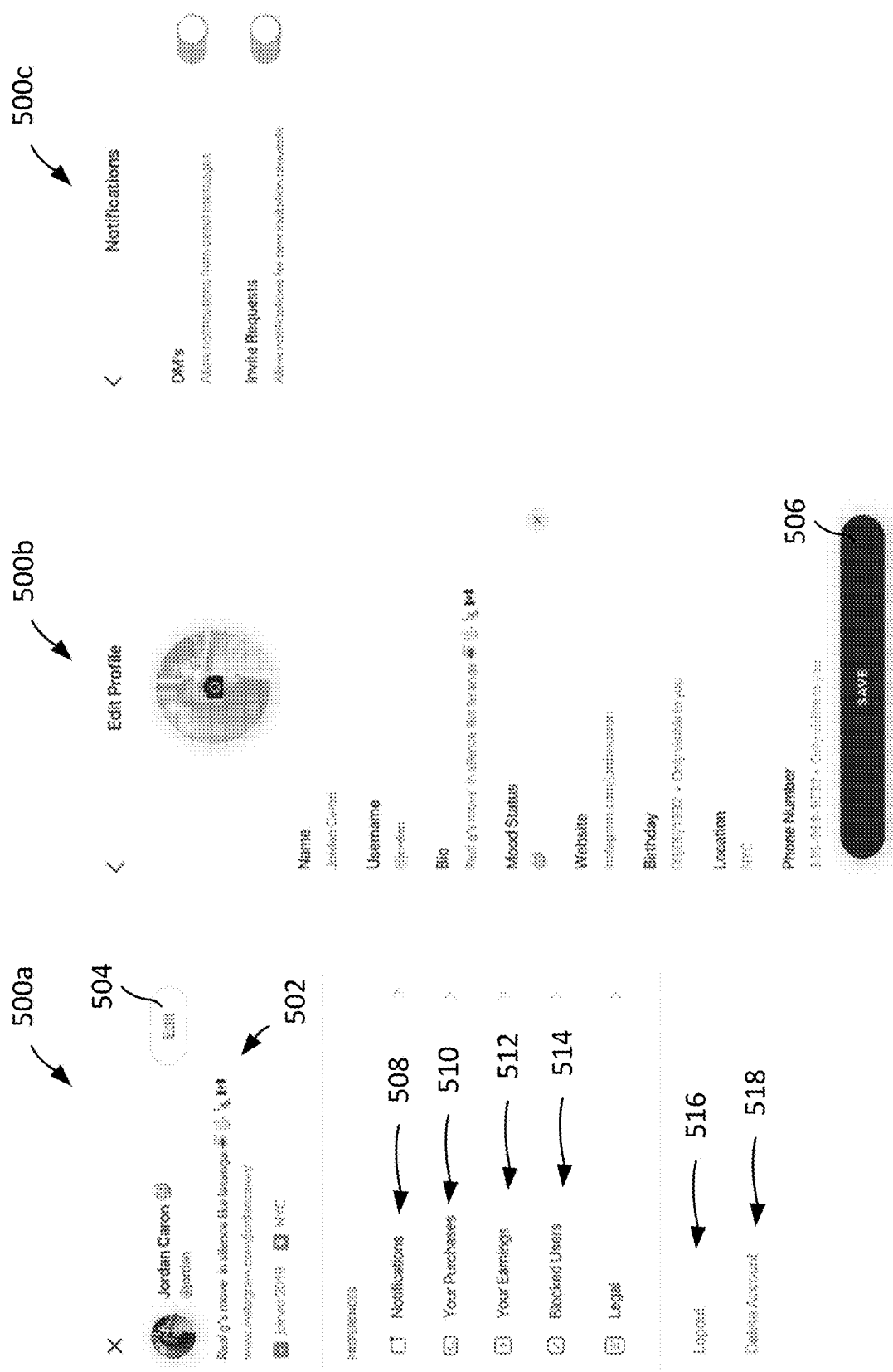
FIGS. 5A-5F are diagrams of example GUIs for viewing and modifying a user's account, preferences, and settings.

As an example, FIGS. 5A-4F show GUIs 500a-500f that can be displayed to a user to view and modify his account, preferences, and settings. The GUIs 500a-500f can be displayed, for example, on one or more of the client devices 104a-104c.

As shown in FIG. 5A, the GUI 500a displays a user profile 502 associated with the user. The profile 502 includes the user's full name, the user's user name on the platform 150, an identifying image (e.g., a personal photo), textual information regarding the user (e.g., information describing the user's "mood"), the user's website address, and the user's location. As another example, a user's profile can include an avatar or emoji for the user, which can be displayed to other users alongside the user's name (e.g., after the user's name). As another example, a user's profile can include information specifying the user's preferred pronouns (e.g., "he," "she," "they," etc.). Some or all of the information included in the user profile 502 can be presented to one or more other users of the platform 150.

In some implementations, at least some of a user's profile can be specific to a particular home. This information can be viewed by other users of the home, but can be hidden from users who are not associated with the home. For example, if a home pertains to a particular university, the profile of a first user of the home (e.g., a student of the university) can include information relating to that university, such as the user's a class year, the user's major, a list of university organizations for which the user is a member, etc. When a second user (e.g., another user who is also a student of the university, and is also associated with the home) views the first user's profile, the second user can view the information shared by the first user relating to the university. However, when a third user (e.g., another user who is not a student of the university, and is not associated with the home) views the first user's profile, the third user cannot view the information shared by the first user relating to the university.

A user can customize the information included in his user profile 502. As an example, a user selects a screen element 504 to indicate his desire to modify his user profile 502. In response, a GUI 500b displays a profile-editing interface. Using this interface, the user can input and/or edit the information contained in the fields of the profile editing interface (e.g., by inputting text, images, emojis, or other information). The user can also input and/or edit other information regarding the user, such as his birthday or age, and his telephone number. Further, the user can specify which information can be viewed by other users (e.g., "public" information), and which information should be hidden from other users (e.g., "private" information that is used for internal purposes, such as to determine a user's access with respect to age gates or other gates). When the user is satisfied with his entries, he selects a screen element 506 to confirm his entries.

As described in further detail below, certain features of the platform 150 depend on a user's age. For example, a user's ability to access certain logical structures may be restricted based on his age (e.g., access to a home or room may be restricted to those over the age of 18). In these circumstances, the platform 150 can use information regarding the user's birthday to regulate the user's access. In some implementations, the platform 150 can prevent the user from editing his birthday after entry (e.g., to prevent the user from circumventing access restrictions). In some implementations, the platform 150 can allow the user to edit his birthday a certain number of times (e.g., three), and subsequently prevent the user from making further changes to his birthday (e.g., to allow the users to correct initial mis-entries, while making it more difficult for a user to subsequently circumvent access restrictions).

As shown in FIG. 5A, the GUI 500a also enables users to modify his preferences and settings with respect to the platform 150. For example, the user can select a "Notification" screen element 508 to view and/or edit his preferences with respect to notifications that are sent to his device (e.g., from the platform 150). As shown in FIG. 5C, in response, a GUI 500c is presented showing the user's current notification settings. The user can enable or disable the receipt of notifications based on their type. For example, a user can specify that the platform 150 send a notification when he receives a "direct message" from another user, but not send a notification when another user sends him an invitation to a home. Direct messages and invitations are discussed in further detail below.

In some implementations, a user can specify certain times of the day that he wishes to receive notifications. For example, he can specify that he not receive any notifications between the hours of 10 PM and 8 AM. In some implementations, a user can specify notification preferences on a per-device basis. For example, he can specify that he receive certain types of notifications during certain hours of the day on a first device, and that he receive certain other types of notifications during certain other hours of the day on a second device.

Figures 5D, 5E, 5F:
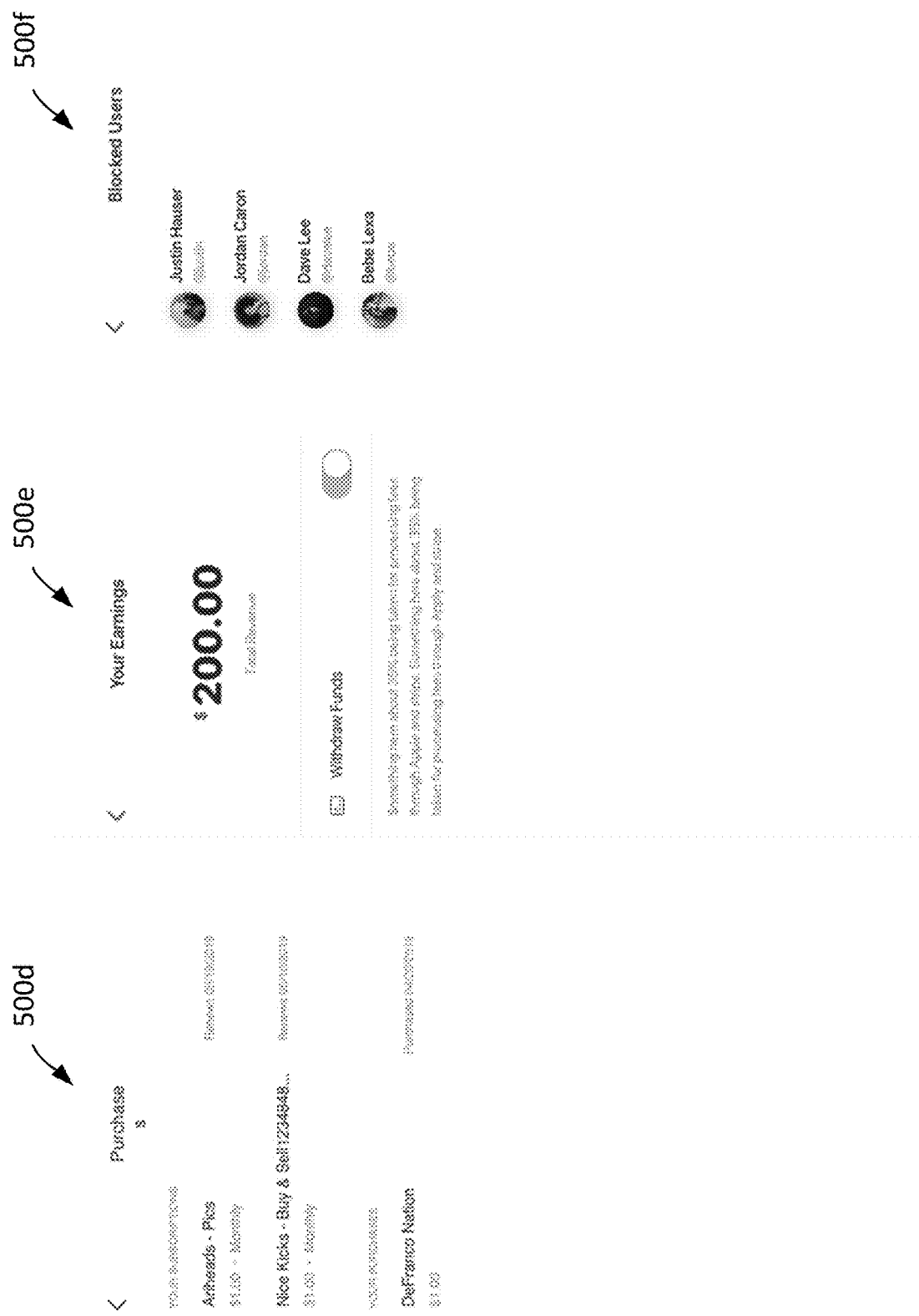

As shown in FIG. 5A, the GUI 500a also enables users to view purchases and other transactions that he has made using the platform 150. For example, the user can select a "Your Purchases" screen element 510 to view his purchase history. As shown in FIG. 5D, in response, a GUI 500d is presented showing the user's purchase history. Further, as shown in FIG. 5A, the GUI 500a also enables users to view earnings that he has made using the platform 150 (e.g., earnings resulting from purchases made by other users). For example, the user can select a "Your Earnings" screen element 512 to view his earnings history. As shown in FIG. 5E, in response, a GUI 500e is presented showing the user's earnings history. Purchases using the platform 150 are discussed in further detail below.

As shown in FIG. 5A, the GUI 500a also enables users to view and/or edit a list of blocked users (e.g., a list of users that cannot message or otherwise interact with the user). For example, the user can select a "Blocked Users" screen element 514 to view his list of blocked users. As shown in FIG. 5F, in response, a GUI 500e is presented showing the user's list of blocked users. The user can modify this list (e.g., by adding, revising, or deleting entries on the list).

In some implementations, a user can modify his account to specify certain privacy settings with respect to the platform 150. As an example, a user can specify whether his identity can be discovered by other users on the platform 150 (e.g., whether his user name and profile can be viewed by other users). As another example, a user can specify whether other users can send direct messages to him. Direct messages can be, for example, a message that is transmitted from one user to one or more other users, independent from a room or home. In some implementations, a user can specify globally that all users of the platform 150 can discover his identity and/or send him direct messages. In some implementations, a user can specify that only certain users of the platform 150 (e.g., other users that are associated with or have joined the user's logical structures) can discover his identify and/or send him direct messages. In some implementations, a user can specify that no users can discover his identity and/or send him direct messages.

In some implementations, a first user can share content in a logical structure (e.g., a home or a room) by inputting an "@" character, followed by a user name of a second user. In response, the platform 150 can generate a notification for the second user (e.g., notifying that he has been "mentioned" by the first user). In some implementations, the second user can specify that he not be notified when he is "mentioned" by a particular user (e.g., to "block" mentions by that user) or by any user (e.g., to block all mentions by other users).

As discussed above, the platform 150 can send notifications to one or more users to inform the user of events that have occurred on the platform 150. As an example, the platform 150 can send notifications in the form of visual messages (e.g., including text, images, videos, etc.), audio messages, or a combination thereof to the client devices 104a-104c. The platform 150 can send notifications in response to various events. As an example, the platform 150 can send notifications informing users that one or messages have been sent to the user, one or more content items (e.g., posts) have been added to logical structures associated with the user, one or more invitations have been sent to the user, the user has been mentioned in one or more posts, among other events.

A user can customize his account to specify certain notification settings with respect to the platform 150. For example, the user can specify whether he wishes to receive notifications while he is interacting with the platform 150 (e.g., while he is using a client application used to transmit and/or receive content from the platform 150). As another example, the user can specify whether he wishes to receive notifications while he is not currently interacting with the platform 150 (e.g., while his device is idle, or while he is using an application unrelated to the platform 150). Further, the user can specify the information that is contained within each notification. As an example, a user can specify that a notification include a summary of the event or "preview" information. For instance, if the notification is to inform the user that he received a message from another user, the notification can include a portion of the received message. As another example, a user can specify whether notifications should be provided in a message digest format. For instance, a user can specify that a notification be sent periodically according to a specified interval (e.g., daily, weekly, monthly, etc.) and include information summarizing certain events that occurred during that interval. For instance, a user can specify that he receive a weekly notification summarizing the "top" content or the content that other users have engaged with the most in the past week (e.g., the content having the most views, responses, up votes, shares, etc.). This can be beneficial, for example, in providing the user with relevant information without overwhelming the user with numerous notifications over a short period of time.

In implementations, a user can link his account with the platform 150 with one or more accounts with third-party systems (e.g., systems providing services different from those provided by the platform 150). As an example, a user can link his account to an account with a music streaming service, such that information regarding the user's usage of the music streaming service (e.g., songs played, playback history, current song being played, playlists, etc.) are shared with the platform 150. Some or all of this information can be presented as content in the platform 150. For example, other users can view a list of songs played by the user, and play the song themselves (e.g., either through the platform 150 directly, or through the music streaming service). As another example, other users can view playlists shared by the user, and play the songs in the playlist themselves.

In some implementations, a user can link his account with the platform 150 with one or more accounts with financial institutions (e.g., a bank, credit card issuer, etc.). This can be useful, for example, in enabling the user to conduct purchases and/or receive payment in connection with the platform 150.

As shown in FIG. 5A, the GUI 500a also enables users to logout of his account (e.g., by selecting the "Logout" screen element 516) or delete his account entirely (e.g., by selecting the "Delete Account" screen element 518). In some implementations, a user's account can be deleted on his behalf (e.g., by administrators of the platform 150 when the user has violated certain rules of conduct or terms of service, upon user's death, etc.). In some implementations, when a user has died, his account can be preserved as a memorial (e.g., with an icon or other indication that the user is deceased).

In some implementations, when a user opts to delete his account (or his account is deleted on his behalf), the platform 150 can delete some or all of the information described herein. In some implementations, content shared by the user with other users (e.g., posts and/or messages) can be preserved, while the content can be anonymized or pseudoanonymized (e.g., by deleting information identifying the user as sharing the content and/or replacing the identifying information with an anonymous pseudonym).

In some implementations, a user can request that some or all of the information about him that is stored by the platform 150 be transmitted to the user for review. For example, upon the user's request, the platform 150 can transmit to the user some or all of the account information maintained by the platform 150, the content shared by the user on the platform 150, messages sent and received by the user on the platform 150, etc. This can be useful, for example, in enabling the user to accurately track the type of information and the scope of information stored by the platform 150.

Creating Top-Level Logical Structures:

As described above, implementations of the communication platform 150 enable users to share content with one another in real-time or substantially real time. Further, users can create nested logical structures to compartmentalize the sharing of content, such that content is shared in specific contexts and/or with specific users. Logical structures can include, for example, one or more organizational units such as "homes," each home containing one or more organizational sub-units such as "rooms." Logical structures can be defined using software, hardware, or a combination thereof.

FIGS. 6A-6E show example GUIs 600a-600e that can be displayed to a user during a process for creating and accessing a top-level logical structure (e.g., a "home"). The GUIs 600a-600e can be displayed, for example, on one or more of the client devices 104a-104c.

Figure 6C:
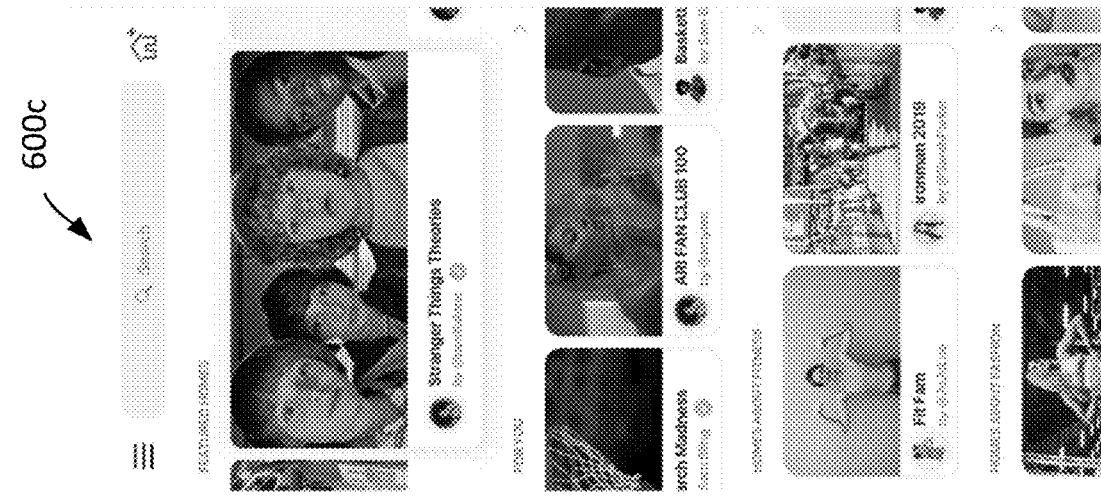
Figure 6B:
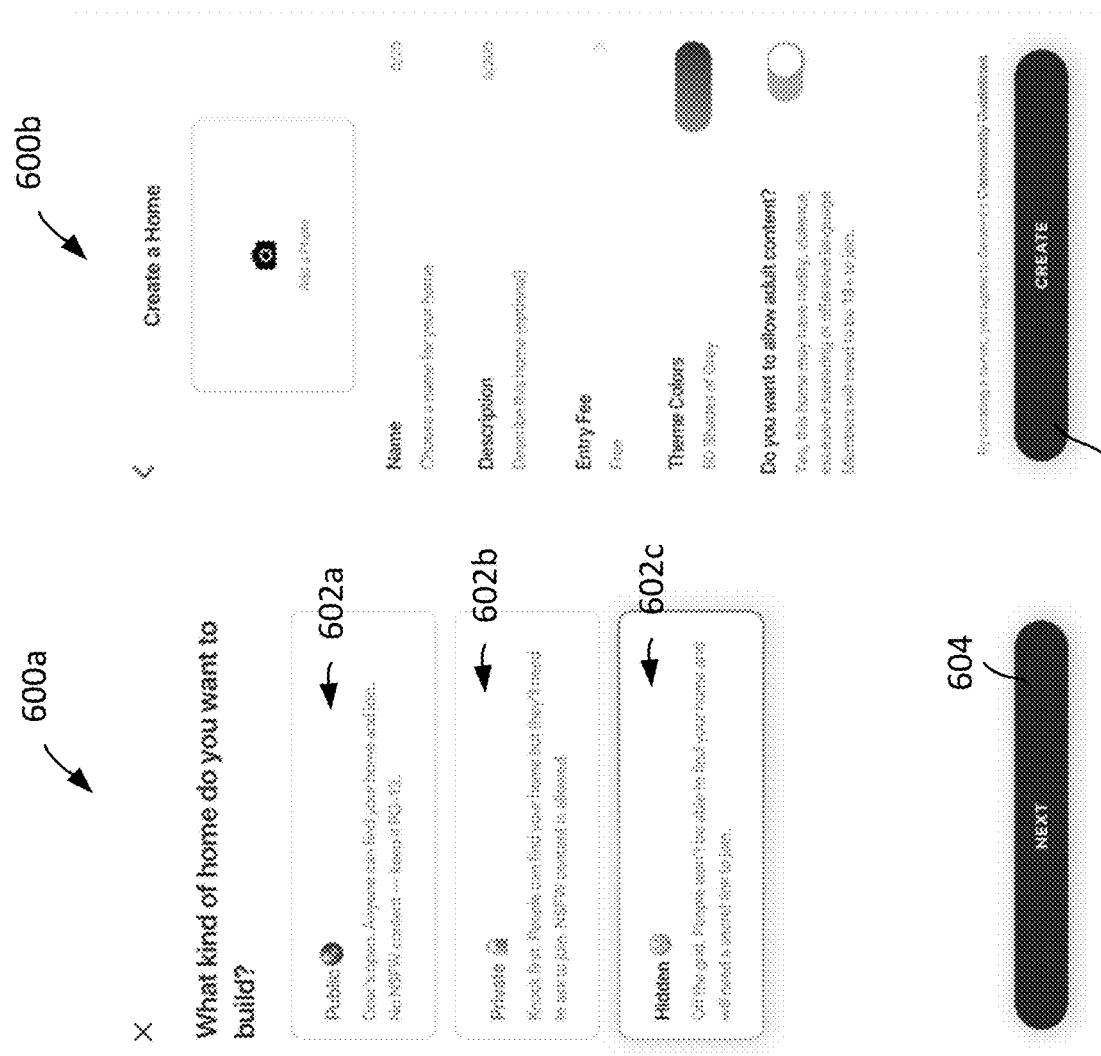
Figure 6A:
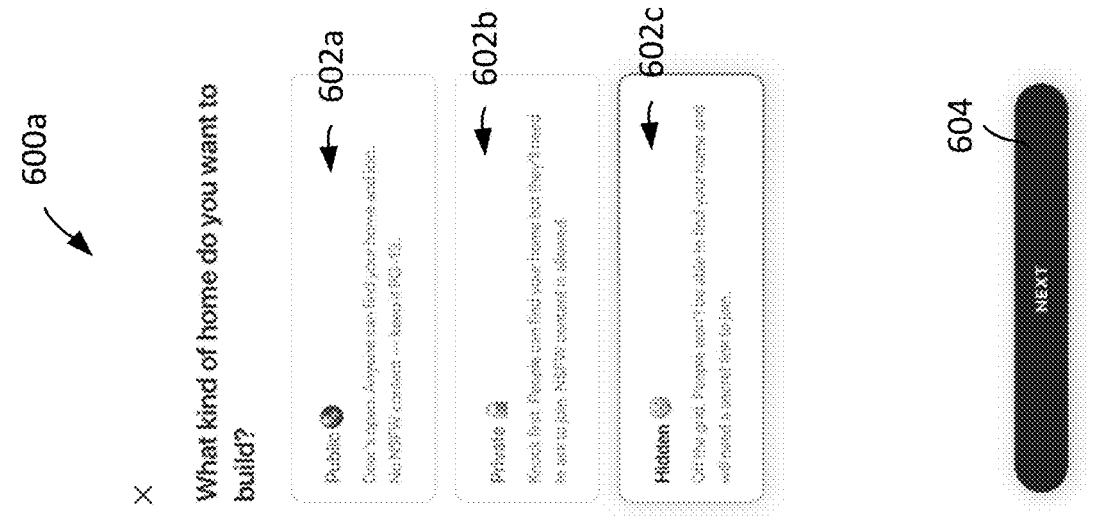

As shown in FIG. 6A, the GUI 600a displays several options for creating a logical structure. For example, a first option 602a enables a user to create a "public" logical structure (e.g., a logical structure that can be accessed by any user of the platform 150, subject to a block or ban list of the logical structure). This can be useful, for example, as it enables the creator or administrator of a logical structure (e.g., a "home owner") to publicize the logical structure and its contents to a wide audience.

As another example, a second option 602b enables a user to create a "private" logical structure (e.g., a logical structure that is visible to other users of the platform 150, but restricts access to those that have been permitted by a creator or administrator of the logical structure). This can be useful, for example, as it enables the creator or administrator of a logical structure to publicize the existence of the logical structure (e.g., such that others can discover the logical structure), but control the distribution of content within the logical structure to those that he has specifically given permission.

As another example, a third option 602c enables a user to create a "hidden" logical structure (e.g., a logical structure that is only visible to specifically invited users). This can be useful, for example, as it enables the creator or administrator of a logical structure to keep the existence of logical structure secret (e.g., to prevent unwanted attention from others).

After selecting one of the options 602a-602c, the user confirms his selection by selecting a screen element 604.

Referring to FIG. 6B, after the user confirms his selection, a GUI 600b is presented to the user. The GUI 600b enables the user to input information regarding the logical structure. For example, a user can provide an image for the logical structure, a name for the logical structure, and a description of the logical structure. Further, the user can specify whether a fee (e.g., monetary funds, tokens, or other forms of value) is required for users to access the logical structure. Further, the user can specify the appearance of the logical structure (e.g., a visual theme or layout for presenting content in the logical structure).

Further, the user can specify certain rules with respect to logical structure, such as whether adult content is permitted to be shared in the logical structure. In some implementations, adult content cannot be shared in publicly accessible logical structures, but can be shared in private or hidden logical structures (subject to the settings specified by the creator or administrator of the logical structure). In some implementations, once the creator of a logical structure has elected to allow adult content to be shared in a logical structure, this setting cannot be later changed with respect to that logical structure. Similarly, once the creator of a logical structure has elected to not permit adult content to be shared in a logical structure, this setting cannot be later changed with respect to that logical structure (e.g., so that users who have previously joined the logical structures are not later exposed to adult content). Access to logical structures that permit the sharing of adult content can be restricted or "gated," such that only certain users (e.g., those that are of a particular age or older) can enter. Additional information regarding access restrictions and gates are described below.

Once the user is satisfied with his input, the user confirms his input by selecting a screen element 606. In response, the platform 150 creates the logical structure based on the user's inputs. Further, if the user created a logical structure that is to be visible to other users (e.g., a "public" or "private" logical structure), the platform 150 can publicize the existence of the logical structure to other users. As an example, referring to FIG. 6C, a GUI 600c can be presented to one or more users after the creation of a logical structure. The GUI 600c displays information regarding a number of different logical structures, and enables users to select one of the logical structures for additional information. This allows users to "discover" logical structures that were created by other users, and join logical structures pertaining to subject matter that interests them.

In some cases, the platform 150 can present logical structures that are customized to a user's interests. For example, the platform 150 can generate the GUI 600c such that logical structures that may be of interest to the user (e.g., logical structures pertaining to a user's preferred subject matter) is prioritized and/or displayed more prominently. In some implementations, the platform 150 can identify the logical structures to which the user has already joined, and suggest additional related logical structures (e.g., those pertaining to similar subject matter or interests). In some implementations, the platform 150 can generate the GUI 600c such that certain curated logical structures (e.g., logical structures associated with a sponsor of the platform 150) is prioritized and/or displayed more prominently.

Figures 6D, 6E:
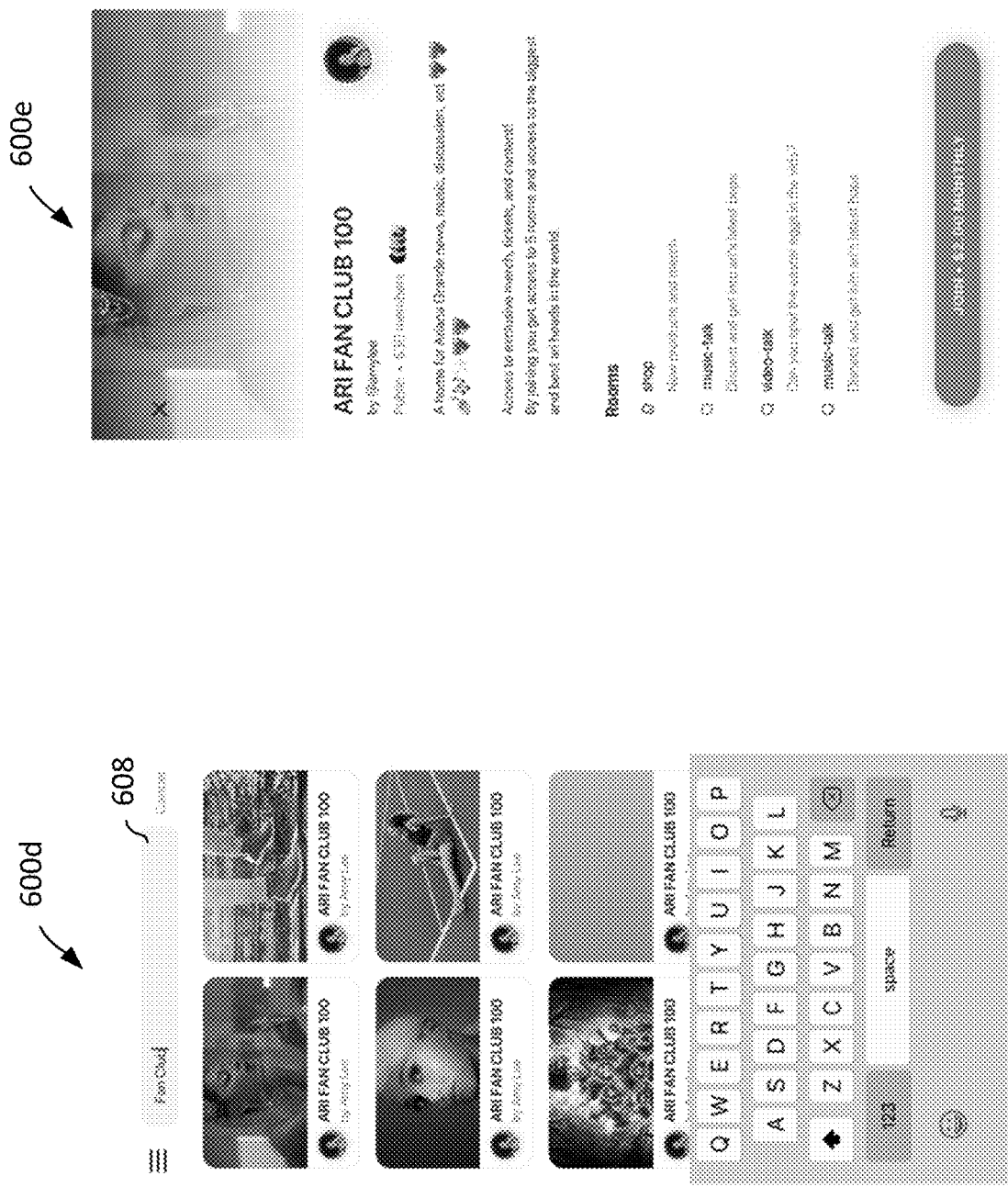

In some cases, the platform 150 can enable a user to search for logical structures to join. For example, referring to FIG. 6D, the user can input a search string into a search box 608 (e.g., "Fan Club"). In response, the platform 150 displays a GUI 600d showing logical structures matching the search string. As shown in FIG. 6E, upon the user selecting one of the presented logical structures, the platform 150 can display a GUI 600d enabling the user to view information regarding the logical structure and request access to the logical structure. In some implementations, the platform 150 can identify logical structures based on a match or similarity between the inputted search string and text information regarding the logical structures (e.g., the name of the logical structure, the description of the logical structure, the name of the creator or administrator of the logical structure, or other information).

In some implementations, a user can search for logical structures being specifying one or more filter criteria. For example, a user can instruct the platform 150 to return logical structures pertaining to a particular category of subject matter, have particular access restrictions (e.g., age gate, geo gate, pay gate, etc.), have particular rules regarding adult content, or any other criteria. In response, the platform 150 presents the logical structures matching the user's criteria to the user for selection.

Further, the creator or administrator of a logical structure can directly invite one or more other users to join his logical structure. As an example, referring to FIG. 6F, after the logical structure has been created, a GUI 600f is can be to the user. The user can select the "Invite" screen element 610 to invite specific users to his logical structure. In response, as shown in FIG. 6G, the GUI 600g is presented to the user. The GUI 600g displays several users in a list (e.g., the user's contact list). The user can select one or more users, and confirm his selections (e.g., by selecting the screen element 612). In response, the platform 150 transmits an invitation to join the selected logical structure to each of the selected users (e.g., in the form of a notification, e-mail, text message, chat message, or any other message).

Referring back to FIG. 6D, a user can also invite one or more other users to join his logical structure to providing those users with a "share link" (e.g., a web address that, when selected by a user, directs the user to a web page enabling him to join the logical structure). In some implementations, the share link can be presented in the form of a shortened Uniform Resource Locator (URL), which can be shared with other users using the platform 150 (e.g., in a message transmitted via the platform 150, such as a direct message between users, or in a chat message or post shared in a room) and/or through other forms of communications (e.g., text message, chat message, e-mail, webpage, etc. independent of the platform 150). In some implementations, the share link can be presented in the form of an access code, which the invited user can present to the platform 150 to accept the invitation (e.g., by inputting the code into an input box of GUI presented by the platform 150).

In some implementations, an invitation can be used by any number of users any number of times. In some implementations, an invitation can be limited to a limited number of users or times (e.g., one). For example, once a certain number of users have accepted an invitation, the invitation is no longer made available to other users. In some implementations, an invitation can be specific to a particular invited user, and cannot be accepted by other users.

In some implementation, an invitation can include a link or token that is specific to that invitation. In some implementations, a user can selectively revoke invitations (e.g., by specifying that the platform 150 invalidate certain links and/or tokens, such that they cannot be used by others). In some implementations, a user can selectively regenerate invitations (e.g., by specifying that the platform 150 regenerate links and/or tokens, such that they can be used by others). In some implementations, a user can specify that the platform 150 generate a file or other data structure containing multiple invitations (e.g., a comma-separated values (CSV) file listing each of the links and/or tokens). In some implementations, the user can specify that the platform 150 distribute the invitations according to a particular list of email addresses (e.g., a list of email addresses included in the CSV file).

In some implementations, a user can complete the process of joining a logical structure, either partially or entirely, using a general web browser (e.g., Google Chrome, Microsoft Internet Explorer, Mozilla Firefox, Apple Safari, etc.) instead of using a "native" application specific to the platform 150 (e.g., an "app" that is substantially dedicated to interacting with the platform 150). As an example, the user can select a share link and/or provide an access code to the platform 150 to access a web page enabling the user to join a particular logical structure. The user can view information regarding the logical structure on the web page, provide one or more answers to satisfy any "gate" requirements of the logical structure (e.g., as described in further detail below) using the web page, and/or perform any other steps to request and gain access to the logical structure. In some implementations, the user can provide payment information (e.g., to satisfy a "pay gate") using the web page, instead of using a native application specific to the platform 150.

Creating Nested Logical Sub-Structures:

As described herein, a user can create one or more nested logical sub-structures to organize and/or control content distribution with greater granularity. As an example, a user can create a "home," and nest one or "rooms" within the home. The user can customize each home and room according to his preferences. For example, he can enable certain users to access the home and share content within the home. Further, he can enable a first subset of those users to access a first room and share content within the first room, and enable a second subset of those users to access a second room and share content within the second room. Further, the user can customize each room, such that each room has a different theme, purpose, and/or set of rules.

FIGS. 7A-7D show example GUIs 700*a*-700*d* that can be displayed to a user during a process for creating and accessing a logical sub-structure (e.g., "rooms" nested within a "home"). The GUIs 700*a*-700*d* can be displayed, for example, on one or more of the client devices 104*a*-104*c*. Although FIGS. 7A-7D show example GUIs and processes for creating and assessing of an example type of logical sub-structure (e.g., a room for presenting chat messages), in practice, similar GUIs and processes can be used to facilitate the creation and assess of other types of logical sub-structures (e.g., audio rooms, video rooms, post rooms, etc.).

Figures 7A, 7B, 7C:
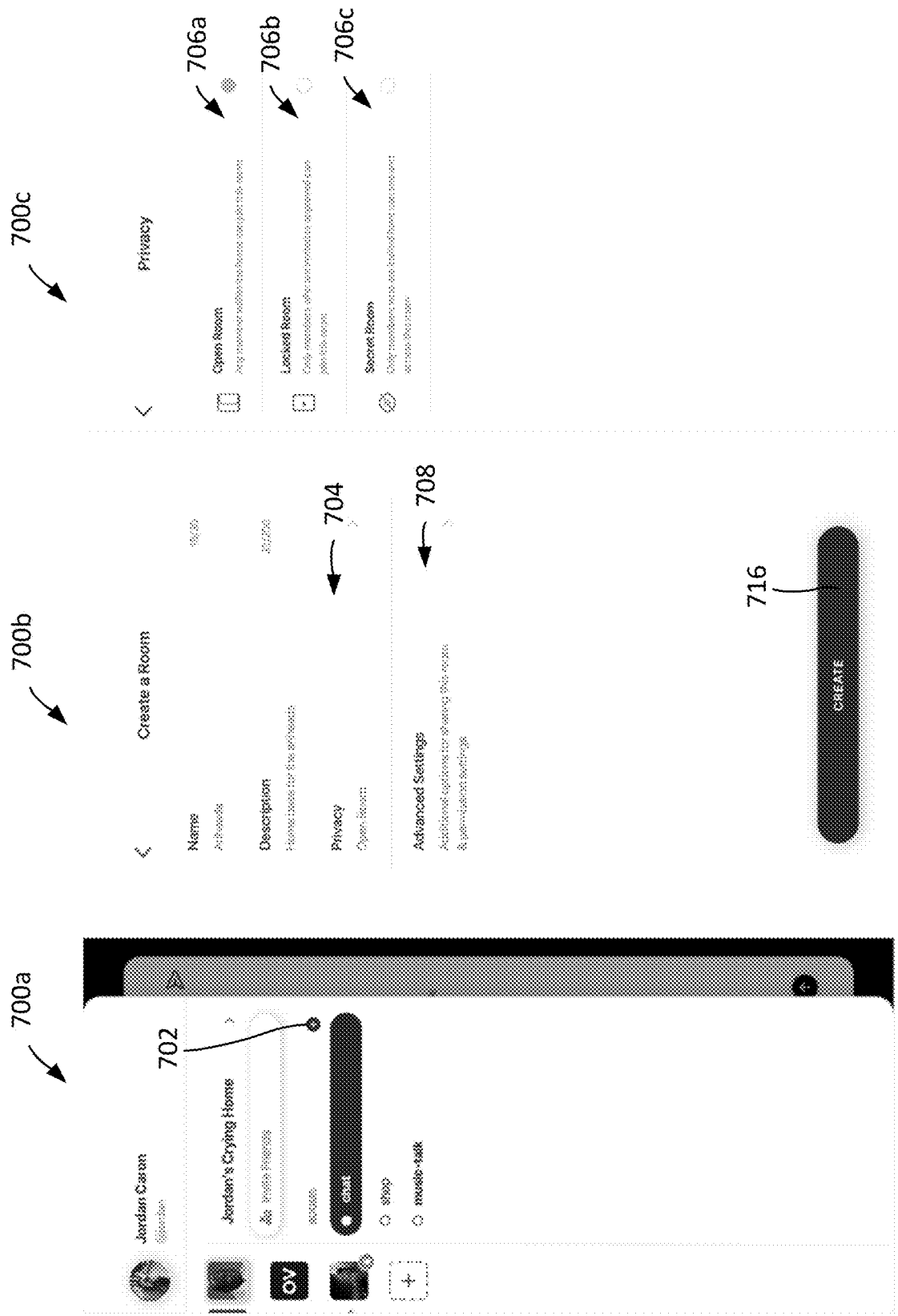

As shown in FIG. 7A, the GUI 700*a* displays an overview of a logical structure. For example, the GUI 700*a* indicates that the user is associated with a top-level logical structure "Jordan's Crying Home." Further, the GUI 700*a* indicates that several logical sub-structures nested within the top-level logical structure, including a "chat" room, "shop" room, and a "music-talk" room. A user can select one or more of the displayed logical sub-structures to enter them and view the content shared within them.

Further, the user can select a screen element 702 to create a new logical sub-structure within the top-level logical structure. In response, the user is presented with a GUI 700*b* for creating the new logical sub-structure. As shown in FIG. 7B, the GUI 700*b* enables the user to input information regarding the new logical sub-structure. For example, a user can provide a name for the logical sub-structure and a description of the logical sub-sub-structure. Further, the user can specify whether a fee (e.g., monetary funds, tokens, or other forms of value) is required for users to access the logical sub-structure.

Further, the user can specify privacy settings with respect to the logical sub-structure. For example, the user can select a "privacy" screen element 704. In response, as shown in FIG. 7C, the user is presented with a GUI 700*c* that displays several privacy options for the logical sub-structure. For example, a first option 706*a* enables a user to opt for an "open" logical sub-structure (e.g., a logical sub-structure that can be accessed by any user of the platform 150 that has access to the top-level sub-structure, subject to a block or ban list of the logical sub-structure). This can be useful, for example, as it enables the creator or administrator of a logical structure (e.g., a "home owner") to publicize a nested logical sub-structure and its contents to the same group of users who have access to the logical structure.

As another example, a second option 706*b* enables a user to opt for a "locked" logical sub-structure (e.g., a logical sub-structure that is visible to other users of the platform 150 who have access the logical structure, but restricts access to those that have been permitted by a creator or administrator of the logical structure). This can be useful, for example, as it enables the creator or administrator of a logical structure to publicize the existence of a nested logical sub-structure (e.g., such that others can discover the logical sub-structure), but control the distribution of content within the logical sub-structure to those that he has specifically given permission.

As another example, a third option 706*c* enables a user to opt for "secret" logical structure (e.g., a logical sub-structure that is only visible to specifically invited users). This can be useful, for example, as it enables the administrator of a logical structure to keep the existence of a nested logical sub-structure secret (e.g., to prevent unwanted attention from others).

Further, the user can specify additional options (e.g., "advanced" options) for further customizing the logical structure. For example, the user can select an "Advanced Settings" screen element 708. In response, as shown in FIG. 7D, the user is presented with a GUI 700*d* displaying a list of additional options that are available to the user, including the ability to share the logical structure (e.g., to create a "shared room" that can be accessed by members of another "home") or change the permissions settings for the logical structure.

For example, the user can select a "Room Permissions" screen element 710 to change the permissions settings for the logical structure. In response, as shown in FIG. 7E, the user is presented with a GUI 700*e* that displays several permissions options for the logical sub-structure. For example, a first option 712*a* enables a user to allow any user who has access to the logical sub-structure to submit content with respect to the logical sub-structure (e.g., any user having access to the logical sub-structure can create messages or posts in that logical sub-structure). As another example, a second option 712*b* enables a user to allow only the creator or administrator of the logical sub-structure (e.g., a "home owner") and specified hosts of the logical sub-structure to submit content with respect to the logical sub-structure. As another example, a third option 712*c* enables a user to allow only the creator or administrator of the logical sub-structure to submit content with respect to the logical sub-structure. In some implementations, a user can also specify other actions that can be performed by others with respect to the logical sub-structure. For example, the user can specify who can "pin" messages (e.g., prioritize or emphasize the display of certain content in the logical structure over others). As additional examples, the user can specify who can approve requests by other users to access the logical sub-structure, who can rescind other user's ability to access the logical sub-structure, who can make "announcements" to users of the logical sub-structure (e.g., messages that are transmitted to each of the users of a logical sub-structure), or who can perform other actions with respect to the logical sub-structure.

Referring back to FIG. 7D, the user can select a "Share this Room" screen element 714 to share the logical structure (e.g., to create a "shared room" that can be accessed by members of another "home"). In response, as shown in FIG. 7F, the user is presented with a GUI 700*f* that displays several other logical structures (e.g., "homes") with which he can share his logical structure. The user can select one or more of the displayed logical structures (e.g., by selecting the logical structures from the list and/or filtering the list by inputting a search string), and confirm his selection via the screen element 716.

Referring back to FIG. 7B, once the user is satisfied with his input, the user confirms his input by selecting a screen element 716 to create the logical sub-structure. Alternatively, referring to FIG. 7G, if user has opted to share his logical structure (e.g., to create a shared room), the user can confirm creation and sharing of the logical structure by selecting a screen element 718 in a GUI 700*g* (e.g., that is displayed in place of the GUI 700*b*). Users can access the newly created logical sub-structure, for example, using the GUI 700*a* shown in FIG. 7A (e.g., by selecting the logical sub-structure from a list).

Access Restrictions and "Gates":

As described herein, access to logical structures (e.g., homes and rooms) can be restricted according to one or more "gates," such that only certain users can enter and view the content shared within them. This can be beneficial, for example, as it enables the creators or administrators of logical structures to flexibly control their community of users and regulate the sharing of content within that community.

Access to logical structures can be regulated based on various criteria, either individually or in combination. For instance, access can be regulated based on the age of a user requesting access, information provided by the user, the geographic location of the user, and/or subject to fees (e.g., monetary funds, tokens, or other forms of value) provided by the user to the platform 150 and/or the creator or administrator of the logical structure. In some implementations, one or more criteria can be considered in conjunction prior to granting access to a user. For example, the creator or administrator of a logical structure can require that a user meet the requirements of multiple access gates prior to obtaining access to a logical structure.

Access can be regulated based on the age of a user requesting access (e.g., according to an "age gate"). As an example, a creator or administrator of a logical structure can specify that only users of a specific age or a range of within a range of ages be allowed access to the logical structure. As another example, a creator or administrator of a logical structure can specify a minimum age or a maximum age for users to gain access to the logical structure. This can be useful, for example, as it enables a user to selectively share content to other users of a particular desired demographic.

In some implementations, a user's access to a logical structure can be updated in real-time, based on his age. For example, if a logical structure only permits users under the age of 18 to access content, a user's access to the logical structure can be revoked by the platform 150 immediately upon the user turning 18 years of age. In some implementations, a user's access to a logical structure can be "grandfathered" in, despite him subsequently failing to meet the access requirements of the logical structure. For example, if a logical structure only permits users under the age of 30 to access content, a user that is 25 years of age can join the logical structure. Further, the user's access to the logical structure can be maintained by the platform 150, even after he turns 30 years of age. The creator or administrator of a logical structure can specify whether to enforce age requirements in real-time or to grandfather in existing users (e.g., at the time the logical structure is created, or after the logical structure has been created).

Age-based access restrictions can be enforced in various ways. As an example, if a user has specified a birth date when he created or revised his user account and profile (e.g., as shown and described with respect to FIGS. 5A-5F), the platform 150 can use the specified birth date to determine whether the user meets the access restrictions of a logical structure. The platform 150 can also display the age requirement to the user, such that user understands that the logical structure is subject to an age requirement.

Figure 8C:
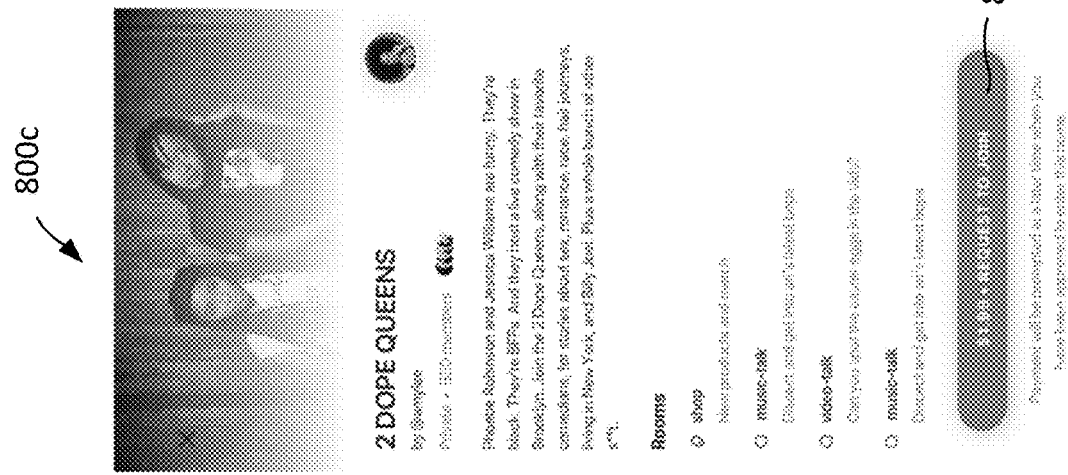
FIG. 8A-8C are diagrams of example GUIs for creating and accessing logical structures having access restrictions or "gates."
Figure 8B:
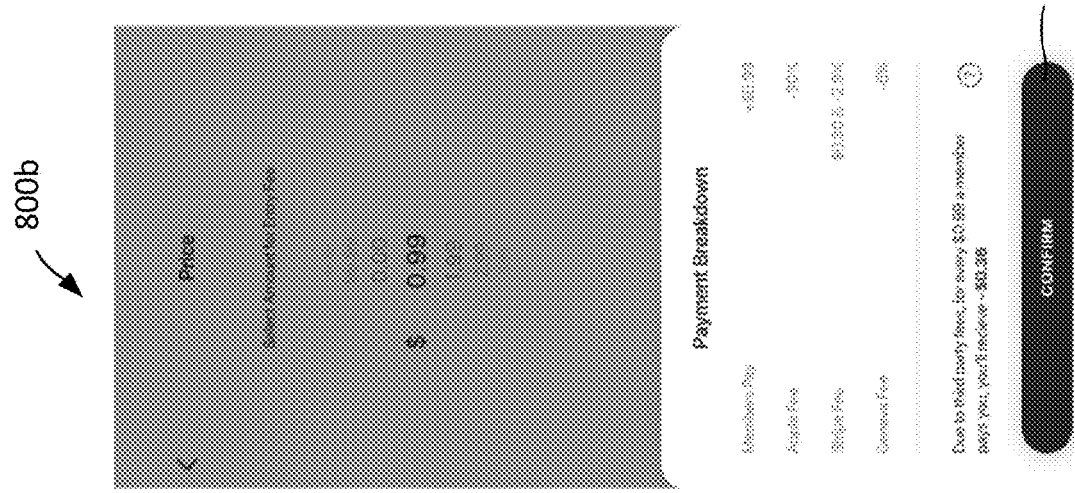
Figure 8A:
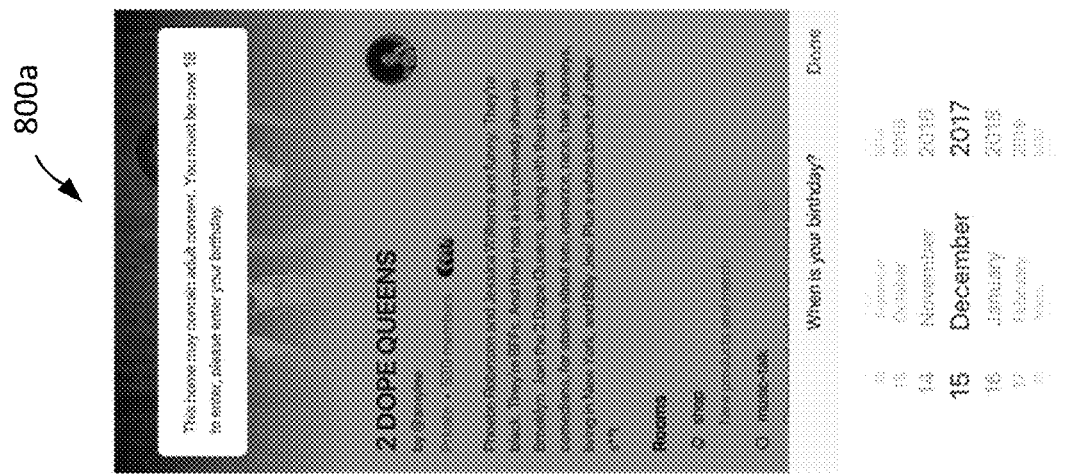

As another example, if the user has not specified a birth date in his user account and profile, the platform 150 can prompt the user to enter his birth date (e.g., by presenting a GUI 800*a* shown in FIG. 8A to the user via one or more of the client devices 104*a*-104*c*). Upon the user inputting his birth date, the platform 150 can populate the user's account and profile with the inputted information. Further, the inputted information can be used to determine whether the user meets the age requirements of the logical structure, as well as to determine whether the user meets the age requirements of any logical structure that he attempts to access in the future.

In some implementations, the platform 150 can globally restrict access to the platform 150 to users of a certain age of older (e.g., to meet certain government regulations). If a user inputs information indicating that they are not sufficiently old to use the platform 150, the platform 150 can display a notification to the user informing them of the age requirement and/or restrict access to that user.

Access can also be regulated based on information provided by the user (e.g., according to an "information gate" or "application gate"). For example, the creator or administrator of a logical structure can input one or more questions to be asked to a user requesting access to a logical structure, and specify that only users that provide particular answers to those questions be allowed access to the logical structure. This can be beneficial, for example, as it enables users to obtain detailed information regarding each user requesting access to a logical structure, and selectively grant access to those that meet certain requirements.

The platform 150 can accept various types of questions and/or answer formats. For example, the platform 150 can enable users to input one or more multiple-choice questions (e.g., a question having a question statement, followed by two or more discrete answers that can be selected by a user requesting access). As another example, the platform 150 can enable users to input one or more short answer or essay questions (e.g., a question having a question statement, followed by input box that accepts textual input from a user requesting access). As another example, the platform 150 can enable users to input one or more questions requiring a one-word response (e.g., a question having a question statement, followed by input box that accepts single-word textual input from a user requesting access). As another example, the platform can enable users to input a numeric answer. As another example, the platform can enable users to input an answer in the form of a date. As another example, the platform can enable users to input an answer in the form of "yes" or "no" response. As another example, the platform can enable users to input an answer in the form of a web address (e.g., a URL). As another example, the platform can enable users to input an answer in the form of a percentage.

As another example, the platform 150 can enable users to input one or more questions requiring a response according to a sliding scale. For example, a question can include a question statement, followed by sliding input element (e.g., a slide bar) that enables a user to specify an answer according to a sliding scale (e.g., "true" to "partially true" to "partially false" to "false," "very bad" to "bad' to "neutral" to "good" to "very good," or some other graduated scale). As users can interact with the sliding input to specify his response.

As another example, the platform 150 can enable users to request images, videos, and/or audio from the users requesting access. For example, a question can include a question statement, along with a mechanism for accepting image, video, or audio input (e.g., an upload dialog for providing image, video, and/or audio files).

As another example, the platform 150 can enable users to input one or questions requesting specific information from the user requesting access. This can include, for example, a telephone number of the user requesting access, an email address of the user, a mailing address of the user, a date associated with the access request, and/or access credentials of the user requesting access (e.g., a user name and password). As another example, the platform 150 can enable users to input one or more questions requesting a free-form essay from a user requesting access (e.g., an essay regarding why the user would like to join the logical structure).

In some implementations, a user can specify whether an answer to each question is required or optional. In these circumstances, when a user requests access to a logical structure, the platform 150 will require that he provide an answer to each required question before proceeding, while allowing the user to omit responses to the optional questions at his discretion.

In some implementations, the platform 150 can automatically evaluate some or all of the answers provided by the users requesting access to the logical structure. For example, the creator or administrator of a logical structure can provide acceptable answers (or ranges of acceptable answers) for each question. The platform 150 can automatically compare the answers provided by each of the users requesting access to the logical structure against the acceptable answers provided by the creator or administrator of the logical structure, and automatically grant access if the answers match to a sufficient degree (e.g., match exactly, match within a certain threshold percentage, etc.). In some implementations, the platform 150 can automatically evaluate free-form answers using automated machine learning (e.g., to evaluate the semantic meaning of free-form text provided by the users requesting access).

In some implementations, one or more users can manually evaluate some or all of the answers provided by the users requesting access to the logical structure. For example, the platform 150 can transmit inputted answers to the creator or administrator of a logical structure for evaluation. The creator or administrator of a logical structure can manually specify, based on the answers, whether to grant access to each user.

In some implementations, a creator or administrator of a logical structure can specify that a user requesting access be given a limited number of attempts to answer the questions (e.g., one, two, three, or more). If the user fails to provide adequate answers in the limited number of attempts, the user can be prohibited from further attempting to answer the questions and gain access. In some implementations, a creator or administrator of a logical structure can specify that a user requesting access be given an unlimited number of attempts to answer the questions. If the user fails to provide adequate answers, the user can continue attempting to answer the questions until he gains access.

In some implementations, some or all of the information provided by a user with respect to an information gate or application gate can be exported by the platform 150 as a separate record or data file (e.g., a CSV file), such that it can be reviewed independent of the platform 150.

In some implementations, some or all of the information provided by a user with respect to an information gate or application gate of a logical structure can be used to populate an entry in a member directory for that user for that logical structure. The entry can be viewed by one or more other users of that logical structure. For example, a home can pertain to national sorority organization, and can have an information gate or application gate inquiring about a user's university chapter. In response to the question, the user indicates that she attends "UPenn." If a user is granted access to the logical structure, an entry in the member directory can be generated for that user based on the user's answer (e.g., the entry can include a "campus" field indicating that the user attends "UPenn"). The entry for that user can be viewed by other users of the home.

Access can also be regulated based on the geographic location of a user requesting access (e.g., according to a "geo gate"). This can be useful, for example, as it enables a user to selectively share content to other users from selected neighborhoods, cities, states, regions, countries, or according to other geographical divisions.

As an example, a creator or administrator of a logical structure can specify that only users that are located at one or more specific geographical locations, or at a specific range of geographical locations (e.g., within a certain area or boundary) be permitted to access the logical structure. As another example, a creator or administrator of a logical structure can specify that only users that are connected to a specific communications network (e.g., a specific wireless network) be permitted to access the logical structure. When a user requests access to the logical structure, the platform 150 can determine the location of the user (e.g., using a location determining subsystem of a client device 104a-104c associated with the user, such as a global positioning system [GPS] receiver). The platform 150 can further compare the determined location to the location or locations specified by the creator or administrator of a logical structure, and selectively grant access based on the comparison (e.g., when the locations match).

In some implementations, a creator or administrator of a logical structure can specify that users must meet certain geographical location requirements only at the time they request access to the logical structure. For example, when a user requests access to the logical structure, the platform 150 can determine whether the user meets the geographical location requirements of that logical structure at that time. If so, the platform 150 can grant access to the user, and the user continues to have access even after he leaves the geographical location.

In some implementations, a creator or administrator of a logical structure can specify that users must meet certain geographical location requirements whenever they access the logical structure. For example, when a user attempts to access the logical structure, the platform 150 can determine whether the user meets the geographical location requirements of that logical structure. If so, the platform 150 can grant and maintain access to the user, so along as he continues to meet the geographical location requirements. In some implementations, the platform 150 can continuously or periodically check the location of the user (e.g., while he is accessing the logical structure) to determine whether the user continues to meet the geographical location requirements for access. If the user no longer meets the geographical location requirements for access, the platform 150 can revoke the user's access and inform the user of the revocation (e.g., through a visual and/or auditory notification).

Access can also be regulated subject to fees provided by the user to the platform 150 and/or the creator or administrator of the logical structure (e.g., according to a "pay gate"). For instance, the creator or administrator of a logical structure can require that users pay a particular fee (e.g., a one-time fee or a recurring fee) to gain access to the logical structure. The fee can be paid to a party associated with the platform 150 (e.g., the operators of the platform 150), to the creator or administrator of the logical structure, and/or to a payment processor (e.g., entirely to one party, or split between them according to a particular percentage share). This can be useful, for example, as it enables users to monetize use of the platform 150 and/or the logical structures, such that they can continue to provide services and support to their communities.

FIG. 8B shows an example GUI 800b that can be displayed to a user during a process for creating a logical structure (e.g., a home or a room). The GUI 800b can be displayed, for example, on one or more of the client devices 104a-104c, such as during the logical structure creation process (e.g., as shown as described with respect to FIGS. 6A-6E and 7A-7D). As shown FIG. 8B, the GUI 800b enables a user can specify the amount that each user must pay to gain access to a logical structure (or that no fee is required).

Further, the GUI 800b displays how the fees will be distributed amongst one or more parties. In this example, the GUI 800b indicates that, given a fee of $0.99, 30% of the fee would be provided to a first entity ("Apple"), $0.30 plus 2.9% of the fee would be provided to a second entity ("Stripe"), and 5% of the fee would be provided to the platform 150 ("Geneva"). The remainder of the fee can be distributed to the creator or administrator of the logical structure as proceeds of the transaction. Although an example fee distribution is shown in FIG. 8B, this is merely an illustrative example. In practice, a fee can be distributed amongst fewer or a greater number of parties, and/or according to different shares.

Once the user is satisfied with his input, the user confirms his input by selecting a screen element 802 to create the logical sub-structure.

Users seeking to access a logical structure having a payment requirement are notified of the requirement and are given the option to provide payment. As an example, FIG. 8C shows a GUI 800c that can be displayed to a user seeking to access a logical structure having a payment requirement. The GUI 800c can be displayed, for example, on one or more of the client devices 104a-104c. The GUI 800c provides a summary or description of the logical structure (e.g., in the form of text, images, videos, audio, and/or other types of content). Further, the GUI 800c identifies any logical sub-structures nested within the logical structure (e.g., rooms nested within a home). Further, the GUI 800c displays the requirements to access the logical structure, including the payment requirement. The user can select a screen element 804 to approve payment and to submit a request to access the logical structure.

The platform 150 enables users to specify the frequency by which fees must be paid to maintain access to the logical structure. For example, the creator or administrator of a logical structure can require that users pay a one-time fee for access. Once users have paid the fee (and met any other requirements for accessing the logical structure), the users have indefinite access to the logical structure. As another example, the creator or administrator of a logical structure can require that users pay a recurring fee (e.g., a "subscription" that recurs periodically, as such daily, weekly, monthly, annually, or according to some other time period). Users who have paid the fee for the subscription period (and met any other requirements for accessing the logical structure) are granted access to the logical structure during the span of the subscription period.

In some implementations, users can submit payments on behalf of other users, such that the other users are provided access to a logical structure (e.g., to "gift" access or a subscription to other users).

The platform 150 can also enable users to submit "donations" or "tips" to the creators or administrators of a logical sub-structure. For example, the platform 150 can enable users to provide one-time or recurring payments to the creators or administrators of a logical sub-structure, independent of any fees that are required to access the logical sub-structure. Users can elect, at their discretion, whether to provide these payments.

In some implementations, users can request refunds for payments made to gain access to logical structures. Upon being granted a refund (e.g., by an administrator of the platform 150 and/or the creators or administrators of logical structures), the user's access to the logical structures associated with the refunded payments is revoked.

In an example usage of a "pay gate," a first user Alice creates a top-level structure ("home") named "Wild Things." Further, she creates a payment gated logical structure ("room") named "Alice's Room" nested within "Wild Things," and is prompted by the platform 150 to specify the fee amount, the fee interval, a description of the sub-structure, and one or more images for the sub-structure. Once Alice is finished, the platform 150 notifies Alice that her request is being processed, and upon completion of the creation process, notifies her that the gated sub-structure has been processed and is active.

Once "Alice Room" is active, Alice adds content to "Alice's Room." As an example, she can submit one or more posts including images, videos, audio, and/or other types of content. Further, she can submit one or more posts advertising products and/or services for sale.

Other users can also join "Alice's Room." For example, a second user Bob can join the "Wild Things" logical structure, and request access to "Alice's Room." Because access to "Alice's Room" is subject to a pay gate, Bob must provide the required fee before the platform 150 will grant access to Bob. As an example, the platform 150 can present a "paywall" to Bob showing information regarding "Alice's Room" (e.g., a summary or description of "Alice Room," including one or more portions of text, video, audio, or other content). Further, the platform 150 can direct Bob to a payment interface (e.g., provided by a payment processor, such as Apple Pay, Google Checkout, or Stripe) to remit payment. In some cases, a payment processor can be selected from among a pool of payment processors based on the operating system or device that Bob used to access the platform 150. For example, if Bob used a device operating on the Apple iOS operating system (e.g., an Apple iPhone), the platform 150 can present Bob with a payment interface associated with Apple Pay. As another example, if Bob used a device running the Google Android operating system, the platform 150 can present Bob with a payment interface associated with Google Checkout. As another example, if Bob used a device running a desktop operating system (e.g., Apple macOS, Microsoft Windows, etc.), the platform 150 can present Bob with a payment interface associated with Stripe.

Information regarding the transactions conducted using the selected payment processor can be relayed to the platform 150. This can be performed using an application programming interface (API) provided by the payment processor. The exchange information can include, for example, the amount of the transaction, the time and day of the transaction, customer information regarding Bob, Bob's contact information, and other details of the transaction. The platform 150 can store a record of the transaction (e.g., in the form of a receipt of sale record). Further, the fee (or a portion thereof) is transmitted from the payment processor to the platform 150 and/or Alice.

Upon completion of the transaction, the platform 150 grants Bob access to "Alice's Room." Bob can enter "Alice's Room," view content shared within "Alice's Room" (e.g., posts shared by Alice and other users), and/or share content within "Alice's Room." If Alice specified that access to "Alice's Room" is subject to a recurring fee, Bob can be automatically assessed a payment according to the selected payment interval (e.g., via the selected payment processor). For example, Alice can specify that access of "Alice's Room" is subject to a particular monthly fee. Accordingly, Bob can be automatically assessed a monthly payment for each month of access.

After three months, Bob becomes dissatisfied with "Alice's Room," and asks that the selected payment process discontinue payment. Upon Bob's payment lapsing (e.g., at the end of the last paid period), the platform 150 revokes Bob's access to "Alice's Room." Bob can subsequently re-gain access by submitting further payments (e.g., in a similar manner as described above).

In some implementations, users attempting to access a logical structure must satisfy all of the "gate" requirements of that logical structure. For example, the platform 150 can restrict a user from accessing a logical structure, if the user fails to satisfy one or more of the gate requirements of that logical structure.

In some implementations, users may obtain access to a logical structure, even if he does not meet all of the gate requirements of that logical structure. For example, an administrator of the platform 150 and/or a logical structure can issue a "pass" (e.g., a token or other redeemable data item) to a user that permits him to bypass the requirements of a particular logical structure. The user can submit the token to the platform 150 to obtain access to the logical structure, even if he does not satisfy all of the gate requirements. In some implementations, a pass can be temporary. For example, a pass may permit a user to bypass the gate requirements of a logical structure for a particular amount of time (e.g., one month). Upon expiry of the pass, the user is no longer permitted to bypass the gate requirements of the logical structure, and must satisfy each of the gate requirements to maintain access.

In some implementations, the platform 150 can restrict users' access to logical structures based on one or more decision trees or other logic. For example, the platform 150 can request that the user provide an answer with respect to a first gate. Depending on the user's answer, the platform 150 can either ask the user to provide an answer with respect to a second gate, or provide an answer with respect to a third gate (e.g., a branch in a decision tree). The decision tree can branch one or more times, which each branch ending in a particular outcome (e.g., allow access or deny access). As another example, the platform 150 can request that user provide an answer with respect to several gates, and permit the user to access if he provides a particular combination of answers (e.g., a combination defined using Boolean logic). The decision tree and/or Boolean logic can be specified, for example, by the administrator of a logical structure.

In some implementations, a creator or administrator of a logical structure (e.g., a home or a room) can specify that the logical structure be "public." A public logical structure can be, for example, a logical structure that can be accessed by any user of the platform 150 (subject to certain exceptions, such as a list of banned users implemented by the administrators of the platform 150 and/or the logical structure). In some implementations, a public logical structure can be accessed by any user of the platform 150, even if the user has not logged onto the platform 150 and/or not created an account on the platform 150.

In some implementations, a creator or administrator of a logical structure (e.g., a home or a room) can specify that the logical structure operate according to a switchable "guest mode." When the logical structure is in the guest mode, the platform 150 can enable any user of the platform 150 to view the contents of the logical structure (subject to certain exceptions, such as a list of banned users implemented by the administrators of the platform 150 and/or the logical structure). In some implementations, a logical structure operating in the guest mode can be viewed by any user of the platform 150, even if the user has not logged onto the platform 150 and/or not created an account on the platform 150. Further, the creator or administrator off the logical structure can revert the logical structure to a "normal mode," such that access to the logical structure is restricted (e.g., according to one or more of the criteria described above).

Moderating Content and Users with Respect to a Logical Structure

Users can moderate the content within a logical structure, such that certain content shared by users is permitted, and other content shared by users is edited or deleted. Further, users can selectively allow certain users to access the logical structure and/or prohibit certain users from accessing the logical structure. This can be useful, for example, as it enables users to regulate the distribution and access of content with respect to the logical structure.

For example, the creator or administrator of the logical structure can personally moderate the content within the logical structure. Further, the creator or administrator of the logical structure can also nominate one or more users to moderate the content within the logical structure. Each of these users (e.g., the creator or administrator of the logical structure and/or the nominated hosts) can perform moderation functions with respect to the logical structure. For example, each user can selectively allow certain other users to access the logical structure (e.g., "whitelist" access for those users). As another example, each user can selectively prevent certain other users from accessing the logical structure (e.g., "blacklist" access for those users). As another example, each user can delete content shared within the logical structure (e.g., to delete impermissible or undesirable content). As another example, each user can delete or edit content shared within the logical structure (e.g., to remove impermissible or undesirable portions of content, while preserving other portions of the content).

FIGS. 9A-9L show example GUIs 900a-900l that can be displayed to a user during a process for moderating a top-level logical structure (e.g., a home). The GUIs 900a-900l can be displayed, for example, on one or more of the client devices 104a-104c.

Figure 9A:
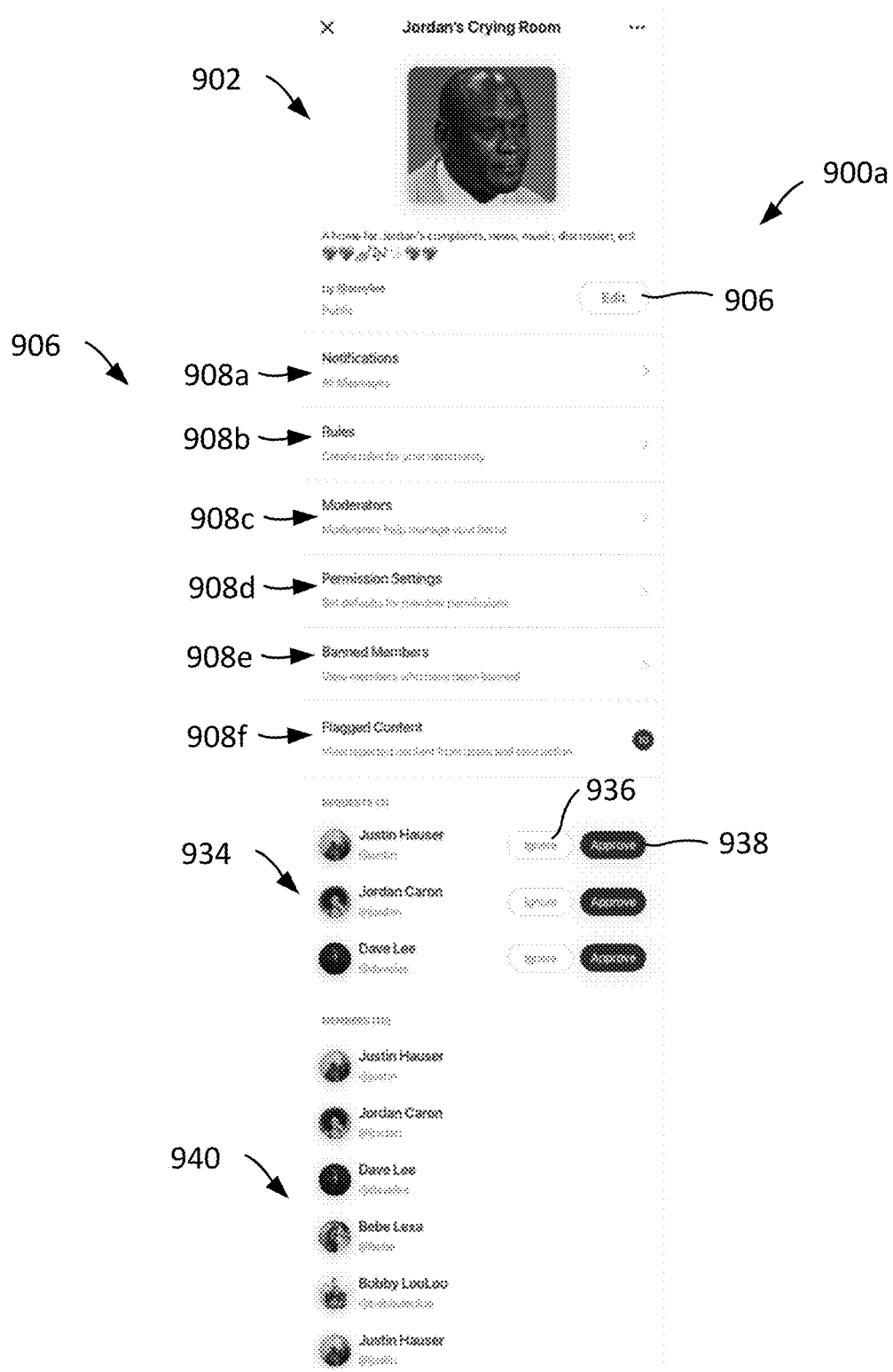

As shown in FIG. 9A, the GUI 900a displays an overview of a logical structure. The GUI 900a can be displayed, for example, to the creator or administrator of the logical structure, or to a host of the logical structure to assist him to moderating the logical structure.

The GUI 900a includes a first portion 902 that displays information regarding the logical structure. As an example, the first portion 902 can include an image associated with the logical structure, a textual description of the logical structure, an indication of the user that created or is administering the logical structure, and privacy settings associated with the logical structure (e.g., whether the logical structure is public, private, hidden, etc.). A user can edit the logical structure by selecting a screen element 904, and updating the information associated with the logical structure (e.g., using an interface similar to that shown in FIG. 6B).

The GUI 900a also includes a second portion 906 that displays various options that can be selected by the user to customize how he receives notifications from the logical structure. As an example, the second portion 906 can include an option 908a to view notifications settings associated with the logical structure. As an example, a user can specify that he receive a notification from the platform 150 whenever a content item is shared in the logical structure. As another example, a user can specify that he receive a notification from the platform 150 when certain types of content are shared in the logical structure (e.g., content in which the user is "mentioned" or referenced by another user). As another example, a user can specify that he not receive notifications from the platform 150 in connection with the logical structure (e.g., "muting" a logical sub-structure).

As another example, the second portion 906 can include an option 908b to view and/or modify a "welcome" message associated with the logical structure. As an example, the welcome message can include one or more rules of the logical structure (e.g., a code of conduct), hyperlinks to webpages or other logical structures of interest, or a combination thereof. A user can input the welcome message in the form of text, images, audio, video, or a combination thereof. In some implementations, the welcome message can be displayed to a user when he first accesses the logical structure.

Figures 9B, 9C, 9D:
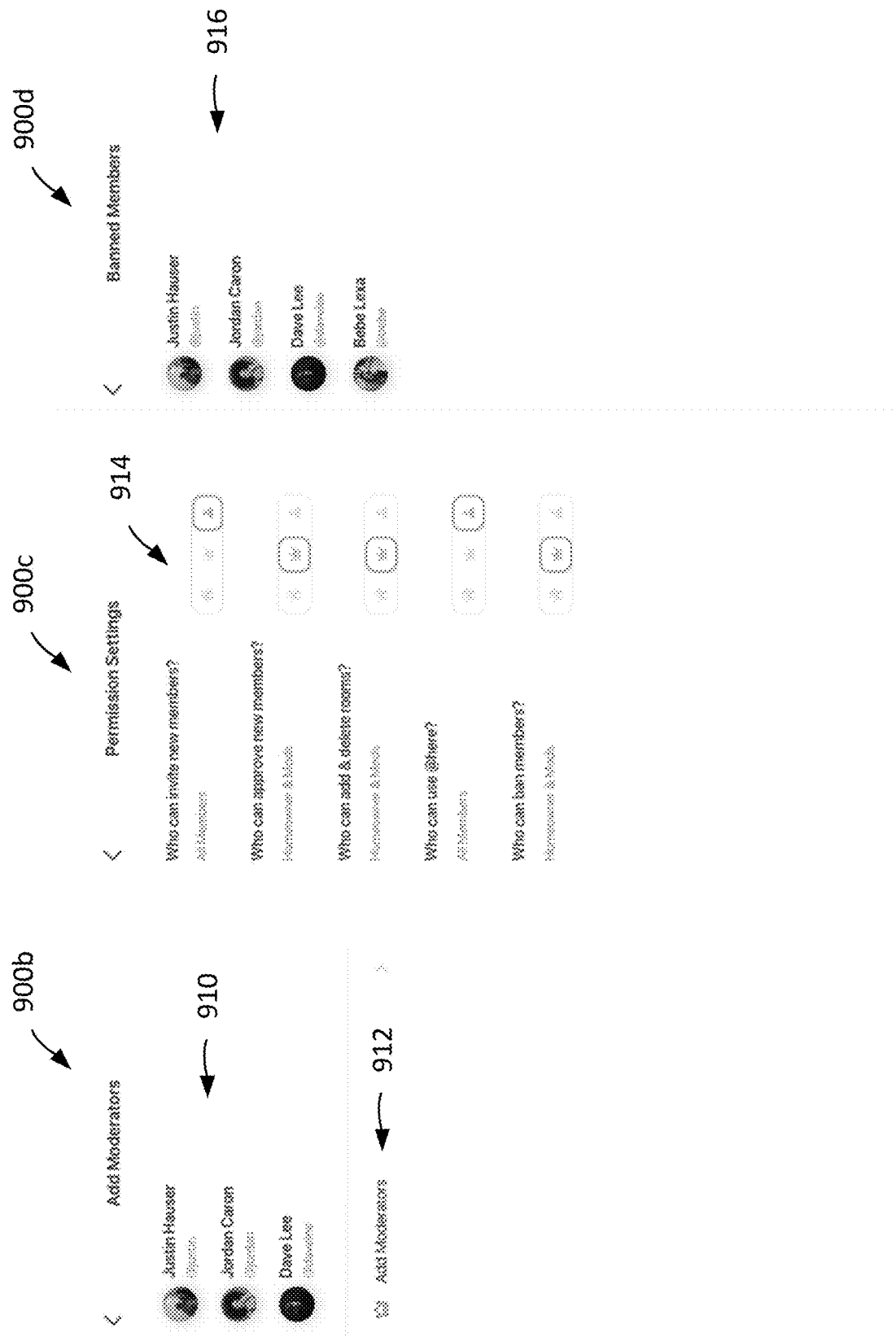

As another example, the second portion 906 can include an option 908c to change the roles of users that are associated with the logical structure. For example, upon selecting the option 908c, the user can be presented with a GUI 900b, as shown in FIG. 9B. The GUI 900b displays a list 910 of each of the users that are currently associated the logical structure having a "host" role. A user can change the role of a user from "host" to a "member" (e.g., having reduced or no moderation abilities) by selecting a user from the list, and inputting a command to change the role of the user to a member instead). A user can also change the role of a user from a member to a host (e.g., by selecting a screen element 912, and inputting the user names of one or more users to be changed to a host role). The platform 150 grants and/or revokes moderation privileges to users based on the selections.

Referring back to FIG. 9A, the second portion 906 can include an option 908d to view and/or modify permission settings associated with the logical structure. For example, upon selecting the option 908d, the user can be presented with a GUI 900c, as shown in FIG. 9C. The GUI 900c displays a list 914 of permissions settings for the logical structure. For example, the user can specify who can invite new users to join the logical structure (e.g., all users associated with the logical structure, selected users such as the creator or administrator of the logical structure and its hosts, or only the creator or administrator of the logical structure). As another example, the user can specify who can approve access requests from users attempting to access the logical structure. As another example, the user can specify who can create new logical sub-structures within the logical structure. As another example, the user can specify who can "link" or "mention" other users to shared content, such that the other users are notified by the platform 150 the shared content (e.g., by posting content using an "@" character, followed by a user name of another user). As another example, the user can specify who can ban users from the logical structure, such that they can no longer access it or the content shared within it (e.g., for a set period of time, or indefinitely until the ban is reversed). For each option, the user can select from various groups of users, such as all of the users associated with the logical structure, a subset of selected users (e.g., the creator or administrator of the logical structure and its hosts), a narrower subset of users (e.g., only the creator or administrator of the logical structure), or no users at all.

Referring back to FIG. 9A, the second portion 906 can include an option 908e to view and/or modify a list of users that have been banned from accessing the logical structure. For example, upon selecting the option 908e, the user can be presented with a GUI 900d, as shown in FIG. 9D. The GUI 900d displays a list 916 of each of the users that are currently banned from accessing the logical structure. A user can remove users from the list (e.g., by selecting a user from the list, and inputting a command to delete the selected user). A user can also add users to the list (e.g., by selecting an appropriate command and inputting the user names of one or more users to be added to the list). The platform 150 grants and/or revokes access privileges to users based on the selections.

Referring back to FIG. 9A, the second portion 906 can include an option 908f to view content that has been flagged by other users (e.g., content that has been reported by others as impermissible or undesirable). The user can take action with respect to the flagged content (e.g., by deleting or reviewing the content) or decline to take action.

Users can flag content in various ways. As an example, referring to FIG. 9E, a user can flag content by selecting the content (e.g., selecting a post displayed in the logical structure), and selecting a screen element 918 to flag the content for review by a host of the logical structure and/or an administrator of the platform 150. As another example, a user can select a user that has shared content, and select an option to flag the user and his shared content for review by hosts of the logical structure and/or an administrator of the platform 150. As another example, a user can select a logical structure, and select an option to flag the logical structure and the content shared within it for review by hosts of the logical structure and/or an administrator of the platform 150.

Figure 9G:
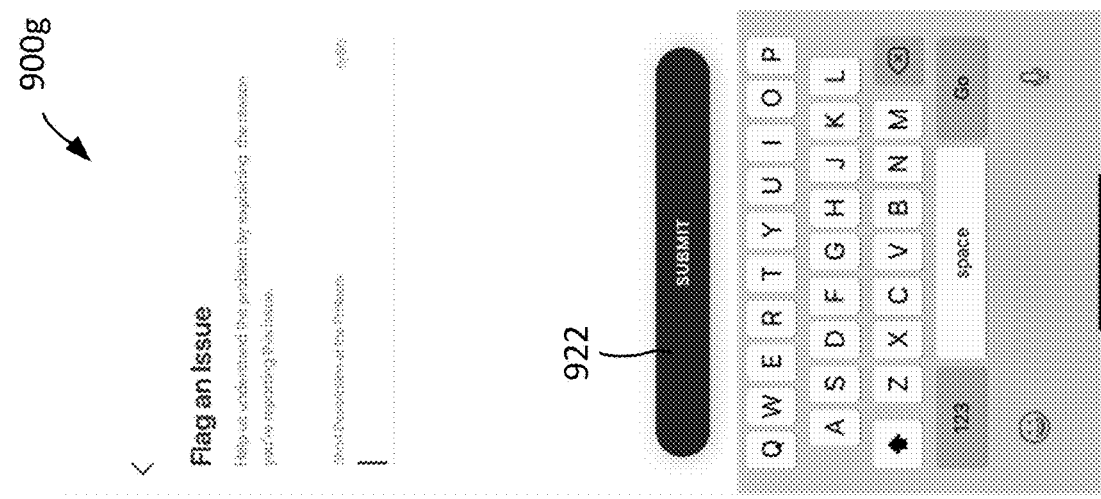
Figure 9F:
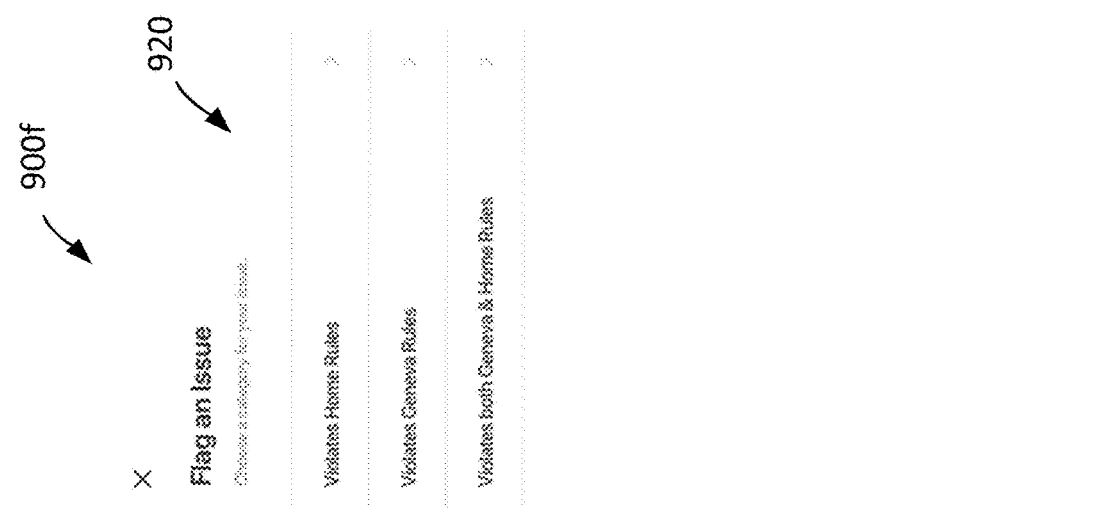
Figure 9E:
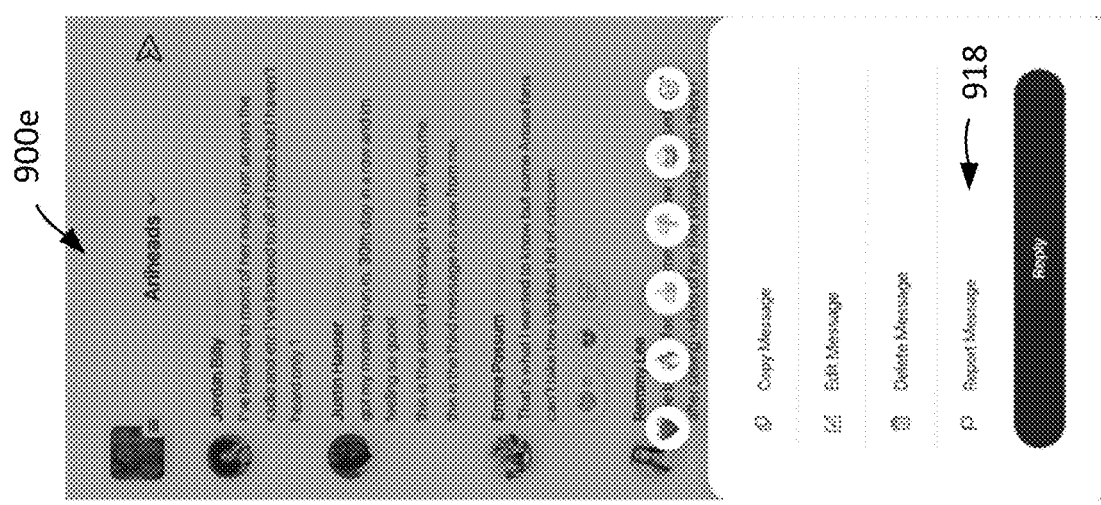

In some implementations, the user can also provide information regarding why he flagged the content. For example, referring to FIG. 9F, after flagging a content for moderation, the user can be presented with a GUI 900f displaying a list of possible reasons for flagging the content (e.g., the content violates the rules of the logical structure and/or the rules of the platform 150). Referring to FIG. 9G, after the user selects a reason from the list 920, the user can be presented with a GUI 900g requesting further information (e.g., a free-form description of the perceived issue). When the user is satisfied with his entries, he selects a screen element 922 to confirm his report.

Hosts of the logical structure and/or administrators of the platform 150 can view the content that has been flagged by others, and can take action with respect to the flagged content. For example, upon selecting the option 908e shown in FIG. 9A, a user can be presented with a GUI 900h, as shown in FIG. 9H. The GUI 900h displays a list 924 of each content item that has been flagged by other users of the logical structure and requires action by a host. The user can select one or more of the displayed content items to review the content item and take action.

For example, upon selecting an item on the list 924 corresponding to a flagged message, the user can be presented with a GUI 900i, as shown in FIG. 9I. The GUI 900i displays the flagged content item (in this example, an image), and additional information to assist the user in evaluating the content (e.g., information regarding why the content was flagged, who flagged the content, etc.). The GUI 900i also allows the user to either ignore the report (by selecting an "Ignore" screen element 926) and allow the content to remain, or remove the content from the logical structure (by selecting a "Remove" screen element 928). If the user opts to ignore the report, the platform 150 preserves the content in the logical structure, and continues displaying it to other users of the logical structure. If the user opts to remove the flagged content, the platform 150 removes the content from the logical structure, such that it is no longer displayed to users of the logical structure. In both cases, the content item is removed from the list 924.

As another example, upon selecting an item on the list 924 corresponding to a flagged message, the user can be presented with a GUI 900j, as shown in FIG. 9J. The GUI 900j displays the flagged content item (in this example, text), and additional information to assist the user in evaluating the content (e.g., information regarding why the content was flagged, who flagged the content, etc.). Similarly, the GUI 900j also allows the user to either ignore the report or remove the content from the logical structure. If the user opts to ignore the report, the platform 150 preserves the content in the logical structure, and continues displaying it to other users of the logical structure. If the user opts to remove the flagged content, the platform 150 removes the content from the logical structure, such that it is no longer displayed to users of the logical structure. In both cases, the content item is removed from the list 924.

In some implementations, the platform 150 can require that certain users respond to reported content within a certain period of time after it is reported. For example, if a user flags content has violating the rules of a logical structure, the platform 150 can may require that a creator of administrator of the logical structure (or a nominated host) act on the report within 24 hours, or be sanctioned by the platform 150. In some implementations, when a user and/or his shared content has been flagged and acted upon (e.g., edited and/or deleted), the user can be sanctioned by the platform 150. In some implementations, a user can be sanctioned according to an escalating scale. For example, after an initial violation, the platform 150 can give the user a warning. After a second violation, the platform 150 may ban the user from accessing the platform 150 for a period of time (e.g., 24 hours). After a third violation, the platform 150 may ban the user from accessing the platform 150 indefinitely.

Figures 9K, 9L:
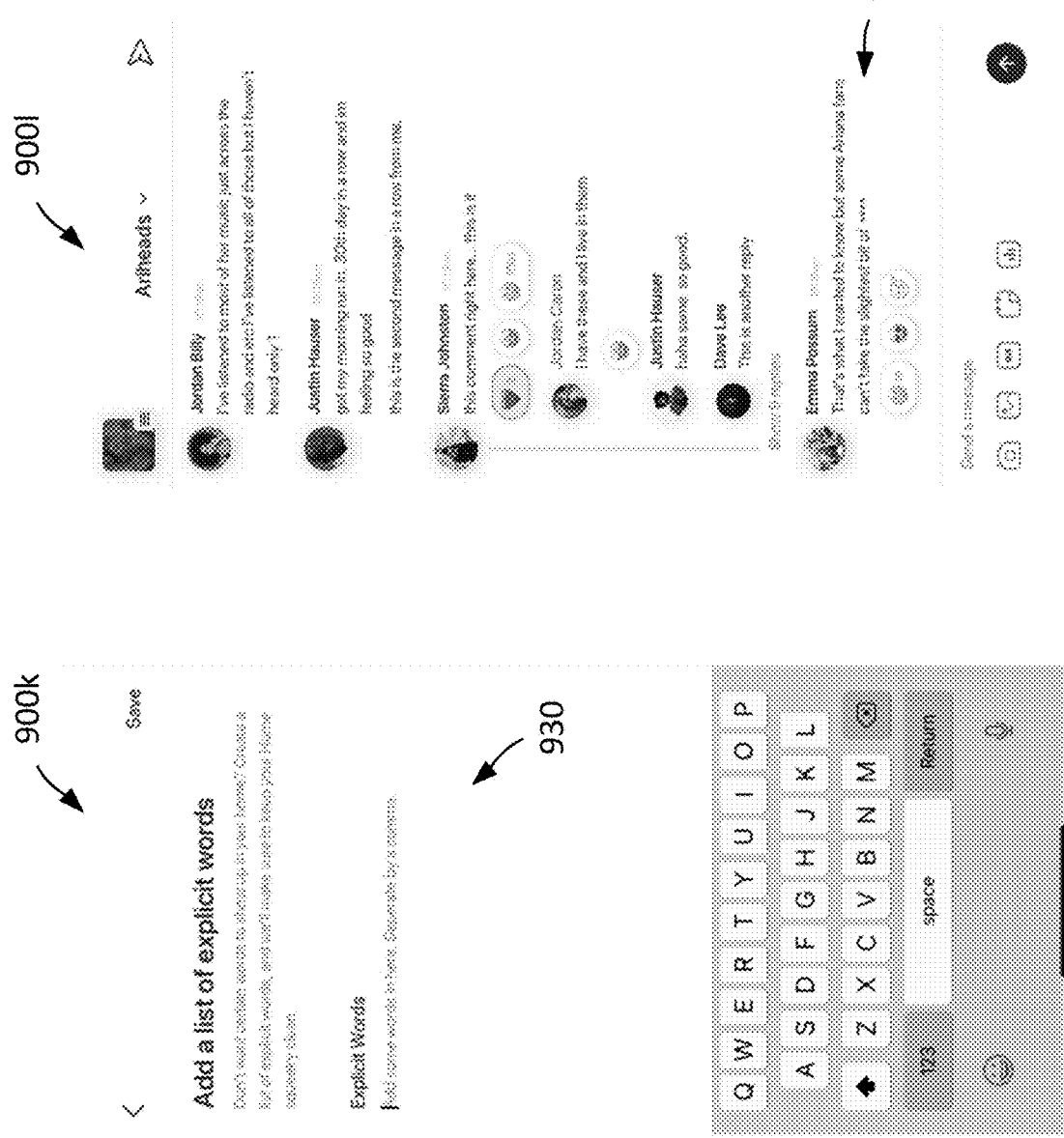

In some implementations, the platform 150 can automatically perform certain moderation operations based on rules provided by the creator or administrator of a logical structure and/or his nominated hosts. For example, referring to FIG. 9K, a user can provide the platform 150 with a list of prohibited words (e.g., explicit words) that are not permitted to be used within a logical structure (e.g., by inputting those words into an input box 930). The platform 150 can automatically remove or censor those words from the content shared within the logical structure. For example, FIG. 9L shows a GUI 900l displaying content shared within a logical structure. The content item 932 includes a word that has been identified as prohibited by a host of the logical structure. Accordingly, the platform 150 has automatically censored that word (e.g., by replacing the word with a series of asterisks). This can be beneficial, for example, as it preserves the non-offending portions of the content, while selectively removing the portions of the content that might be offensive to others.

Referring back to FIG. 9A, the GUI 900a also includes a third portion 934 that displays a list of users that have requested access to the logical structure. The user can ignore the request (e.g., by selecting an "Ignore" screen element 936) or approve the request (e.g., by selecting an "Approve" screen element 938). If the user opts to ignore the request, the platform 150 prevents the user who submitted the request from accessing the logical structure. If the user opts to approve the request, the platform 150 grants access to the user who submitted the request. In both cases, the content item is removed from the list of requests in the third portion 934.

Referring back to FIG. 9A, the GUI 900a also includes a fourth portion 940 that displays a directory of users that have access to the logical structure and/or have opted to join the logical structure (e.g., a list of users that are "members" of the logical structure). In some implementations, a directory can include general information regarding a user (e.g., the user's name). Further, as described above, a directory can include information regarding a user that is specific to the logical structure (e.g., information provided in response to an information gate or application gate). For example, if the logical structure relates to a university, the directory can include information regarding the user's status at the university (e.g., the user's class year, major, university organizations for which the user is a member, etc.). A user can select another user from the list to view additional information regarding the selected user (e.g., profile information, contact information, etc.).

Figure 10A:
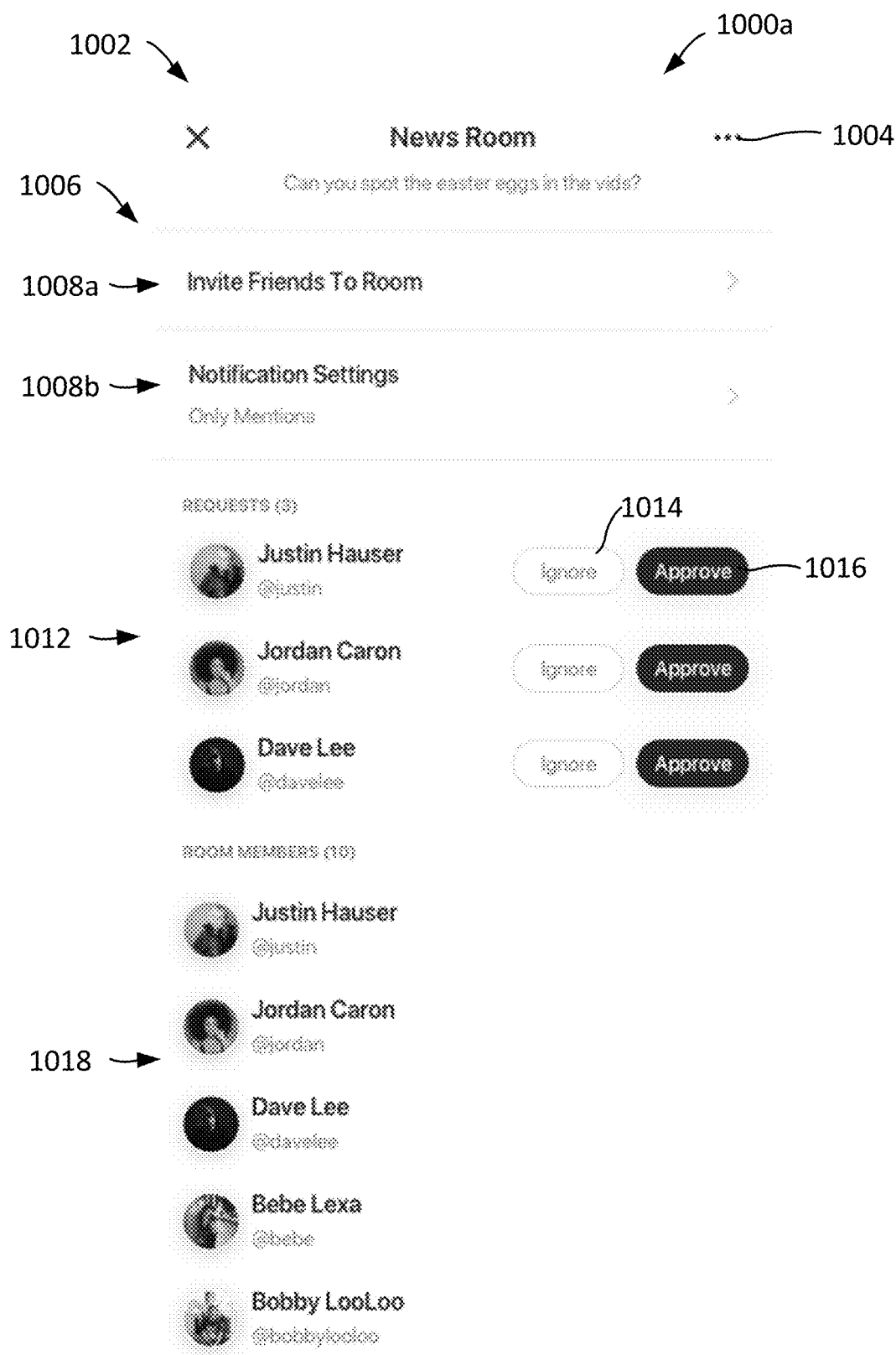
FIGS. 10A-10C are diagrams of example GUIs for moderating a logical sub-structure nested within a logical structure.
Figures 10B, 10C:
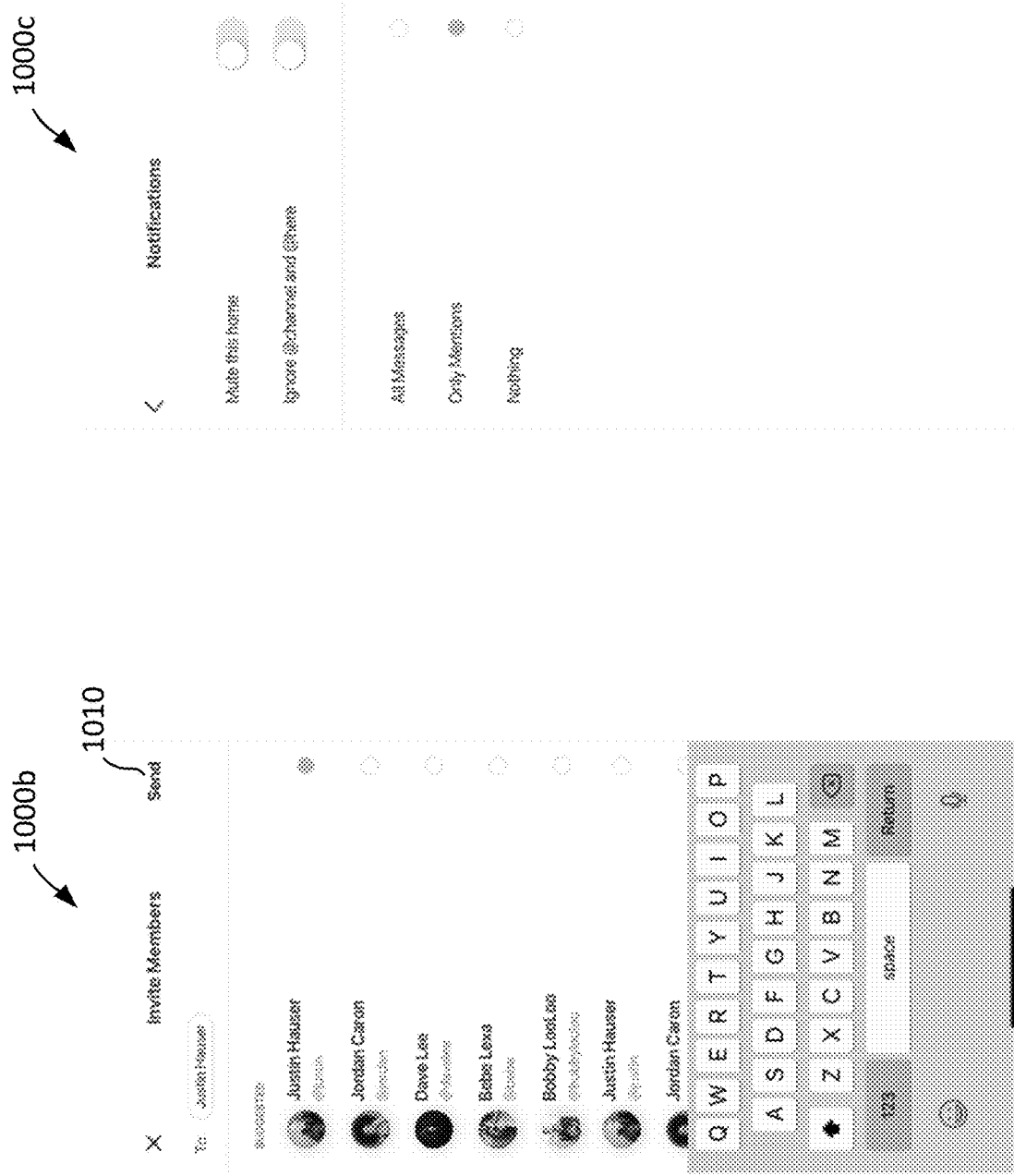

Users can also moderate logical sub-structures in a similar manner as with top-level logical structures. In some cases, logical sub-structures can be moderated in a similar manner as shown and described with respect to FIGS. 10A-10C show GUIs 1000a-1000c that also can be displayed to a user during a process for moderating a logical sub-structure. The GUIs 1000a-1000c can be displayed, for example, on one or more of the client devices 104a-104c.

As shown in FIG. 10A, the GUI 1000a displays an overview of a logical sub-structure. The GUI 1000a can be displayed, for example, to the creator or administrator of the logical sub-structure, or to a host of the logical sub-structure to assist him in moderating the logical sub-structure.

The GUI 1000a includes a first portion 1002 that displays information regarding the logical sub-structure. As an example, the first portion 1002 can include a textual description of the logical sub-structure. A user can edit the logical sub-structure by selecting a screen element 1004, and updating the information associated with the logical sub-structure (e.g., using an interface similar to that shown in FIG. 7B).

The GUI 1000a also includes a second portion 1006 that displays various options that can be selected by the user to moderate the logical sub-structure. As an example, the second portion 1006 can include an option 1008a to invite one or more other users to access the logical sub-structure. Upon selecting the option 1008a, the user can be presented with a GUI 1000b, as shown in FIG. 10B. The GUI 1000b displays several users in a list (e.g., the user's contact list). The user can select one or more of these users, and confirm his selection by selecting the screen element 1010. In response, the platform 150 transmits an invitation of each of the selected users to access the logical sub-structure (e.g., in a similar manner as described with respect to FIG. 6G).

As another example, the second portion 1006 can include an option 1008b to view notifications settings associated with the logical structure. As an example, upon selecting the option 1008b, the user can be presented with a GUI 1000c, as shown in FIG. 10C. The GUI 1000c displays several notification options in a list. The user can select one or more of the options to modify whether the platform 150 notifies the user regarding specified events that have occurred with respect to the logical sub-structure (or that the platform 150 not notify the user at all). For example, a user can specify that he receive a notification from the platform 150 whenever a content item is shared in the logical sub-structure. As another example, a user can specify that he receive a notification from the platform 150 when certain types of content are shared in the logical sub-structure (e.g., content in which the user is "mentioned" or referenced by another user). As another example, a user can specify that he not receive notifications from the platform 150 in connection with the logical structure (e.g., "muting" the logical sub-structure).

Referring back to FIG. 10A, the GUI 1000a also includes a third portion 1012 that displays a list of users that have requested access to the logical sub-structure. The user can ignore the request (e.g., by selecting an "Ignore" screen element 1014) or approve the request (e.g., by selecting an "Approve" screen element 1016). If the user opts to ignore the request, the platform 150 prevents the user who submitted the request from accessing the logical structure. If the user opts to approve the request, the platform 150 grants access to the user who submitted the request. In both cases, the content item is removed from the list of requests in the third portion 1012.

Referring back to FIG. 10A, the GUI 1000a also includes a fourth portion 1018 that displays a list of users that have access to the logical sub-structure and/or have opted to join the logical sub-structure (e.g., a list of users that are "members" of the logical sub-structure). A user can select user from the list to view additional information regarding the selected user (e.g., profile information, contact information, etc.).

Direct Messaging:

As described above, users can share content with one another by sharing content within one or more logical structures. This can be beneficial, for example, as it enables several users to simultaneously view and discuss content in a collaborative environment.

However, in some implementations, users can also share content outside of the context of a logical structure. As an example, users can share content by directly transmitting messages to one another (e.g., sending "direct messages") using the platform 150. Messages shared in this manner are only accessible to the users participating in the messaging session, and not publicly accessible to other users. This can be beneficial, for example, as it enables users to communicate with one another in a more private setting.

In some implementations, a direct message can be sent from a single user to another single user. In some implementations, a direct message can be sent between three or more users.

FIGS. 11A-11J show example GUIs 1100a-1100j that can be displayed to a user during direct messaging session with one or more other users. The GUIs 1100a-1100j can be displayed, for example, on one or more of the client devices 104a-104c.

Figures 11A, 11B, 11C:
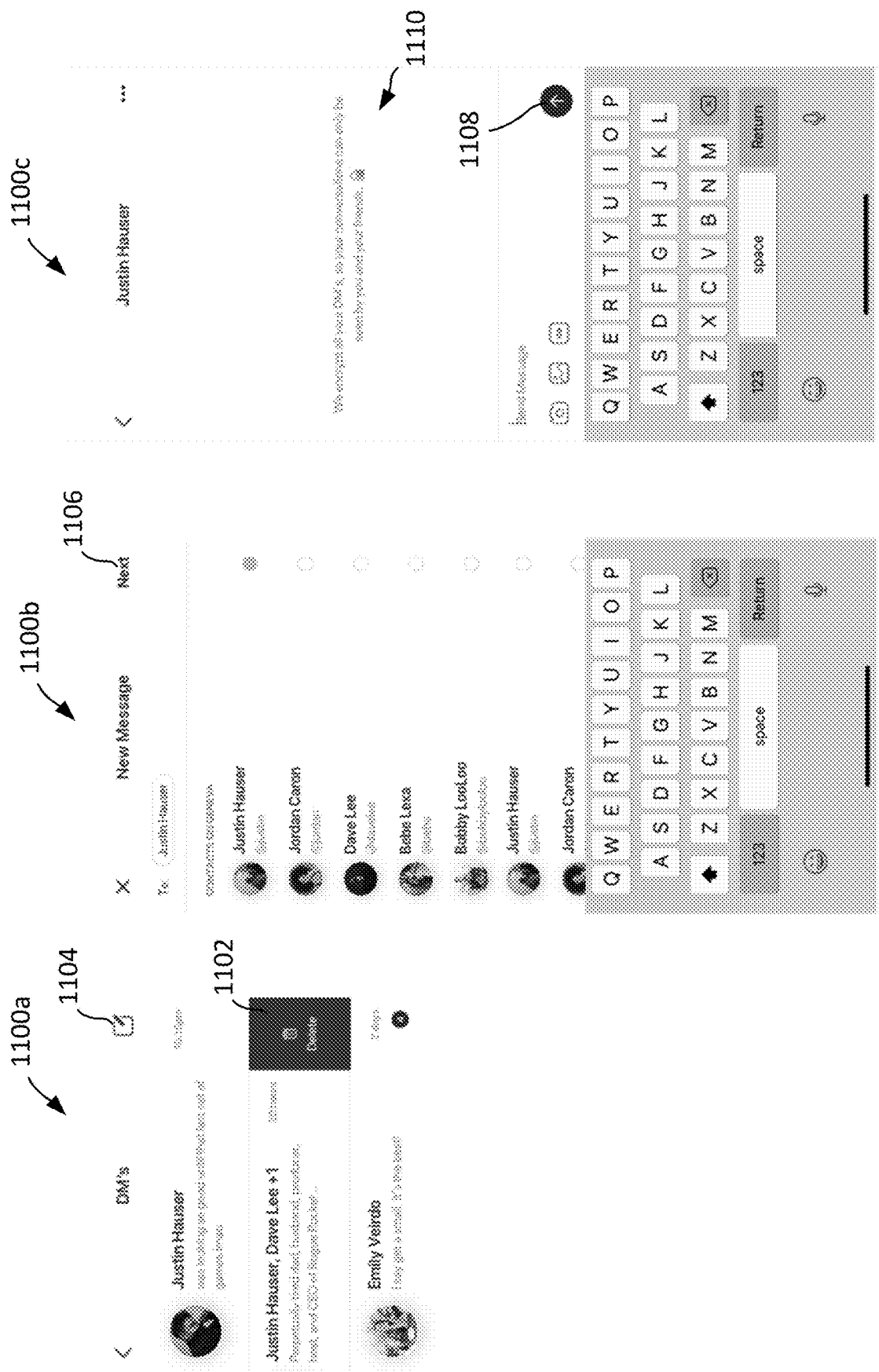

As shown in FIG. 11A, a GUI 1100a displays a list of messaging sessions between a user and one or more other users. The user can select a messaging session to review the exchange of messages between himself and other users during the selected messaging session. The user can also delete a messaging session (e.g., by "swiping" a messaging session horizontally, and selecting a "delete" screen element 1102).

The user can also start a new messaging session by selecting a screen element 1104 and inputting the user names of one more users to which he wishes to send a message. In response, as shown in FIG. 11B, the user is presented with a GUI 1100b that displays several users in a list (e.g., the user's contact list). The user can select one or more of these users with whom his wishes to enter into a messaging session, and can confirm his selection by selecting the screen element 1106. In response, as shown in FIG. 11C, the user is presented with a GUI 1100c that enables a user to input a message to the selected users (e.g., a messaging including one or more portions of text, images, audio, and/or videos). When the user is satisfied with his input, he selects a screen element 1108 to transmit the message to the selected users. The platform 150 initiates a messaging session between the user and the selected users, and transmits a copy of the message to each of the other user's devices.

In some implementations, by default, a user can start a new messaging session with any other user on the platform 150. In some implementations, by default, a user can only start a new messaging session with a user if both users are members of at least one common logical structure (e.g., both users are members of one or more of the same homes).

Two or more users can communicate with one another in a messaging session. As an example, FIG. 11D shows a GUI 1100b displaying messages shared between two users in a messaging session. The GUI 1100d includes a first portion 1112 displaying messages previously sent by the users during the messaging session (e.g., listed in chronological order). The GUI 1100d also includes a second portion 1114 that enables a user to input and send messages in the messaging session.

As another example, FIG. 11E shows a GUI 1100e displaying messages shared between more than two users in a messaging session. The GUI 1100e also includes a first portion 1116 displaying messages previously sent by the users during the messaging session (e.g., listed in chronological order), and a second portion 1118 that enables a user to input and send messages in the messaging session.

In some implementations, additional users can be added to a messaging session at the time that the messaging session was first created (e.g., using the GUI 1100b shown in FIG. 11B). In some implementations, additional users can be added to a messaging session after its creation. As an example, FIG. 11F shows a GUI 1100f displaying an option 1120 for adding an additional user to a messaging session. Upon the user selecting the option 1120, the user is presented with a list of users, from which he can select users to add to the messaging session (e.g., in a similar manner as shown in FIG. 11B). Upon the user selecting one or more additional user, the platform 150 adds the selects users to the messaging session, and transmits copies of messages shared during the messaging session. In some implementations, the platform 150 can transmit to the new users copies of all of the messages shared during the messaging session, including those that were transmitted before the new users were added. In some implementations, the platform 150 can transmit to the new users copies of only the messages shared during the messaging session after the new users were added.

Figure 11G:
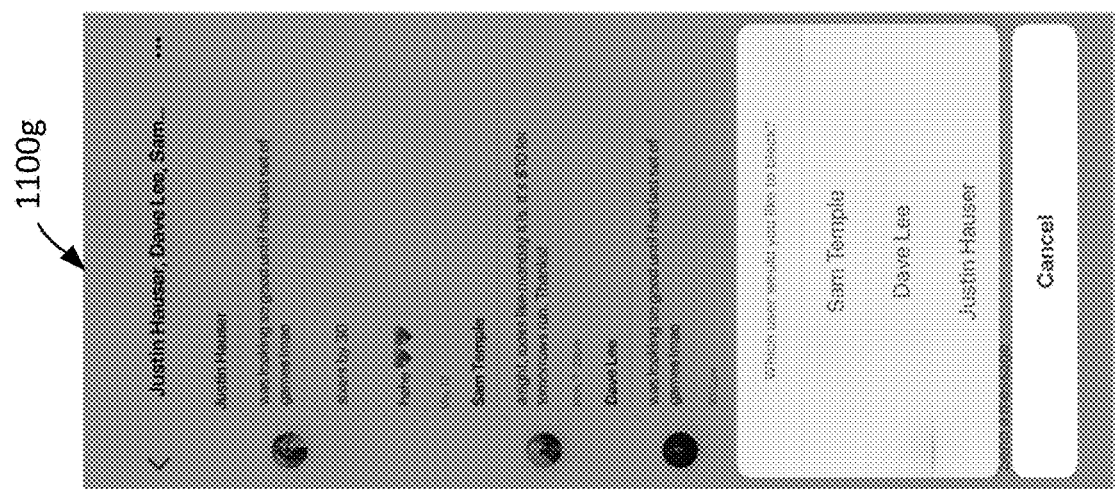
Figure 11H:
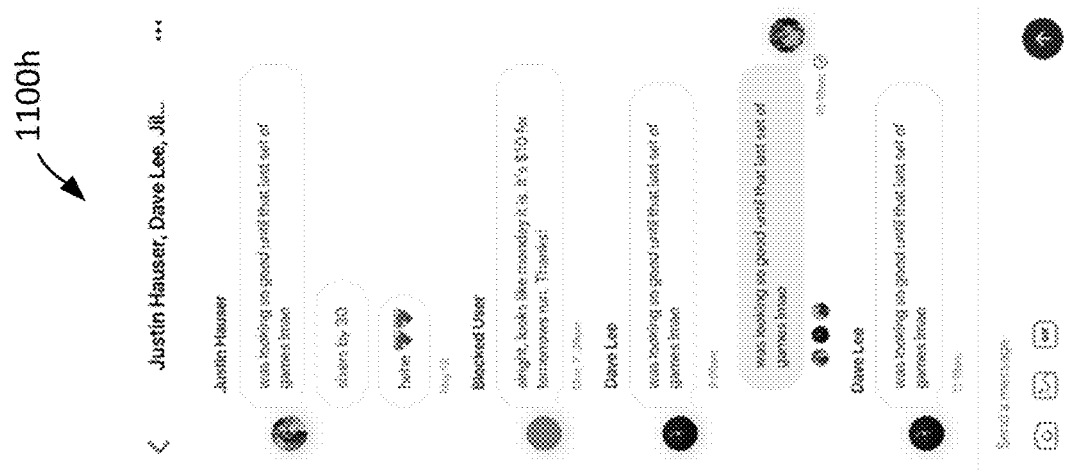

A user can also block one or more users in the messaging session. For example, as shown in FIG. 11F, the GUI 1100f displays an option 1122 for blocking a user in the messaging session. Upon the user selecting the option 1122, the user is presented with a GUI 1100g that includes a list of users that have joined the messaging system (as shown in FIG. 11G). The user can select one or more of these users to block them from the messaging session. In response, the platform 150 removes or hides messages shared by the selected user from the messaging session. For instance, in this example, the user has opted to block the user "Sam Temple." As shown in GUI 1100h in FIG. 11H, in response, the platform 150 removes or hides the messages shared by Jilly Hendrix from the messaging session, and replaces the messages with a "Blocked User" label to indicate that a message has been removed or hidden.

In some implementations, when a first user opts to block a second user from the messaging session, the platform 150 only removes or hides the second user's messages from the GUI that is presented to the first user. However, the platform 150 continues to display the second user's messages in the GUIs of other users in the messaging session.

In some implementations, when a first user opts to block a second user from the messaging session, the platform 150 removes or hides the second user's messages from the GUIs that are presented to all of the users in the messaging session (e.g., blocking the user from participating in the messaging session entirely).

A user can also remove himself from a messaging session. For example, as shown in FIG. 11F, the GUI 1100f displays an option 1124 that enables a user to remove himself from the current messaging session (e.g., "delete" the messaging session with respect to his account). Upon the user selecting the option 1124, the platform 150 removes the user from the messaging session, and prevents further messages from being sent to the user via the messaging system. The user can reinitiate communication with other users by creating a new messaging system (e.g., as shown and described with respect to FIGS. 11A-11C).

In some implementations, a user can opt to delete his own messages from a messaging session. In response, the platform 150 removes the message and/or hides the message from the GUIs of all of the users in the messaging session, such that none of the users can access the deleted message. This can be useful, for example, as it enables users to better control the distribution of their messages, even after they have been sent.

In some implementations, a user can opt to send a message that will "self-destruct" a specified amount of time after they have been read or opened by a recipient. Once the message has been read or opened by a recipient, and after the specified amount of time has since elapsed, the platform 150 removes the message (e.g., deletes the message from storage of the platform 150) and/or hides the message from the GUIs of all of the users in the messaging session. This can be useful, for example, as it enables users to better control the distribution of their messages, even after they have been sent.

In some implementations, the platform 150 can automatically send direct messages to a user. For example, the platform 150 can automatically send a message to each newly registered user of the platform 150 (e.g., welcoming the user to the platform 150). In some implementations, the user can respond to the message (e.g., to interact with an automated "chat bot" or with an administrator of the platform 150).

As another example, the platform 150 can automatically send a message to each new member of a logical structure (e.g., welcoming the user to the logical structure). In some implementations, this message can be specified by the host of the logical structure. In some implementations, the user can respond to the message (e.g., to interact with an automated "chat bot," with an administrator of the platform 150, or with a host of the logical structure).

Anonymity and Pseudo-Anonymity:

In the example shown and described above, when a user shares content with other users, the user's identity is directly attributed to the user who shared the content. As an example, for each item of shared content, the platform 150 can display the shared content alongside the name (e.g., user name and/or legal name) of the user who shared that item of content. This can be beneficial, for example, in building communities and continuous across different logical structures.

However, in some implementations, content can be shared within a logical structure anonymously or pseudo-anonymously. As an example, when a user shares content with an "anonymous" logical structure, the platform 150 can display the shared content without any attribution to the sharing user. This can be useful, for example, as it enables users to share content with a greater degree of privacy. Similarly, logical sub-structures also can be "anonymous."

As an example, when a user shares content with a "pseudo-anonymous" logical structure, the platform 150 can display the shared content alongside a pseudonym of the sharing user (e.g., a label other than the user's legal name or user name). The platform 150 can maintain records linking the pseudonym to the sharing user (e.g., a look up table linking the pseudonym to the user's account). However, the platform 150 can keep these records secret, such that general users and the public cannot ascertain the link. This can be useful, for example, as it enables users to share content with a greater degree of privacy, while still allowing the platform 150 to manage the activities of its users. Similarly, logical sub-structures also can be "pseudo-anonymous."

In some implementations, the platform 150 can further limit the amount of information that users can obtain from other users in the context of an anonymous or pseudo-anonymous logical structure. As an example, in a logical structure that is neither anonymous nor pseudo-anonymous, users can select users that are members of the logical structure and view additional information about the selected users (e.g., information contained within the selected user's profile, such as his real name, user name, contact information, photograph, etc.). However, in a logical structure that is pseudo-anonymous, users cannot only obtain limited and/or pseudo-anonymized information regarding the selected users. For instance, the platform 150 can provide the user's pseudonym, but not provide the user's real name, user name, contact information, photograph, or other identifying information). Further, in a logical structure that is anonymous, the platform 150 can prevent users from obtaining any information about other members of the logical structure at all.

Anonymity and pseudo-anonymity can be implemented on a logical structure by logical structure basis, such that some logical structures are anonymous or pseudo-anonymous, and others are not. In some implementations, when a user is creating a new local structure, the user can specify whether the new logical structure should be anonymous or pseudo-anonymous. In some implementations, the creator or administrator of a logical structure can specify, after the creation of the logical structure, that the logical structure be anonymous or pseudo-anonymous. In response, the platform 150 selectively anonymizes or pseudo-anonymizes the content within the logical structure (e.g., by omitting labels that identify users or use labels that pseudo-anonymize the identity of users in the presentation of content).

User Roles:

The platform 150 can grant users different abilities with respect to a logical structure, depending on the user's role with respect to the logical structure. For example, the platform 150 can grant the user that created the logical structure (e.g., a "homeowner") a broad range of abilities to manage the logical structure. For example, the platform 150 can grant the user the ability to edit the logical structure's profile information and settings, edit content and messages shared within the logical structure, delete the logical structure, and moderate the logical structure. Moderation abilities can include, for example, ability to respond to flags and reports from other users regarding potentially objectionable content, ban users from the logical structure, and establishing a "slow mode" for the logical structure (e.g., requiring users to wait a certain amount of time submitting a post, such as 1 minute, before being allowed to submit a new post).

Further, the platform 150 can allow the user to nominate one or more hosts to perform certain duties (e.g., moderate the logical structure) by exercising some or all of the abilities given to the creator of the logical structure. Further, the platform 150 can provide general users of the logical structures (e.g., "members") a limited set of abilities (e.g., the ability to view the current members of the logical structure and/or invite other users to join the logical structure).

Figure 12A:
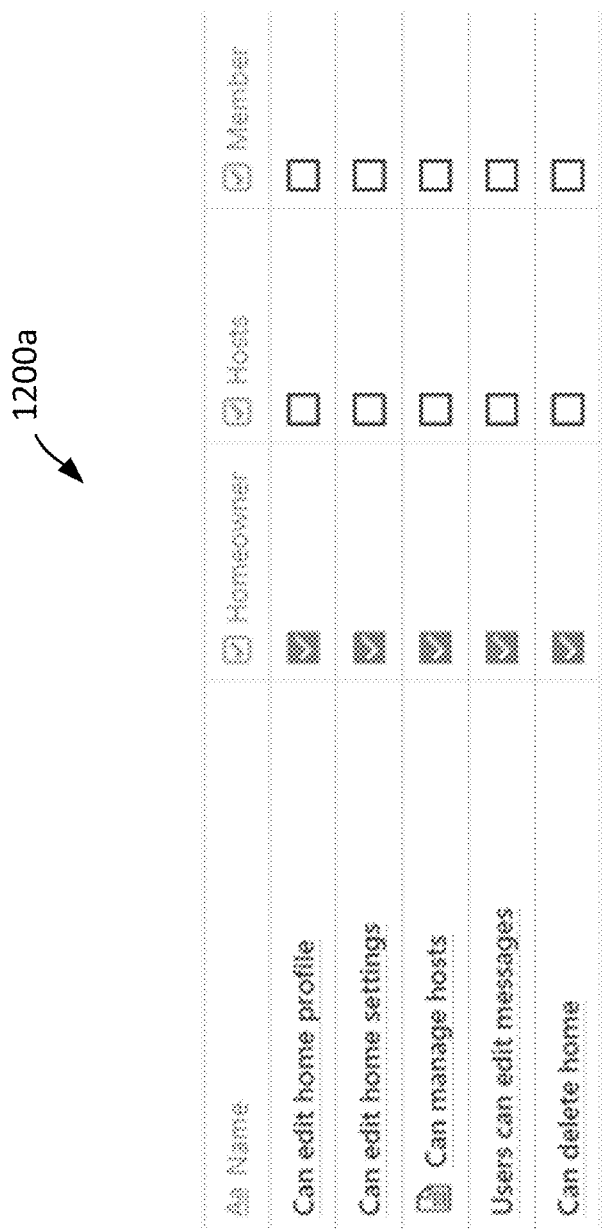

An examples, FIGS. 12A and 12B shows set of abilities 1200a and 1220b, respectively, that the platform 150 can give to each of the homeowner, hosts, and members of a logical structure. In some implementations, the distribution of abilities identified in FIG. 12A are granted by default by the platform 150 and cannot be modified by the users of the platform 150, whereas the distribution of abilities identified in FIG. 12B can be selectively modified by the users of the platform 150 (e.g., to selectively grant certain types of users more or less abilities with respect to a particular logical structure).

In some implementations, a user can be assigned to a single role only with respect to the logical structure. For example, a user can be initially assigned a general "member" role when joining a logical structure. The user can be subsequently reassigned to a "host" role to assist in the management of the logical structure.

In some implementations, the platform 150 can allow users to create custom roles with respect to a logical structure. For example, a user can input a name of a custom role (e.g., a text string), select one or more abilities assigned to users having that role (e.g., one or more of the abilities shown in FIGS. 12A and 12B), and assign one or more users to that role. In some implementations, the platform 150 can present a list of abilities for selection, and by default, initially set those abilities to "off" (e.g., by default, users having the custom role do not have any abilities with respect to the logical structure). The user creating the custom role can manually turn one or more of the abilities "on" (e.g., manually specify that users having the custom role be granted specific abilities with respect to the logical structure).

FIGS. 13A-13E show example GUIs 1300a-1300e that can be displayed to a user to assign roles to users and/or create custom roles. The GUIs 1300a-1300e can be displayed, for example, on one or more of the client devices 104a-104c.

Figures 13A, 13B, 13C:
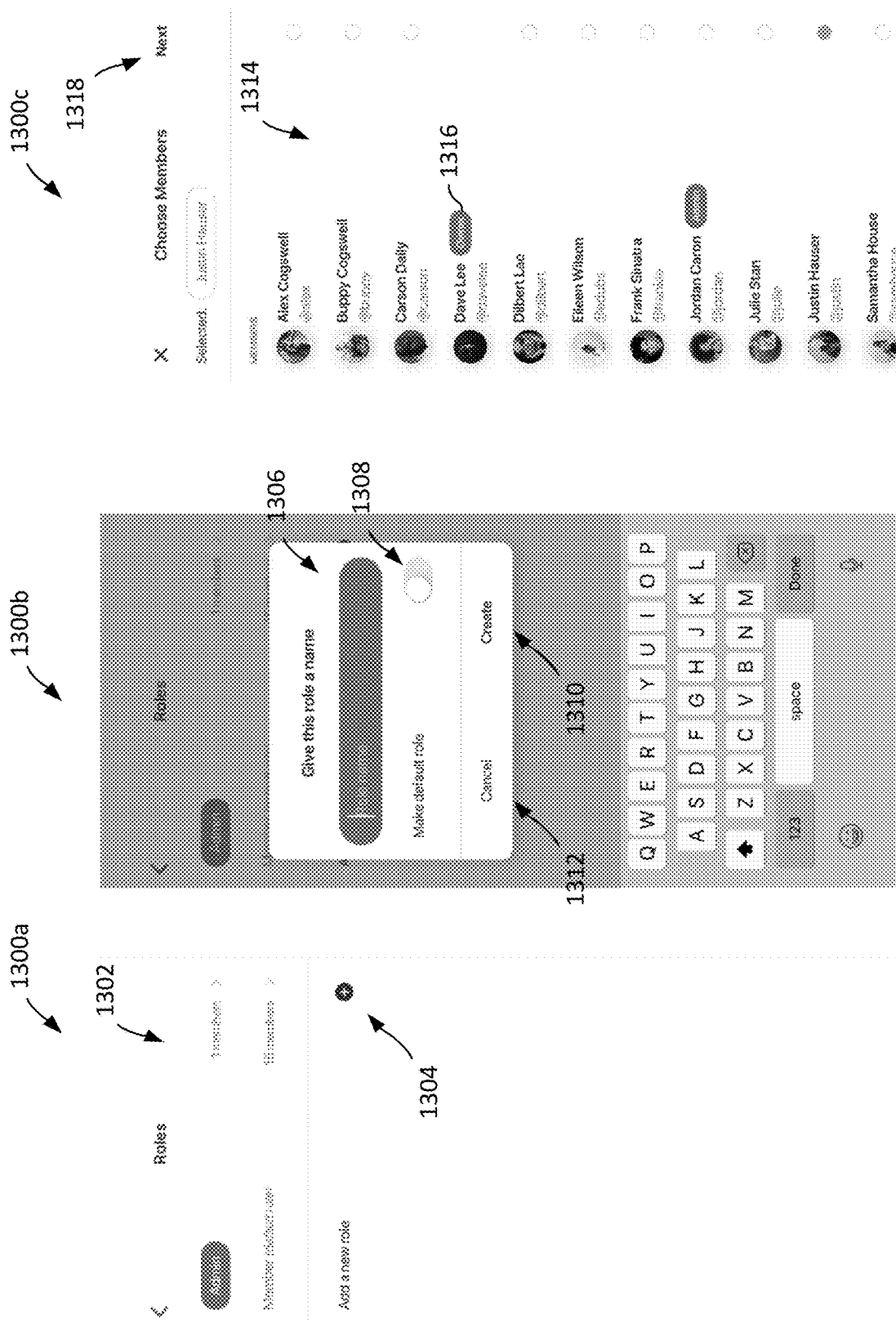
FIGS. 13A-13E are diagrams of example GUIs for assigning roles to users and/or creating custom roles.

As shown in FIG. 13A, a GUI 1300a displays a list of roles associated with a particular logical structure. A user can access the GUI 1300a, for example, by selecting a "role" option from a list of settings or options associated with the logical structure (e.g., a GUI for viewing and/or modifying the settings or options associated with the logical structure). The GUI 1300a shows a list of roles 1302 currently associated with the logical structure (e.g., "admin" and "member"). The GUI 1300a also includes a screen element 1304 can be selected by the user to initiate a process to create a custom role.

As described above, a user can also create custom roles with respect to a logical structure. For example, referring to FIG. 13A, the user can select the screen element 1304 to initiate a process to create a custom role. In response, as shown in FIG. 13B, the platform 150 presents a GUI 1300b including an input box 1306 enabling a user to enter a name for the role (e.g., a text string), and a screen element 1308 enabling a user to specify whether the role should be the "default" role that is assigned to each new member of the logical structure. When the user is satisfied with his selection, the user can select a screen element 1310 to confirm his selection. Alternatively, the user can cancel the role creation process by selecting a screen element 1312.

After creating a new role, the user can assign one or more users to the role. For example, as shown in FIG. 13C, the platform 150 can present a GUI 1300c showing a list of users 1314 (e.g., users associated with the logical structure and/or the user interacting with the GUI 1300b). The user can determine which of those users are already associated with a role (e.g., indicated by a badge 1316). Further, the user can select one or more users from the list of users 1314 to assign them to the new role. When the user is satisfied with his selections, the user can select a screen element 1318 to confirm his selections and assign the selected users to the role.

Figures 13D, 13E:
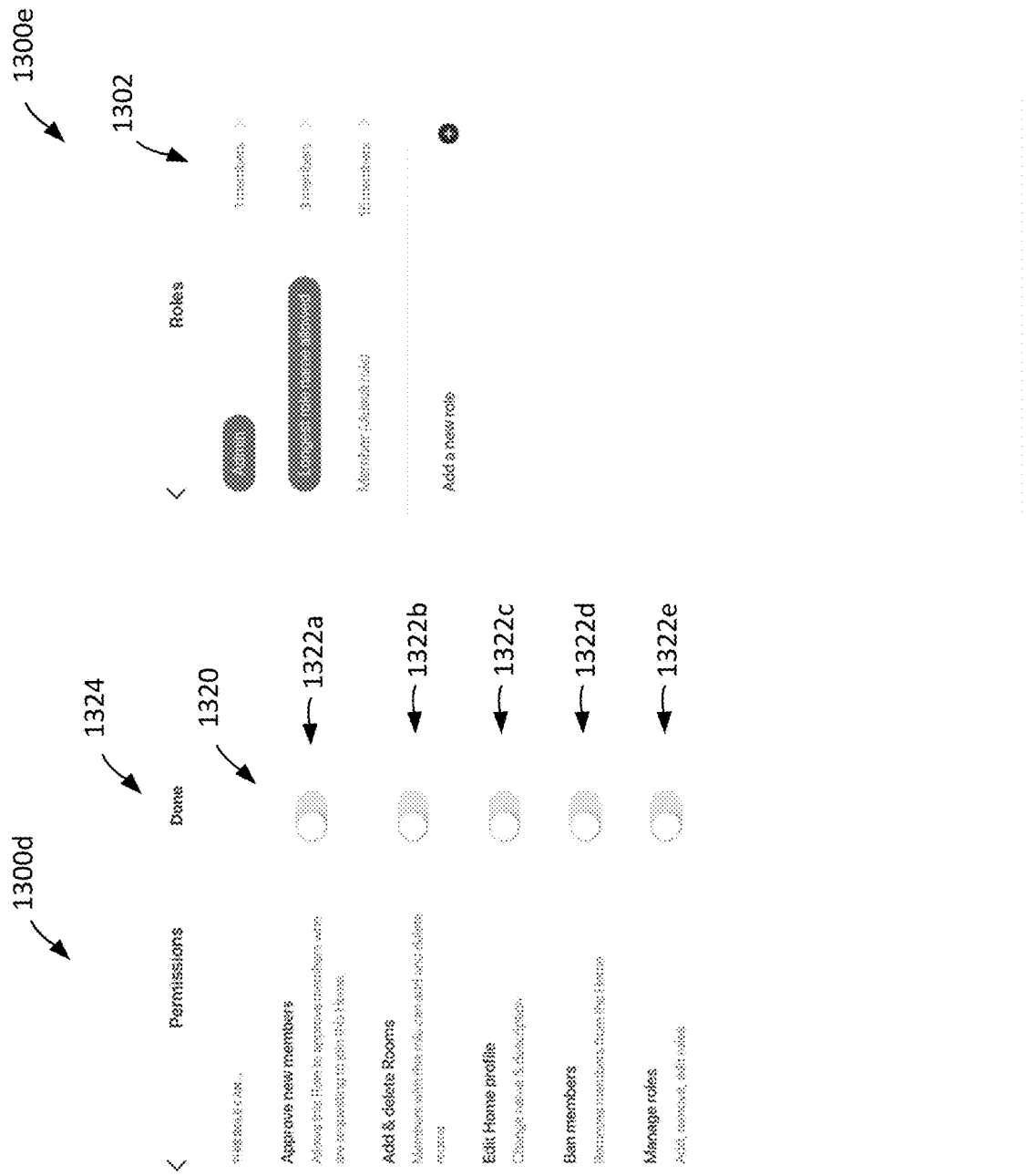

A user can also specify the abilities that are granted to users who have been assigned to the new role. For example, as shown in FIG. 13D, the platform 150 can present the GUI 1300d showing a list of abilities or permissions 1320 associated with a particular role. The user can select one or more abilities from the list 1320 to modify the abilities associated with the role. For example, the user can select an option 1322a to specify that users who are assigned to the role can approve requests from other users to join the logical structure. As another example, the user can select an option 1322b to specify that users who are assigned to the role can add and/or remove logical structures nested within the logical structure. As another example, the user can select an option 1322c to specify that users who are assigned to the role can edit the profile information associated with the logical structure. As another example, the user can select an option 1322d to specify that users who are assigned to the role can ban users from the logical structure (e.g., prevent the banned users from accessing the logical structure). As another example, the user can select an option 1322e to specify that users who are assigned to the role can add, remove, and/or edit the roles associated with the logical structure. As another example, the user can select an option to specify whether users who are assigned to the role can edit the logical structure. As another example, the user can select an option to specify whether users who are assigned to the role can "mention" other users in the logical structure (e.g., as described above). As another example, the user can select an option to specify whether users who are assigned to the role can to "pin" content in the logical structure (e.g., prioritize the display of that content over "unpinned," such that the content is emphasized to users). When the user is satisfied with his selections, the user can select a screen element 1310 to confirm his selections.

As shown in FIG. 13E, the platform 150 creates a new role based on the user's inputs, and includes the new role in the list of roles 1302 (e.g., as shown in GUI 1300e).

In some implementations, a user can transfer his role to another user. For example, the platform 150 can permit the creator of a logical structure to nominate another user to assume his duties and/or assume ownership of a logical structure. Upon the other user accepting the nomination, the platform 150 can transfer the creator's abilities and/or ownership of the logical structure to the nominated user. In some implementations, when a user accepts a nomination, the proposed transfer can be submitted to the administrators of the platform 150 for final approval. If the administrators approve of the transfer, the platform 150 executes the transfer of abilities and/or ownership. However, if the administrators do not approve of the transfer, the platform 150 does not execute the transfer of abilities and/or ownership, and informs the users of the rejection.

In some implementations, a user can specify that, in the event of his death or incapacity, his abilities and/or ownership of a logical structure be transferred by the platform 150 to another user. Upon receiving information confirming the user's death or incapacity, the platform 150 can transfer the creator's abilities and/or ownership of the logical structure to the nominated user. In some implementations, if a user dies or becomes incapacitated without having previously nominated another user, the administrators of the platform 150 can assume ownership of his logical structures.

In some implementations, the platform 150 can restrict the transfer of certain duties or abilities from one user to other. For example, the platform 150 can restrict the creator of a logical structure from transferring ownership of a logical structure to another user.

Role-Based Permissions:

As described above (e.g., in reference to FIG. 7E), a user can change the permissions of a logical structure by viewing a list of actions that could be performed with respect to the logical structure, and specifying a type of user that can perform each action (e.g., all users, home owner, creator or administrator, etc.). In the example shown in FIG. 7E, this can be performed on an action-by-action basis.

In some implementations, a user can change the permissions of a logical structure by viewing a list of permissions that have been assigned to a particular user role, and selectively enabling or disabling permissions for that user role. Further, the user can create any number of user roles (e.g., as described above), and assign different combinations of permissions to each of the user roles.

As an example, FIG. 19 shows a GUI 1900a that displays options for modifying a logical sub-structure (e.g., a room).

As an example, the GUI 1900a can include an option 1902a for editing information regarding the logical sub-structure (e.g., name, description, image, etc.). As another example, the GUI 1900a can include an option 1902b for user permissions for the logical sub-structure. As another example, the GUI 1900c can include an option 1902c to delete the logical sub-structure.

Figures 19A, 19B:

Upon the user select the option 1902b, the platform 150 displays a GUI 1900b, as shown in FIG. 19B. The GUI 1900b includes an option 1904a that enables the user to specify a default set of permissions that can be assigned to a user (e.g., users that do not have a role within the logical sub-structure). The GUI 1900b includes options 1904b and 1904c that enable the user to specify a set of permissions that can be assigned to users having a particular role (e.g., in this example, an "Admin Team" role and a "Corporate Partners" role).

Different sets of permissions can be assigned to each of the user roles. For example, the user can select the option 1904b to specify a set of permissions for the "Admin Team" role. In response, as shown in FIG. 19C, the platform 150 can display a GUI 1900c, including options 1906 for selecting actions that can be performed by users of the "Admin Team" role. For example, the user can selectively specify whether the users of the "Admin Team" role can send messages in the logical sub-structure, pin or unpin messages in the logical sub-structure, "mention" other users in the logical sub-structure, or delete messages in the logical sub-structure. In this example, the user has specified that users of the "Admin Team" role can perform each of these actions.

As another example, referring back to FIG. 19B, the user can select the option 1904c to specify a set of permissions for the "Corporate Partners" role. In response, as shown in FIG. 19D, the platform 150 can display a GUI 1900d, including options 1908 for selecting actions that can be performed by users of the "Corporate Partners" role. For example, the user can selectively specify whether the users of the "Corporate Partners" role can send messages in the logical sub-structure, pin or unpin messages in the logical sub-structure, "mention" other users in the logical sub-structure, or delete messages in the logical sub-structure. In this example, the user has specified that users of the "Corporate Partners" role cannot perform any of these actions.

Although two example roles are shown in the examples above, this is merely an illustrative example. In practice, the platform 150 can enable a user to create any number of roles, and assign different sets of permissions to each of these roles. Further, in some implementations, a user can be assigned to a particular role by default (which can be later modified). In some implementations, a user may not be assigned to any role by default.

Further, although four example actions are shown in the examples above, this is also merely an illustrative example. In practice, the platform 150 can enable a user to specify permissions with respect to any number of different actions. As example, a permission setting can specify whether a user can modify information regarding a logical structure or logical sub-structure (e.g., change the name, description, etc. or a home or room). As another example, a permission setting can specify whether a user can manage the creation or deletion of logical sub-structures (e.g., delete or add rooms in a home). As another example, a permission setting can specify whether a user can create "secret" logical sub-structures (e.g., rooms that are only visible to specifically invited users). As another example, a permission setting can specify whether a user can manage users of the logical structure or sub-structure (e.g., approve new users, ban users, unban users, etc. with respect to a home or room).

Member Groups:

In some implementations, users can be organized into one or more groups (e.g., "member groups") within a particular logical structure. Membership in a particular group can be independent from any of the roles in the logical structure. Further, users can be members of any number of different member groups.

As an example, a creator or administrators of a logical structure can create several member groups in a logical structure, and assign users of the logical structure to one or more of those groups, regardless of their roles in the logical structure. For instance, if a logical structure relates to a university, member groups in that logical structure can include groups for different class years, groups for different majors, groups for different university organizations, etc.

In some implementations, the platform 150 can assign users to particular member groups (e.g., based on information provided by the user in response to an information gate or application gate). In some implementations, a creator or administrator of a logical structure can manually assign users to particular member groups.

In some implementations, the platform 150 can grant a user access to certain logical sub-structures, depending on the user's membership in one or more groups. For example, if a logical structure relates to a university, member groups in that logical structure can include groups for different university organizations. The platform 150 can automatically give users of each of the member groups access to one or more corresponding logical sub-structures (e.g., a room for each of the university organizations).

In some implementations, the platform 150 can also generate a member directory for each member group. The member directory can include an entry for each of the users in the member group, as well as information regarding that user. In some implementations, the member directory can include generalized information regarding a user and/or information specific to the member group. Further, each of the users of the logical structure can view the member directory. This can be useful, for example, in enabling users to identify other users that are in a particular group, and to allow users to access further information regarding other users in the logical structure.

In some implementations, some or all of the information provided by a user with respect to an information gate or application gate of a logical structure can be used to populate an entry for a member directory for a particular member group within the logical structure.

Figure 18:
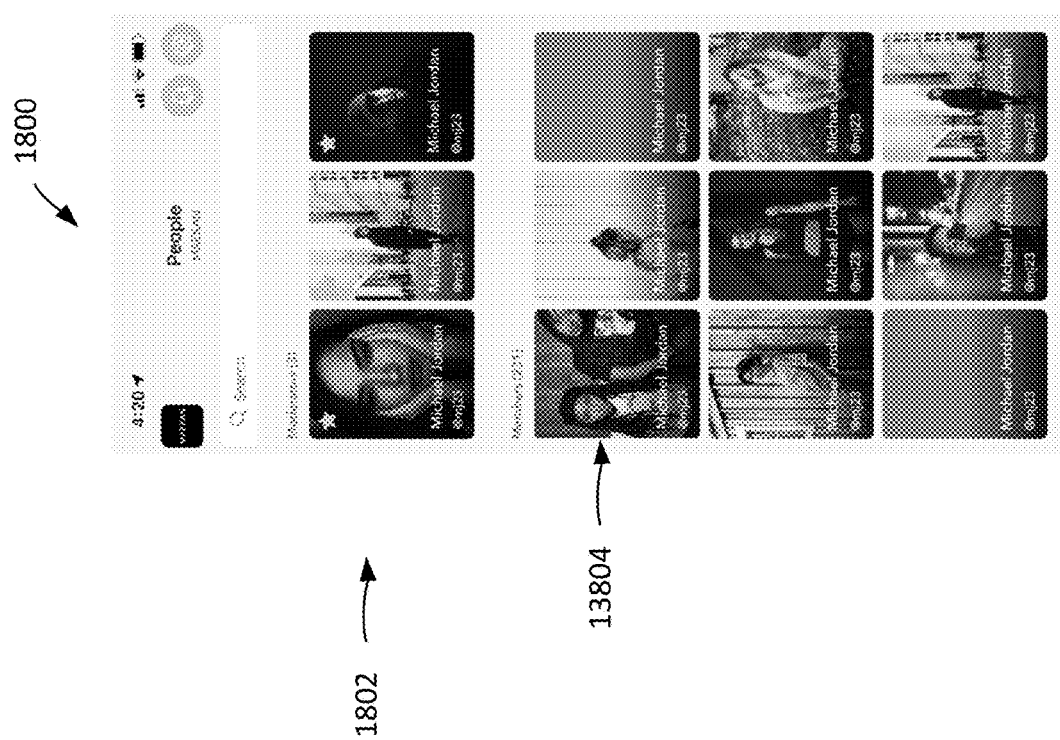
FIG. 18 is a diagram of an example GUI including a member directory.

FIG. 18 shows a GUI 1800 including an example member directory 1802. The member directory 1802 includes several entries 1804 for each of the users of a particular member group (e.g., arranged as a series of tiles). As shown in FIG. 18, each of the entries 1804 can include a name of a particular user, a user name of that user, and a picture of that user. Users can browse the member directory 1802 to view each of the users in the member group, and select one or more of the entries to view additional information regarding the corresponding users.

Badges:

In some implementations, the platform 150 can display one or more graphical badges for a user. For example, when the platform 150 displays the name of a user (e.g., in the user's profile page or alongside content shared by the user), the platform 150 can append one or more images, icons, emojis, or other graphical elements next to the user's name (e.g., before and/or after the user's name).

As described above (e.g., in connection with FIG. 13C), in some implementations, a badge can indicate the user's role with respect to a particular logical structure or logical sub-structure. For example, if the user is a host of a home, a "Host" badge can be displayed next to the user's name. In some implementations, the creator or administrator of a logical structure or sub-structure can assign certain badges to certain users of the logical structure or sub-structure. This can be beneficial, for example, in enabling users of a logical structure or sub-structure to quickly identify the roles of other users in the logical structure or sub-structure.

In some implementations, a badge need not be tied to a specific role. For example, in some implementations, a user can select and customize a vanity badge (e.g., an ornamental badge). This can be beneficial, for example, in enabling users to further customize their identity on the platform 150, such that they can be better distinguished from other users. As another example, in some implementations, if a user is associated with a particular member group of a logical structure, the platform 150 can display a badge indicating the member group next to the user's name.

In some implementations, the platform 150 can display one or more role-related badges for a user, as well as one or more non-role-related badges for that user (e.g., in a sequence before and/or after a user's name).

Member Matching and Prompts:

In some implementations, the platform 150 can identify potential matches between two or more users within a logical structure, and notify those users of the potential match. For example, the platform 150 can identify users who share one or more common characteristics, or have characteristics that indicate that they may have a particularly high affinity for one another. The platform 150 can prompt these users to introduce themselves to each other and start a private conversation, either synchronously or asynchronously (e.g., by generating a notification, email message, or other communication indicating the potential match). This can be useful, for example, in prompting users with a shared interest or affinity to get to know one another on a more personal level.

For example, the platform 150 can match users based on one or more criteria, including the location of the users, information in the users' profiles, the users' roles within the logical structure, the users' member groups within the logical structure, the users' answers to information gates or application gates, the frequency of chat message replies or post comments between the users within the logical structure, whether the users have RSVP'ed to the same event within the logical structure, among others.

In some implementations, the platform 150 can automatically generate conversation prompts in one or more logical sub-structures within a logical structure. These conversation prompts may be related to content that was previously shared inside the logical structure and/or themes or topics supplied by the platform 150. This can be useful, for example, in identifying topics that one or more users in the logical structure have shown interest in, and using that topic to spark a broader conversation among other users in the logical structure.

In some implementations, the creator or administrator of a logical structure can selectively enable these features. For example, a creator or administrator of a logical structure can selectively instruct the platform 150 to identify and notify potential matches between users of the logical structure, or selectively instruct the platform 150 to refrain from identifying and notifying potential matches between users of the logical structure. As another example, a creator or administrator of a logical structure can selectively instruct the platform 150 to generate conversation prompts for potentially matching users, or selectively instruct the platform 150 to refrain from generating conversation prompts for potentially matching users.

Sharing Content Outside the Platform and Importing External Content into the Platform:

In the examples described above, the platform 150 enables the sharing of content within the platform 150 (e.g., within particular logical structures, logical sub-structures, or direct messages). However, this need not always be the case.

For instance, in some implementations, the platform 150 can create a summary of the contents of a particular logical structure or logical sub-structure, and provide the summary to one or more users via email. As an example, the platform 150 can identify a sub-set of the content within a particular home or room, and transmit the identified content to one or more users in the form of a "digest" email). In some implementations, the sub-set of content can be identified based on factors such as approval rating of the content (e.g., the number of "up vote" or the net number of "up votes" of the content by users of the platform 150), the popularity of the content (e.g., the number of times that the content was viewed by the users of the platform 150), a number of user comments or reactions associated with the content, or other factors. In some implementations, an administrator of a logical structure or logical sub-structure can specify that the platform 150 automatically generate and transmit summaries according to a particular schedule (e.g., daily, weekly, monthly, etc.).

As another example, in some implementations, the platform 150 can enable users to selectively share content on the platform 150 to others using email and/or through a social media network (e.g., Instagram, Twitter, etc.). For example, the platform 150 can generate an email message that includes the content selected by the user, and transmit the email to one or more email addresses specified by the user. As another example, the platform 150 can generate a social media post that includes the content selected by the user, and transmit the post to a social media network for publication.

As another example, in some implementations, the platform 150 can enable the creator or administrator of a logical structure to create a public "landing page" for his or her home that may be shared outside the platform 150 (e.g., to the personal website of the creator or administrator of the logical structure). In some implementations, the creator or administrator of the logical structure can aggregate content shared in the platform 150 to add to the landing page. In some implementations, the creator or administrator of the logical structure can create a custom public-facing "preview" of the logical structure to add to the landing page. This is beneficial, for example, as it allows the creator or administrator of the logical structure to create marketing content in order to drive discovery of his or her home through search engines.

As another example, in some implementations, the platform 150 can enable users to import content shared outside the platform 150 into the platform 150. For example, the platform 150 can import an external RDF Site Summary (RSS) feed into a logical structure or logical sub-structure within the platform 150. As another example, the platform 150 can use "webhooks" to import real-time information from another application into the platform 150 and use that information to automatically perform an action(s) within the platform 150. This is beneficial, for example, as it allows users to import external content into the platform 150 in order to spark a conversation among users of the platform 150 about the content.

Figure 14A:
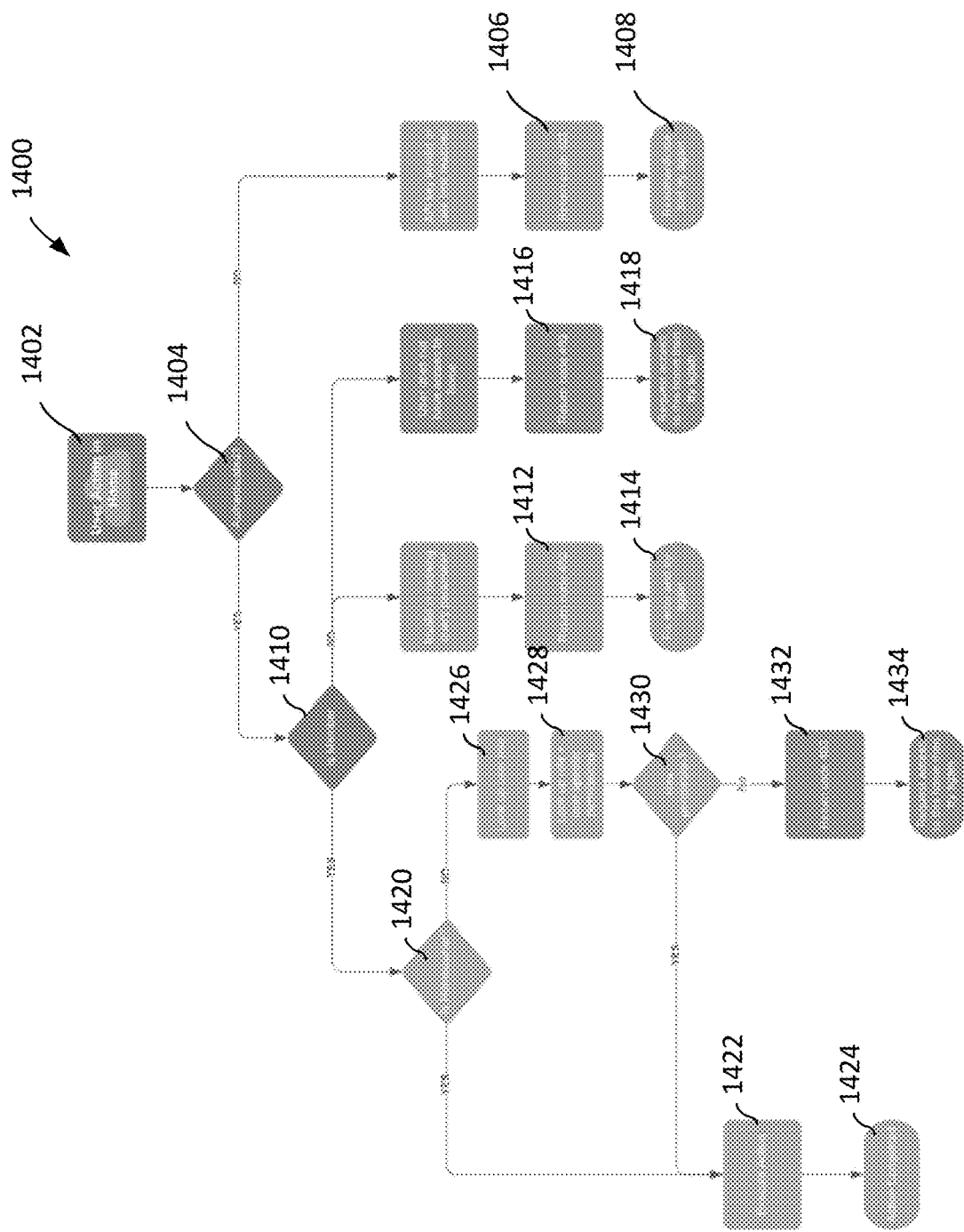
FIG. 14A is a diagram of an example process for regulating a user's interactions with respect to a logical structure.

User Permissions with Respect to a Logical Structure:

As described herein, the platform 150 can regulate users' ability to interact with a logical structure according to specific sets of permissions assigned to each user. An example process 1400 for regulating a user's interactions is shown in FIG. 14A. The process 1400 can be performed by one or more devices of the system 100 (e.g., the platform 150 on the server system 102 and one or more of the client devices 104*a*-104*c*).

As shown in FIG. 14A, the platform 150 receives a request from a user to perform a particular action with respect to a logical structure (step 1402). Example actions including viewing and/or sharing content in a logical structure, viewing and/or modifying settings associated with a logical structure, or any other action that is performed with respect to a logical structure as described herein.

In response, the platform 150 attempts to authenticate the user (step 1404). As an example, the platform 150 can authenticate the user by comparing the login credentials that were provided during a login request to a set of login credentials associated with the user's account. As another example, the platform 150 can authenticate upon receipt of an appropriate authentication key by the user. As another example, the platform 150 can authenticate the user upon receipt of appropriate information (e.g., valid login credentials and/or authentication keys) within a certain number of attempts, or subject to a rate limit (e.g., a certain number of attempts by the user per period of time). If the platform 150 determines that the user has not been authenticated, the platform 150 issues an error code to the user's device (e.g., HyperText Transfer Protocol (HTTP) error code 401, indicating an authorization error) (step 1406), and prompts the user to re-attempt authentication (step 1408).

If the platform 150 is able to authenticate the user, the platform 150 determines whether the user is a member of the logical structure specified in the request (step 1410).

If the user's request failed to provide certain necessary information to process the request (e.g., includes one or more invalid query parameters and/or is missing one or more query parameters), the platform 150 issues an error code to the user's device (e.g., HTTP error code 400, indicating an bad request error) (step 1412), and prompts the user to fix the request and try again (step 1414).

If the user's request provides the necessary information to process the request, but the platform 150 determines that the user is not a member of the logical structure, the platform 150 issues an error code to the user's device (e.g., HTTP error code 403, indicating a "forbidden" error) (step 1416), and prompts the user to request access to the logical structure and try again (step 1418).

If the user's request provides the necessary information to process the request, and the platform 150 determines that the user is a member of the logical structure, the platform 150 determines whether the user is a creator of the logical structure (e.g., a "homeowner") (step 1420).

If the platform 150 determines that the user is the creator of the logical structure, the platform 150 executes the requested action (step 1422) and terminates the process 1400 (step 1424). In this manner, the creators of a logical structure are given complete control of the logical structure (subject to restrictions by the administrators of the platform 150).

If the platform 150 determines that the user is not the creator of the logical structure, the platform 150 determines the user's role with respect to the logical structure (step

1426), Further, the platform 150 determines the permissions or abilities associated with the user's role and/or the permissions or abilities specific to the user (step 1428). The platform 150 then determines whether the requested action is permitted (e.g., whether the requested action is permitted by the permissions or abilities associated with the user's role and/or the permissions or abilities specific to the user) (step 1430). If the action is permitted, the platform 150 executes the requested action (step 1422) and terminates the process 1400 (step 1424). If the action is not permitted, the platform 150 issues an error code to the user's device (e.g., HTTP error code 403, indicating a "forbidden" error) (step 1432), and prompts the user to request permission to perform the requested action with respect to the logical structure and try again (step 1434).

Figure 14B:
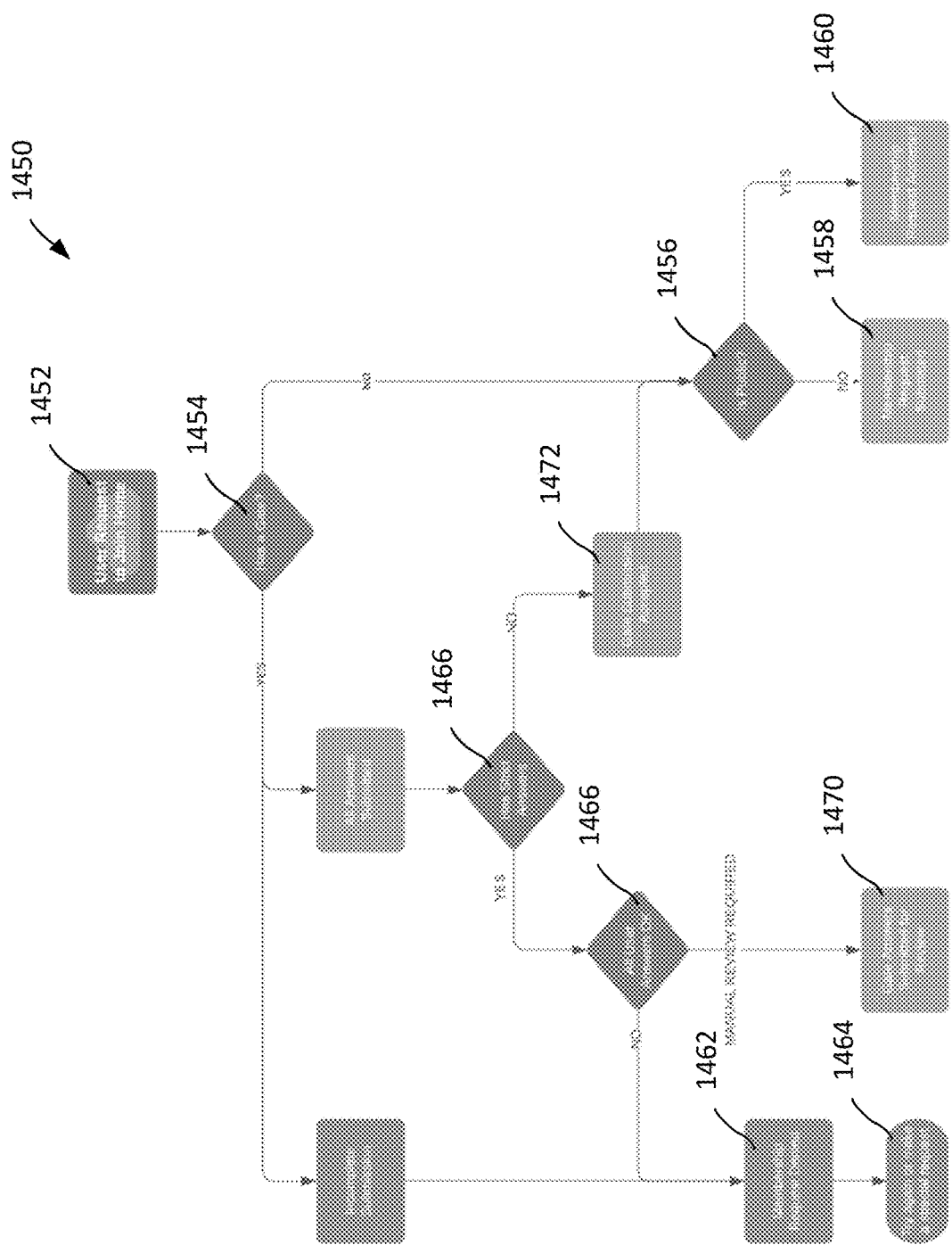
FIG. 14B is a diagram of an example process for enabling a user to access a logical structure.

An example process 1450 for enabling a user to access a logical structure is shown in FIG. 14B. The process 1400 can be performed by one or more devices of the system 100 (e.g., the platform 150 on the server system 102 and one or more of the client devices 104a-104c).

As shown in FIG. 14B, the platform 150 receives a request from a user to join a logical structure (e.g., a home) (step 1452). In response to the request, the platform 150 determines whether the logical structure has a gate (step 1454). Example gates include age gates, location gates, information gates or application gates, pay gates, or any other gates as described herein.

If the platform 150 determines that the logical structure does not have a gate, the platform 150 determines whether the logical structure is a public logical structure (step 1456). A public logical structure can be, for example, a logical structure that can be accessed by any user of the platform 150 (subject to certain exceptions, such as a list of banned users implemented by the administrators of the platform 150 and/or the logical structure).

If the platform 150 determines that the logical structure is not a public logical structure (e.g., a private logical structure), the platform 150 transmits a membership request to one or more administrators of the platform 150 (e.g., homeowners, hosts, etc.) to approve the user's request to join the logical structure (step 1458).

Alternatively, if the platform 150 determines that the logical structure is a public logical structure, the platform 150 accepts the user's request to join the logical structure (step 1460). Upon joining the logical structure, the user can access and/or share content within the logical structure, subject to permissions set by the administrators of the logical structure and/or the user's role with respect to the logical structure.

Referring back to step 1454, if the platform 150 determines that the logical structure does has a gate, the platform 150 determines whether the user's submissions with respect to the gate are incomplete or complete.

If the user's submissions are incomplete (e.g., the submissions are missing information to adequately determine whether the user meets the requirements of the gate), the platform 150 denies the user's request of access the logical structure (step 1462), and notifies the user to try again or make a special request to the administrators of the logical structure (step 1464). A special request can be, for example, a request for an exception from the requirements of the gate and/or manual approval of the user's request.

Alternatively, if the user's submissions are complete (e.g., the submissions include sufficient information to determine whether the user meets the requirements of the gate), the platform 150 determines whether the gate requires one or more "strict" answers, such as one or more pre-defined answers specified by the administrators of the logical structure (step 1466). As an example, a gate may have a "strict" answer requirement that a user submit an answer "A" to pass through the gate.

If gate requires strict answers, the platform 150 determines whether the user's submissions are acceptable (e.g., the user's answers meet the requirements of the gate) (step 1468). If so, the platform 150 forwards the user's request to the administrators of the logical structure for review (step 1470). The administrators can manually approve or deny the request based at least in part on the user's submissions. Otherwise, the platform 150 denies the user's request of access the logical structure (step 1462), and notifies the user to try again or make a special request to the administrators of the logical structure (step 1464) (e.g., as described above).

If gate does not require strict answers, the platform 150 accepts the user's submission (step 1470), and determines whether the logical structure is public (step 1456). If the platform 150 determines that the logical structure is not a public logical structure (e.g., a private logical structure), the platform 150 transmits a membership request to one or more administrators of the platform 150 (e.g., homeowners, hosts, etc.) to approve the user's request to join the logical structure (step 1458). Alternatively, if the platform 150 determines that the logical structure is a public logical structure, the platform 150 accepts the user's request to join the logical structure (step 1460).

In this manner, the platform 150 can selectively enable certain users to access a logical structure based on the properties of the logical structure and/or the user.

Generating and Displaying Statistics:

The platform 150 can generate usage and performance statistics with respect to each logical structure, and display those statistics to users (e.g., the creators or administrators of each logical structure). This enables users to understand the trends and activities associated with their logical structures, such that they can better manage them.

As an example, the platform 150 can generate aggregate statistics such as the number of users who have joined the logical structure (e.g., total members), the number of users who have actively viewed and/or engaged with content in the logical structure over a particular time period (e.g., daily, weekly, or monthly active members), the peak number of concurrent members, the total number of messages sent in the logical structures, or other metrics of measuring user engagement. As another example, the platform 150 can generate revenue statistics such as the amount of money that the logical structure has generated over a period of time. As another example, the platform 150 can generate content-specific statistics such as a list of users who have engaged most within the logical structure over a particular time period, a list of users who have not viewed the logical structure over a particular time period, a list of the posts or messages in the logical structure that have been interacted with the most over a particular time period, a list of the logical sub-structures nested within the logical structure that have been interacted with the most over a particular time period, a list of events created in the logical structure over a particular time period and lists of the users who RSVP'ed to each event, or other metrics of measuring content engagement. All of these statistics can be presented in the form of text and/or graphics (e.g., a historical chart).

In some implementations, platform 150 can generate statistics with respect to individual users, and display those statistics to users (e.g., the creators or administrators of each logical structure). As an example, the platform 150 can generate a report for each user, including profile photo of the user, the user's name, the user's age, a metric representing the user's contributions or activities on the platform 150 (e.g., a contributor rank determined based on the number of posts, comments, and "reactions" submitted by the user), information provided by the user in response to information gates or application gates, payment history, and other transaction history (e.g., list of goods or services purchased and the amounts of each transaction).

Security and Encryption:

The platform 150 can secure user information and shared content such that they can only be accessed by authorized parties. As an example, some or all of the data stored by the platform 150 can be encrypted. As another example, some or all of the data transmitted to and/or from the platform 150 (e.g., to the client devices 104a-104c or other devices) can be encrypted.

Various encryption algorithms can be used to encrypt data. As an example, data can be encrypted using Advanced Encryption Standard (AES) 256-bit encryption using a Cipher Block Chaining (CBC) mode and a Public Key Cryptography Standards 7 (PKCS7) padding schema.

In some implementations, data can be encrypted using a Google Android Key Store system. This system enables the platform 150 and its users to store cryptographic keys (e.g., to encrypt and decrypt data) in a data container to make them more difficult to extract from a device. Once keys are stored in the key store, they can be used for cryptographic operations with the key material remaining non-exportable. Moreover, the system can restrict when and how keys can be used, such as requiring user authentication for key use or restricting keys to be used only in certain cryptographic modes.

In some implementations, data can be encrypted according to an "end to end encryption" technique, such that only the sender and the intended recipient of data (e.g., the device of the user that sent a message and the device of the user that is intended to receive the message) can decrypt the data. Intermediary systems (e.g., the platform 150 itself) cannot decrypt the data. This can be beneficial, for example, as it enables users to communicate with one another privately, without fear of having their data exposed by intermediaries that have possession of the data (e.g., the platform 150) or third parties.

Data can be encrypted using an asymmetric encryption scheme or a symmetric encryption scheme. In an asymmetric encryption scheme, devices use two keys: a public key and a private key. The private key is held by a user's device (e.g., a client device 104a-104c), and the public key is held by the platform 150 and is available to anyone. A message encrypted with the public key can only be decrypted by the matching private key and vice-versa. Therefore, messages transmitted to a user's device are encrypted with the user's public key, and messages received from a user's device are encrypted (or signed) with the private key.

In a symmetric encryption scheme, encryption is performed using a single key. For example, data that is encrypted using this key also can be decrypted using the same key. This encryption scheme can be used, for example, with respect to group messages, such that each user in the group can decrypt the messages sent to the group.

In some implementations, keys used in a symmetric encryption scheme can be passed from one user to another, but only after the keys themselves are encrypted with the recipient's public key. For example, if a user A creates a symmetric group key for user B, user C, and himself to use, he can encrypt the group key with user B's public key and send it to user B. Similarly, he can encrypt the group key with user C's public key, and send it to user C. Further, he can encrypt the group key with his own public key, and send it to himself for safekeeping. Each user can decrypt their copy of the group key using their respective private key, recover the group key, and use the group key to encrypt and/or decrypt messages sent amongst the group. This technique can be advantageous, as the unencrypted group key is never transmitted to the platform 150 and is less likely to be exposed to third parties.

In some implementations, users' keys can be stored by the platform 150 in the form of a "keychain." A keychain is a searchable repository (e.g., a data table) containing a key ID (e.g., stored in plaintext) and a key (e.g., encrypted with the user's public key). These keys can only be decrypted with the user's private key. Upon creation of the user's account, the user's device can generate a new, permanent asymmetric key for the user (e.g., a public/private key pair). The public key can be sent to the platform 150 to be attached to the user's profile. In addition, the user's device can generate a secret key (e.g., a secret phrase including several words strung together with hyphens). This key can be used to encrypt the private key, and the encrypted private key can be added to the user's keychain on the platform 150. The user's device can also provide a copy of the secret key to the user of the device (e.g., via email).

If the user subsequently obtains another device and/or replaces his device, the user is asked to provide his secret key to the new device. When the user enters the secret key, the device retrieves the copy of the encrypted private key from the platform 150, and decrypts it using the secret key. If the user loses or forgets the secret key, the platform 150 can neither recover it nor decrypt the encrypted private key.

However, if the user knows his secret key and still has access to his private key, the user can modify his secret key. For example, the device can verify the user's existing secret key, generate a new secret key, re-encrypt the private key using the new secret key, and transmit the re-encrypted private key to the platform 150 for storage (e.g., in his keychain). The user's device can also provide a copy of the secret key to the user of the device (e.g., via email).

In some implementations, when a user attempts to access the platform 150 using a new device, the user's identity can be validated (at least in part) using information stored in the user's personal keychain (e.g., a keychain storing the user's credentials for the platform 150 alongside other systems or services not associated with the platform 150). For example, if a user is accessing the platform 150 via an Apple iOS device, the user's private key can be stored in their iOS keychain (e.g., a keychain stored on a remote cloud-based storage system). This keychain can be retrieved by any of the user's iOS devices. In some implementations, the presence of the private key in the iOS keychain can be used to authenticate a user's identity with the platform 150, without the need for a separate verification system (e.g., a two-factor SMS verification system). As an example, when the user attempts to access the platform 150, the user's device can attempt to decrypt a specific validation item stored in the user's keychain. This validation item was previously encrypted with the user's public key. If the decryption is successful, the device can transmit to the platform 150 an indication that the user's identity is valid.

In some implementations, when a user attempts to access the platform 150 using a new device, the user's identity can be validated (at least in part) through the exchange of graphical information. As an example, when the user attempts to access the platform 150 using a new device, the new device can generate a temporary public/private key set, and display a graphical element (e.g., a QR code) encoding header information, the user's user name, and the temporary public key. Further, the user can use his previously authenticated device (which contains the user's private key) to capture an image of the graphical element. The user's previously authenticated device decodes the information contained within the graphical element, encodes the user's private key with the new device's temporary public key, and stores the newly encoded private key into the user's keychain. The new device accesses the keychain, retrieves the entry corresponding to the newly encoded private key, decrypts the encoded private key using the temporary private key, and saves the decrypted private key. The temporary keys are then discarded.

Figure 15A:
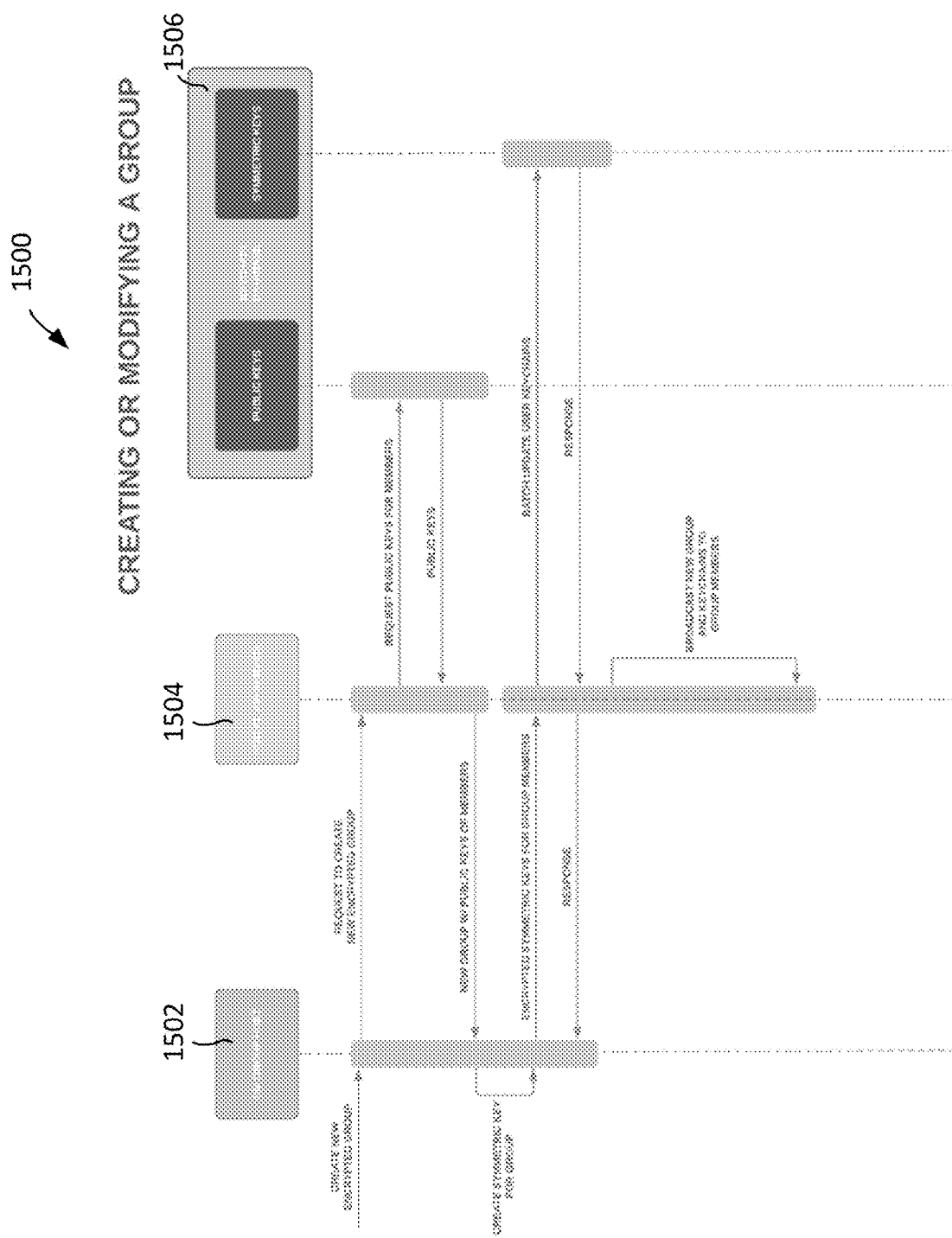
FIG. 15A is a diagram of an example process for creating an encrypted group messaging session.

Messages between users (e.g., direct messages) can be encrypted such that only the sender and the intended recipients can decrypt the messages. An example process 1500 for creating an encrypted group messaging session is shown in FIG. 15A. The process 1500 can be performed, for example, by one or more devices of the system 100 (e.g., the platform 150 on the server system 102 and one or more of the client devices 104a-104c).

In the process 1500, a direct message group host 1502 (e.g., using a client device 104a-104c) initiates a new group messaging session by transmitting a request to create a new encrypted message group to a social API service 1504 (e.g., implemented on the platform 150). The request can include, for example, a list of users that the user wishes to include in the group messaging session.

In response, the service 1504 requests a public key for each of the members of the group messaging session from a keychain database 1506 (e.g., implemented on the platform 150). The keychain database 1506 retrieves the public keys, and transmits the public keys to the service 1504. Upon receiving the public keys from the keychain database 1506, the service 1504 creates a new group messaging session, and notifies the group host 1502. The service 1504 also transmits the public keys retrieved from the keychain database 1506 to the group host 1502, and an identifier associated with the new group messaging session (e.g., a group ID that uniquely identifiers the group messaging session, and a key ID that uniquely identifies keys in a keychain that will be used in the group messaging session).

After receiving confirmation that the group messaging session has been created, the group host 1502 creates a symmetric key for use by users of the group during the group messaging session. Further, the group host 1502 encrypts the symmetric key using each of the public keys retrieved from the keychain database 1506 (e.g., by creating multiple encrypted copies of the symmetric key, each encrypted using a different public key). The group host 1502 transmits the encrypted symmetric keys to the service 1504 for distribution to each of the users' keychains.

Upon receiving the encrypted symmetric keys, the service 1504 updates the keychains of each users in the group messaging session. For example, the service 1504 can instruct the keychain database 1506 to store, in each user's keychain a copy of the symmetric key that was encrypted using that user's public key, and the key ID associated with the group messaging session. Upon completion, the keychain database 1506 confirms the updates to the service 1504, which in turn confirms the updates to the group host 1502. Further, the service 1504 broadcast the new group messaging session and keychains to each of the users in the group messaging session.

Users in the group messaging session can add additional users to the group messaging session. For example, when a user specifies that a new user be added to the group messaging session, the user's device, the service 1504, and the keychain database 1506 can perform similar steps as described above (e.g., with the user's device performing the steps previously performed by the group host 1502) to generate and distribute a new symmetric key to the group of users, including the new user. However, in lieu of transmitting a request to create a new encrypted group messaging session, the user's device can transmit a request to modify the encrypted group messaging session. This request can include an updated list of users, including the new user to be added to the group messaging session.

Users in the group messaging session can be removed from the group messaging session (either on his one accord, or by other users of the group messaging session). For example, when a user specifies that a user be removed to the group messaging session, the user's device, the service 1504, and the keychain database 1506 can perform similar steps as described above (e.g., with the user's device performing the steps previously performed by the group host 1502) to generate and distribute a new symmetric key to the group of users, including the new user. However, in lieu of transmitting a request to create a new encrypted group messaging session, the user's device can transmit a request to modify the encrypted group messaging session. This request can include an updated list of users, excluding the user to be removed from the group messaging system.

Figure 15B:
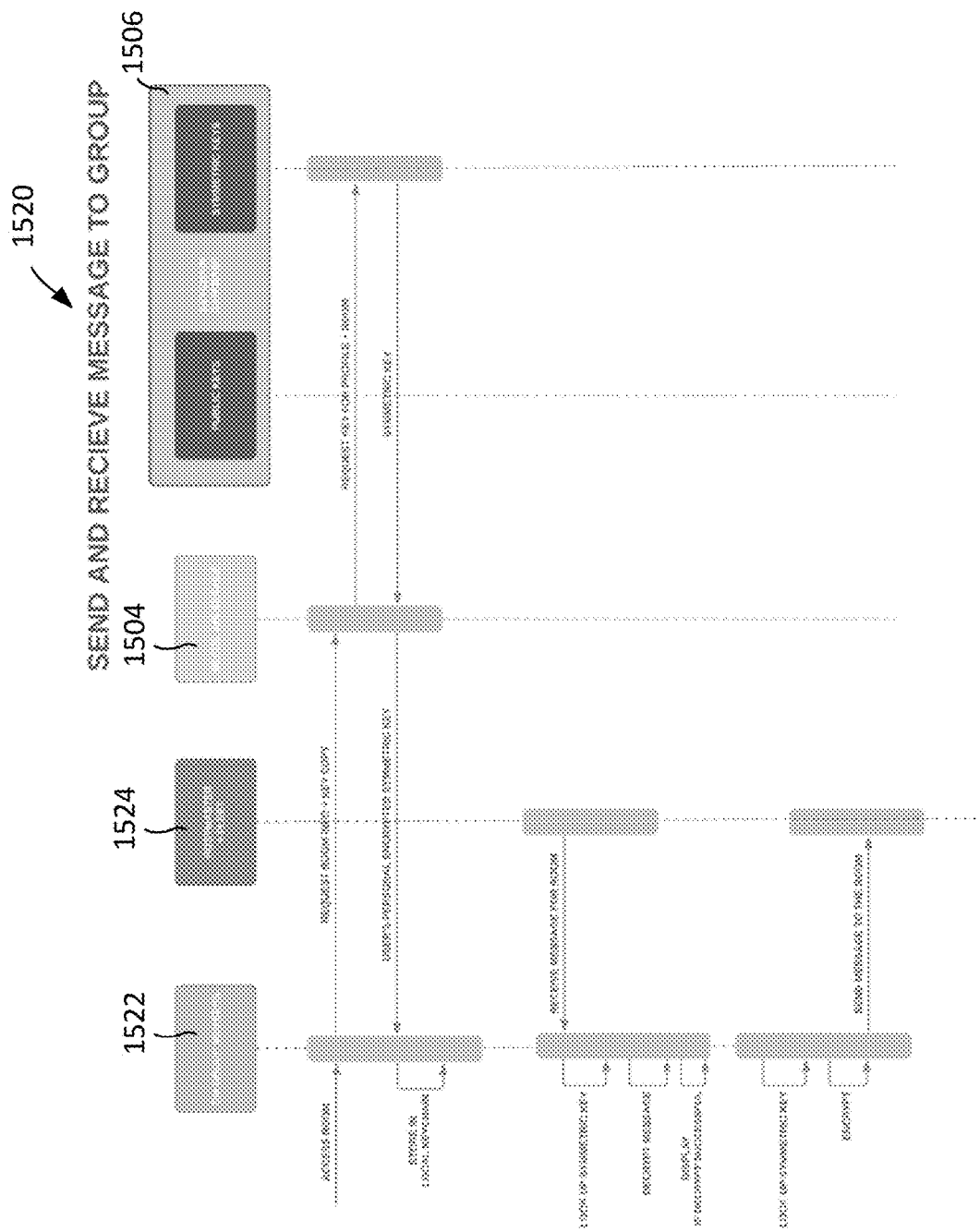
FIG. 15B is a diagram of an example process for encrypting and decrypting messages in a messaging session.

An example process 1520 for encrypting and decrypting messages in a messaging session is shown in FIG. 15B. The process 1520 can be performed, for example, by one or more devices of the system 100 (e.g., the platform 150 on the server system 102 and one or more of the client devices 104a-104c).

Group members 1522 of the group messaging service (e.g., using one or more of the client devices 104a-104c) can exchange messages using the symmetric key generated in the process 1500. For example, a user wishing to transmit a message to the group messaging session can obtain, from his keychain, the symmetric key that had been encrypted using his public key. For instance, the group message 1522 can transmit a request for the symmetric key to the service 1504, including information identifying the group messaging session (e.g., the group ID and/or the key ID associated with the group messaging session) and the identity of the user. In response, the service 1504 transmits, to the group member 1522, the symmetric key that had been encrypted using his public key. The group member 1522 can decrypt the symmetric key using his private key, and subsequently use the decrypted symmetric key to encrypt his message. The encrypted message is transmitted to a postmaster and fleet service 1524 (e.g., implemented by the platform 150) for distribution to the other users in the group messaging session. The encrypted message can include the group ID and/or the key ID, such that the recipients can identify the appropriate key for decrypting the message.

Similarly, upon receiving a message from the service 1504, a user can obtain, from his keychain, the symmetric key that had been encrypted using his public key. For instance, the group message 1522 can transmit a request for the symmetric key to the service 1504, including information identifying the group messaging session (e.g., the group ID and/or the key ID associated with the group messaging session) and the identity of the user. In response, the service 1504 transmits, to the group member 1522, the symmetric key that had been encrypted using his public key. The group member 1522 can decrypt the symmetric key using his private key, and subsequently use the decrypted symmetric key to decrypt the received message.

In some implementations, each encrypted message can include a key ID for retrieving a key for decrypting message from the keychain database 1506. When a user's device receives an encrypted message, the user's device can attempt to retrieve the appropriate key from the keychain database 1506 using the key ID (e.g., using the techniques describe above). If the user's keychain does not have a key corresponding to the key ID, the user device can ignore the message (e.g., leaving the message encrypted). If the user's keychain has a key corresponding to the key ID, the user device can retrieve the key, decrypt the message, and display the decrypted message to the user.

Socketed Communications:

As described herein, the platform 150 facilities real-time or substantially real-time communications between users. This functionality can be implemented using socketed communications protocols. For instance, communications between the platform 150 and the client device 104a-104c can be conducted according to a WebSocket protocol, such that data regarding certain events are transmitted in real-time or substantially real-time. Example events can include the creation and sharing of user generated content, edits to content, deletions of content, changes to the configurations of logical structures, and changes in a logical structure's user membership.

In some implementations, a client device 104a-104c can establish a socket connection with the platform 150, such that data is exchanged between them over the socket connection. Upon establishing a successful socket connection, the client device 104a-104c can authenticate itself to the platform by sending an appropriate authentication request.

In some implementations, a client device 104a-104c can "subscribe" to certain events with the platform 150, such that it receives data about the subscribed events over the socket connection. As an example, to receive information regarding events that occur with respect to a particular logical structure, the client device 104a-104c can send a subscription request to the platform 150 over the socket. The platform 150 acknowledges the request, and sends event information to the client device 104a-104c over the socket.

In some implementations, a client device 104a-104c can handle multiple socket connections concurrently, and utilize a single socket connection per subscription. In some implementations, a client device 104a-104c can utilize a single socket connection for multiple subscriptions concurrently (e.g., by multiplexing subscriptions over the single socket connection). This can be beneficial, for example, as it facilitate optimization of bandwidth by reducing the duplication of events and reducing network overhead.

In some implementations, a client device 104a-104c can transmit "presence" information (e.g., information describing the current state of the client device) to the platform 150 via a socket connection. For instance, a client device 104a-104c can transmit information regarding the real-time actions being performed on the client device, such as whether the user is accessing a particular application (e.g., an application that enables the user to interact with the platform 150) on the client device, which GUIs of an application are being presented to the user by the client device, which features or operations are being performed by the client device, whether the user is actively typing or inputting other commands on the client device, etc.

This can be beneficial, for example, as it enables the platform 150 to prioritize certain services to a user, while deprioritizing other services. For example, when a user is actively viewing a particular logical structure, the platform 150 can continuously transmit updates to the logical structure (e.g., the arrival of new content) to the user over the socket connection, while deprioritizing other logical structures. This can reduce the amount of data that is transmitted between the systems, and can improve the efficiency and speed of communication. Further, this enables the platform 150 to obtain detailed telemetry regarding its users in real-time or substantially real-time. Further, this enables the platform 150 to present time-specific information to its users to improve the user experience. For example, when a user is inputting a response in a logical structure or messaging session, the platform 150 can display, to each of the other users in the logical structure or messaging session, an indication that the user is typing (e.g., a "typing" indicator), such that users are notified that new content may be shared imminently.

Content Migration:

In some implementations, the platform 150 can automatically migrate content from another communications platform to the platform 150. For example, the platform 150 can retrieve migration data from another communications platform, such data describing one or more logical structures implemented on the other communications platform, the content that was shared with respect to those logical structures, and the manner in which the content was organized and presented within the logical structure. Further, the platform 150 can retrieve additional migration data, such as a list of users associated with each logical structure, profile information regarding each user, and the role of each user with respect to the logical structures.

Using this information, the platform 150 can reproduce or approximate a similar user experience on the platform 150. For example, the platform 150 can generate one or more logical structures similar to those implemented on the other communications platform. Further, the platform 150 can populate each of the logical structures with the same or similar content as with the other communications platform. Further, the platform 150 can organize and present the content in the same or similar manner as with the other communications platform (e.g., preserving the same or similar visual appearance, nesting, order, etc.). Further, the platform 150 can associate the same users with each of the logical structures as with the other communications platform, and assign each of the users the same role as they had on the other communications platform. This is beneficial, for example, as it enables users to seamlessly migrate their content from another communication platform to the platform 150.

In some implementations, the platform 150 can perform content migration based on migration data that was generated by another communications platform. For example, the other communications platform may allow a user to export his content, settings, profiles, and other information into one or more data files. The user can provide the data files to the platform 150, and ask that the platform 150 reproduce or approximate a similar user experience on the platform 150 based on the data files.

In some implementations, the platform 150 can perform content migration by "scraping" data from another communications platform. For example, the platform 150 can access other communications platform using a user's login credentials, and automatically retrieve information regarding the user's content, settings, profiles, and other information. Using this information, the platform 150 can reproduce or approximate a similar user experience for the user on the platform 150. In some implementations, the platform 150 can scrape data from another communications platform using an application or "bot" that automatically accesses and records content within the logical structures of the other communications platform.

Figure 20:
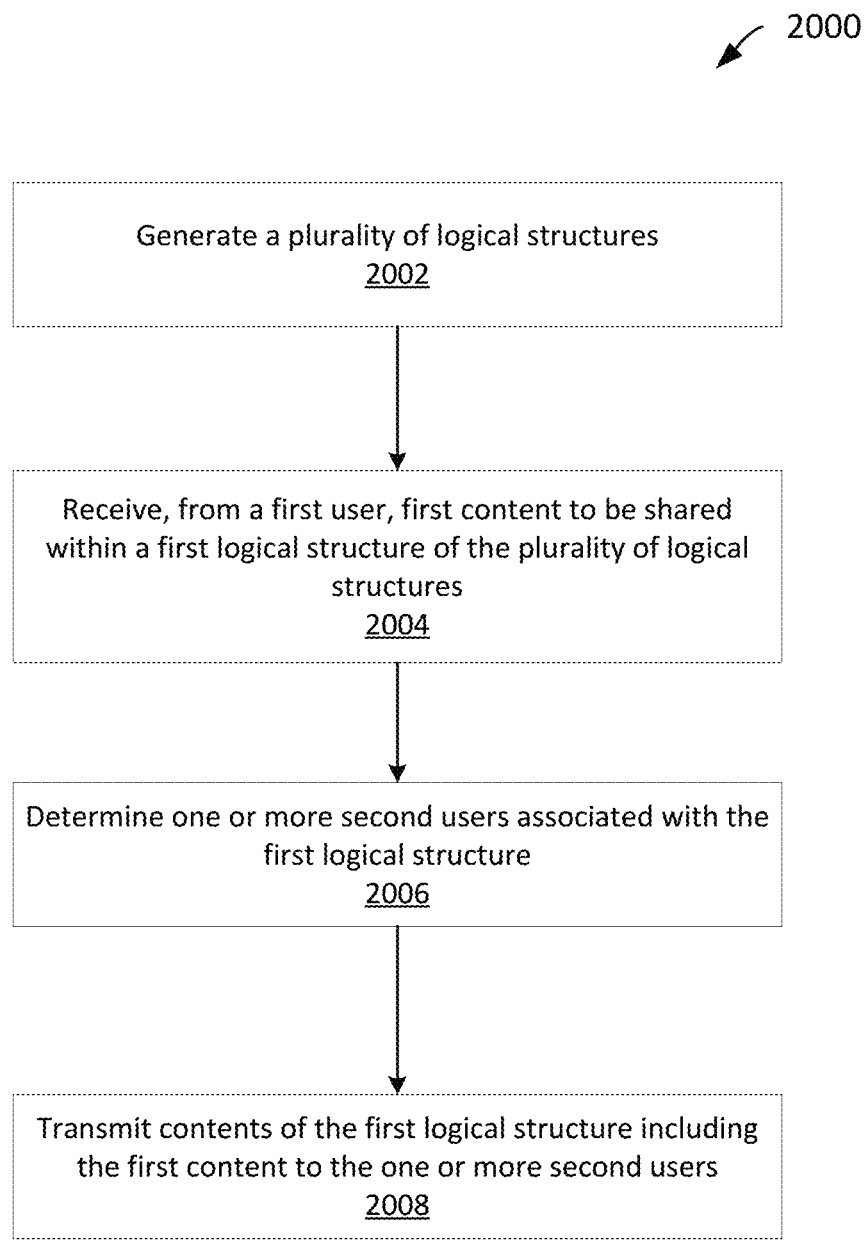
FIG. 20 is a flow chart diagram of an example process for facilitating communications between users on a communications platform.

Example Processes:

An example process 2000 for facilitating communications between users on a communications platform is shown in FIG. 20. Some or all of the process 2000 can be performed, for example, by the system 100 shown and described herein. In some implementations, the process 2000 can be performed, at least in part, by the platform 150 shown and described herein.

In the process 2000, a communications platform generates a plurality of logical structures (step 2002). As an example, a communications platform can generate one or more "homes" and one or "rooms" nested within homes.

In some implementations, logical structures can be shared using template data shared between users. For example, generating the plurality of logical structures can include (i) receiving, from a second user, template data indicating a first type of logical structure, the template data including one or more parameters associated with the first type of logical structure, (ii) generating the first type of logical structure based on the template data, and (iii) receiving, from a third user, a request to generate a second logical structure according to the first type; and (iv) generating the second logical structure using the template data. The one or more parameters can include an indication of a type of content that can be shared within the first type of logical structure (e.g., specifying the "type" of room that is to be created, such as a chat room, post room, video room, audio room, etc.). The one or more parameters can also include an indication of a visual appearance of the first type of logical structure (e.g., a visual theme for a home or room).

The communications platform receives, from a first user, first content to be shared within a first logical structure of the plurality of logical structures (step 2004).

Various types of content can be shared within a logical structure. As an example, content can include at least one of chat, posts, audio, or video. As another example, content can include a combination of chat, posts, audio, and video. As another example, content can include an event invitation. As another example, content can include a poll or questionnaire. As another example, content can include an indication of a geographical location. As another example, content can include an image to be overlaid over other content of the logical structure (e.g., a "sticker'). In some implementations, a user can select content for sharing using a graphical user interface (e.g., a visual "toolbox').

The communications platform determines one or more second users associated with the first logical structure (step 2006).

In some implementations, determining one or more second users associated with the first logical structure can include determining whether particular users satisfy certain gate requirements of the logical structure. For example, determining one or more second users associated with the first logical structure can include (i) receiving, from each of the one or more second users, a request to access the first logical structure, (ii) determining, for each of the one more second users, whether the second user satisfies one or more access criteria associated with the first logical structure, and (iii) enabling access to the first logical structure by each of the one or more second users that satisfies the one or more access criteria. In some implementations, the one or more criteria can include an age requirement (e.g., an "age gate"). In some implementations, the one or more criteria can include a geographical location requirement (e.g., a "geo gate"). In some implementations, the one or more criteria can include a payment requirement (e.g., a "pay gate"). In some implementations, the one or more criteria can include a requirement that the second user provide a particular answer in response to a prompt (e.g., an "info gate').

In some implementations, content can include an indication of a first product or service for sale. In some implementations, the first product or service for sale can be specified using a "digital warehouse." For example, the indication of the first product or service for sale can be generated, at least in part, by (i) determining a plurality of products or services for sale in the plurality of logical structures, (ii) presenting the plurality of products or services for sale to the first user, (iii) receiving, from the first user, a selection of the first product or service for sale among the plurality of products or services for sale, and (iv) generating the indication of the first product or service for sale based on the selection. In some implementations, the plurality of products or services for sale can be determined, at least in part, using an electronic commerce platform different from the communications platform (e.g., a Shopify, or another electronic commerce platform).

The communications platform transmits contents of the first logical structure including the first content to the one or more second users (step 2008).

In some implementations, the process can further include (i) receiving, from a third user using the communications platform, second content to be shared within a second logical structure of the plurality of logical structures, (ii) determining, using the communications platform, one or more fourth users associated with the second logical structure, and (iii) transmitting, using the communications platform, contents of the second logical structure including the second content to the one or more fourth users. In some implementations, the second logical structure can be nested within the first logical structure (e.g., a "room" nested within a "home"). In some implementations, the one or more fourth users can be a subset of the one or more second users (e.g., each of the members of a "home" can access content shared within the home, whereas only selected member scan access content from a particular room nested within the home).

In some implementations, users can control the manner in which content is shared within a logical structure (e.g., moderate the content) and/or control the users may be access the content of the logical structure or perform other actions with respect to the logical structure (e.g., moderate the members of the logical structure).

As an example, the process can include modifying the first content based on one or more rules (e.g., moderation rules). The one or more rules can include an indication of one or more words to be removed from the first content (e.g., prohibited words).

As another example, the process can further include receiving, from the first user, a command to disassociate a particular second user among the one or more second users from the first logical structure, and responsive to receiving the command, preventing transmission of the contents of the first logical structure to that second user. For instance, this can be performed to "kick" or "ban" a user from the logical structure in response to on a command from an authorized user.

In some implementations, the process can further include receiving, from the first user, a command to enable a particular second user among the one or more second users to share content within the first logical structure, and responsive to receiving the command, enabling that second user to share content within the first logical structure. For instance, this can be performed to grant permission of a user to access the logical structure (e.g., white list the user) in response to on a command from an authorized user.

In some implementations, the process can include presenting additional logical structures for the user to join (e.g., so that the user can "discover" additional logical structure that may interest him). As an example, the process can include (i) presenting, to an additional user, at least some of the logical structures among the plurality of logical structures, (ii) receiving, from the additional user, a selection of one of the presented logical structures, (iii) associating the additional user with the selected logical structure, and (iv) transmitting the contents of the first logical structure including the first content to the additional user.

In some implementations, a platform can estimate a user's interest in one or more logical structures, and recommend one or more of those logical structures to the user to join. This can be beneficial, for example, in providing customized recommendations that are better suitable for each user individually. As an example, presenting at least some of the logical structures among the plurality of logical structures can include determining, for each of the logical structures, an estimated interest in the logical structure by the additional user, and presenting at least some of the logical structures among the plurality of logical structures according to the estimated interest. The estimated interest in a logical structure can be determined based on the additional user's association with one or more other logical structures among the plurality of logical structures.

In some implementations, content can be shared between users independent of a particular logical structure. For instance, content can be shared directly between two or more users using a "direct message." As an example, the process can include receiving, from a first user, second content to be shared with one or more third users independent from the plurality of logical structures, and transmitting the second content from the first user to the one or more third users independent from the plurality of logical structures.

In some implementations, a logical structure can be a "public" logical structure that can be access by any user of the platform. For example, the process can include enabling each user of the communications platform to access the contents of the first logical structure.

In some implementations, a logical structure can be a "private" logical structure that is visible to each of the users of the platform, but can only be accessed by those who have permission to do so. For example, the process can include indicating, to one or more third users not associated with the first logical structure, an existence of the first logical structure, and preventing the one or more third users from accessing the contents of the first logical structure.

In some implementations, a logical structure can be a "hidden" logical structure that is only visible to and can only be accessed by those who have permission to do so. For example, the process can include not indicating, to one or more third users not associated with the first logical structure, an existence of the first logical structure, and preventing the one or more third users from accessing the contents of the first logical structure.

In some implementations, the owner of a logical structure can transfer his ownership to another user. As an example, the process can include (i) receiving, from the first user, a request to transfer ownership of the first logical structure to a third user, (ii) responsive to receive the request, transmitting a notification to the third user regarding the request, (iii) receiving, from the third user, an indication that the third user consents to the request, and (iv) responsive to receiving the indication that the third user consents to the request, transferring ownership of the first logical structure to the third user.

In some implementations, the owner of a logical structure can instruct the platform to transfer his ownership to another user upon his death or incapacity (e.g., in a manner similar to a will). For example, the process can include (i) receiving, from the first user, a request to transfer ownership of the first logical structure to a third user upon death or incapacity of the first user, (ii) determining that the first user has died or has become incapacitated, and (iii) responsive to determining that the user has died or has become incapacitated, transferring ownership of the first logical structure to the third user.

In some implementations, the platform can migrate data from another communications platform. For instance, the platform can generate logical structures duplicating or approximating logical structures that are implemented on another communications platform, populate the logical structures from identical or similar data as in the other communications platform, and/or associate the same or similar users with each of the logical structures and/or content. As an example, the process can include (i) retrieving, using the communications platform, data regarding one or more second logical structures implemented using a second communications platform different from the communications platform, and (ii) generating, using the communications platform, one or more third logical structures based on the data regarding the one or more second logical structures. Retrieving the data regarding the one or more second logical structures can include retrieving contents of the one or more second logical structures. Generating the one or more third logical structures can include presenting the contents of the one or more second logical structures in the one or more third logical structures. The contents of the one or more second logical structures can be retrieved using an automated application executed on the second communications platform and having access to the one or more second logical structures (e.g., an automated application or "bot" executed using the second communications platform).

In some implementations, a logical structure can be shared with members associated with other logical structures. For instance, a user can create a home and a room nested within the home, and share the room with another home. Users associated with either home can access the shared room. As an example, the process can include (i) receiving, from a third user using the communications platform, second content to be shared within a second logical structure of the plurality of logical structures, where the second logical structure is nested within the first logical structure, (ii) determining, using the communications platform, one or more fourth users associated with the second logical structure, where the one or more fourth users are not associated with the first logical structure, and (iii) transmitting, using the communications platform, contents of the second logical structure including the second content to the one or more fourth users. Further, in some implementations, the first logical structure can be nested within a second logical structure. The process can further include displaying a first indication of the first logical structure in a directory listing associated with the second logical structure, and displaying a second indication of the first logical structure in a directory listing associated with a third logical structure different from the second logical structure. In some implementations, the process can include receiving, from a third user, a selection of the first indication or the second indication, and responsive to receiving the selection of the first indication or the second indication, transmitting the contends of the first logical structure including the first content to the third user.

In some implementations, users are provided with a personal and customizable directory listing of a logical structure (e.g., listing each of the logical sub-structures nested within the logical structure). The user can customize his directory listing by selectively hiding or unhiding logical sub-structures in his directory listing (e.g., hide rooms that they are not interested in and show rooms that they are interested in). This enables a user to organize his directory listing, such that he can view and select certain logical sub-structures more conveniently. The user's directory listing is personal to the user, and does not affect other user's ability to hide or unhide logical sub-structures as they see fit on their own respective directory listings.

Example Computer System:

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the server system 102, the platform 150, and the client devices 104*a*-104*c* can be implemented using digital electronic circuitry, or in computer software, firmware, or hardware, or in combinations of one or more of them. In another example, the processes 1400, 1450, 1500, 1520, and/or 2000 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 21:
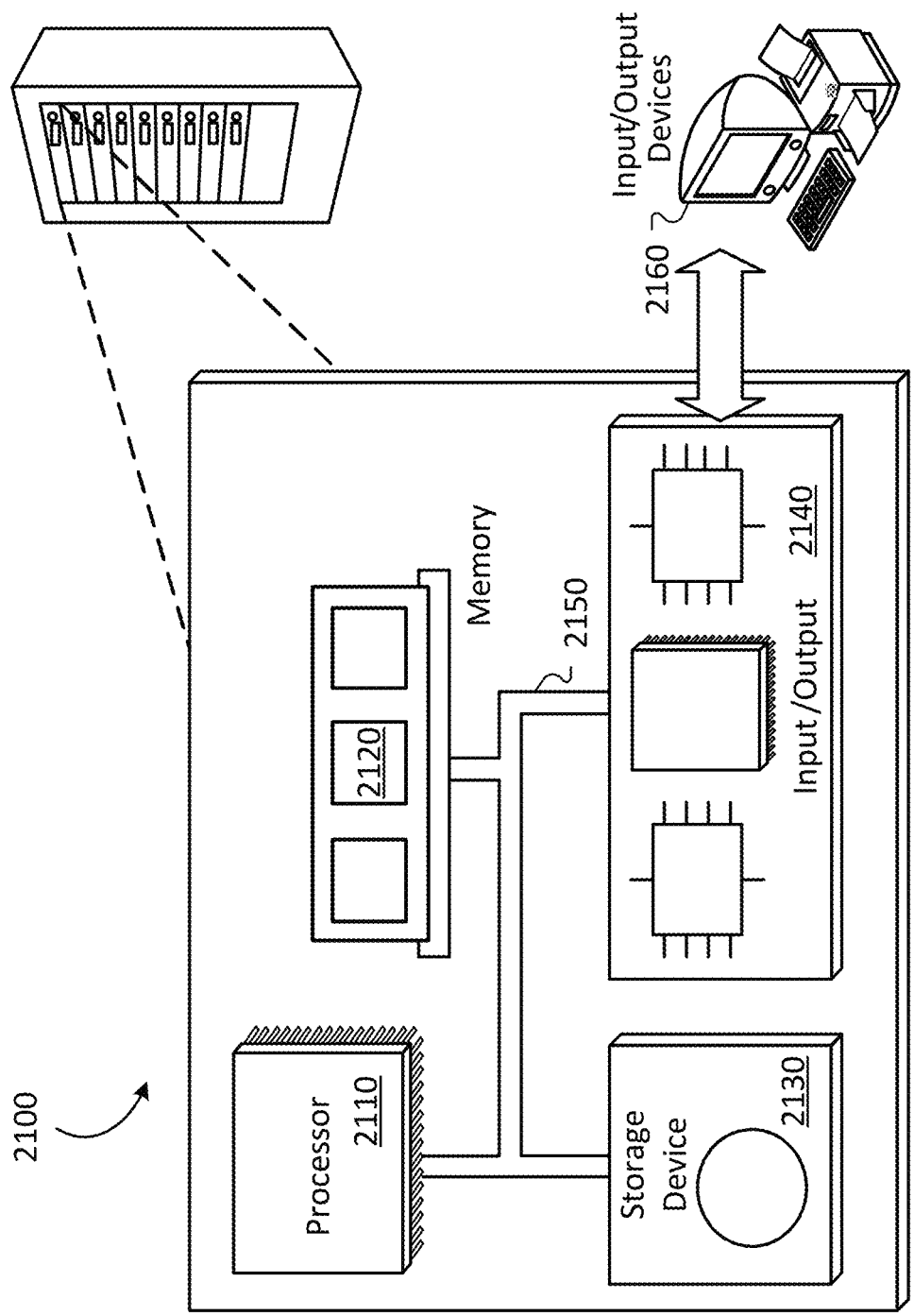
FIG. 21 is a diagram of an example computer system.

FIG. 21 shows an example computer system 2100 that includes a processor 2110, a memory 2120, a storage device 2130 and an input/output device 2140. Each of the components 2110, 2120, 2130 and 2140 can be interconnected, for example, by a system bus 2150. The processor 2110 is capable of processing instructions for execution within the system 2100. In some implementations, the processor 2110 is a single-threaded processor, a multi-threaded processor, or another type of processor. The processor 2110 is capable of processing instructions stored in the memory 2120 or on the storage device 2130. The memory 2120 and the storage device 2130 can store information within the system 2100.

The input/output device 2140 provides input/output operations for the system 2100. In some implementations, the input/output device 2140 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 2160. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of implementations have been described. Nevertheless, it will be understood that various modifications may be made without departing from the spirit and scope of the invention. Accordingly, other implementations are within the scope of the following claims.

What is claimed is:

1. A method comprising:
generating, using a communications platform, a plurality of logical structures, wherein each of the logical structures provides a different respective shared collaborative environment for exchanging content in real time among users of that logical structure;
receiving, from a first user using the communications platform, first content to be shared within a first logical structure of the plurality of logical structures;
determining, using the communications platform, that one or more second users are permitted to access the first logical structure;
transmitting, using the communications platform, contents of the first logical structure including the first content to the one or more second users;
receiving, from a third user using the communications platform, second content to be shared within a second logical structure of the plurality of logical structures, wherein the second logical structure is nested within the first logical structure;
determining, using the communications platform, that one or more fourth users are permitted to access the second logical structure, wherein the one or more fourth users are a subset of the one or more second users; and
transmitting, using the communications platform, contents of the second logical structure including the second content to the one or more fourth users.

2. The method of claim 1, wherein determining that the one or more second users are permitted to access the first logical structure comprises:
receiving, from each of the one or more second users, a request to access the first logical structure;
determining, for each of the one or more second users, whether the one or more second users satisfies one or more access criteria associated with the first logical structure; and
enabling access to the first logical structure by each of the one or more second users that satisfies the one or more access criteria.

3. The method of claim 2, wherein the one or more access criteria comprises an age requirement.

4. The method of claim 2, wherein the one or more access criteria comprises a geographical location requirement.

5. The method of claim 2, wherein the one or more access criteria comprises a payment requirement.

6. The method of claim 2, wherein the one or more access criteria comprises a requirement that the one or more second users provides a particular answer in response to a prompt.

7. The method of claim 1, wherein the first content includes at least one of a chat message, a post, audio, or video.

8. The method of claim 1, wherein the first content includes a combination of a chat message, a post, audio, and video.

9. The method of claim 1, wherein the first content includes an event invitation.

10. The method of claim 1, wherein the first content includes a poll or questionnaire.

11. The method of claim 1, wherein the first content includes an indication of a geographical location.

12. The method of claim 1, wherein the first content includes an image to be overlaid over other content of the first logical structure.

13. The method of claim 1, wherein the first content is selected using a graphical user interface.

14. The method of claim 1, wherein generating the plurality of logical structures comprises:
receiving, from the first user, template data indicating a first type of logical structure, the template data including one or more parameters associated with the first type of logical structure;
generating the first type of logical structure based on the template data;
receiving, from the third user, a request to generate a second logical structure according to the first type; and
generating the second logical structure using the template data.

15. The method of claim 14, wherein the one or more parameters comprises an indication of a type of content that can be shared within the first type of logical structure.

16. The method of claim 14, wherein the one or more parameters comprises an indication of a visual appearance of the first type of logical structure.

17. The method of claim 1, wherein the first content comprises an indication of a first product or service for sale.

18. The method of claim 17, wherein the indication of the first product or service for sale is generated, at least in part, by:
determining a plurality of products or services for sale in the plurality of logical structures;
presenting the plurality of products or services for sale to the first user;
receiving, from the first user, a selection of the first product or service for sale among the plurality of products or services for sale; and
generating the indication of the first product or service for sale based on the selection.

19. The method of claim 17, wherein the plurality of products or services for sale are determined, at least in part, using an electronic commerce platform different from the communications platform.

20. The method of claim 1, further comprising modifying the first content based on one or more rules.

21. The method of claim 20, wherein the one or more rules comprises an indication of one or more words to be removed from the first content.

22. The method of claim 1, further comprising:
receiving, from the first user, a command to disassociate a particular second user among the one or more second users from the first logical structure; and
responsive to receiving the command, preventing transmission of the contents of the first logical structure to the particular second user.

23. The method of claim 1, further comprising:
receiving, from the first user, a command to enable a particular second user among the one or more second users to share content within the first logical structure; and
responsive to receiving the command, enabling the particular second user to share the content within the first logical structure.

24. The method of claim 1, further comprising:
presenting, to an additional user, at least some of the logical structures among the plurality of logical structures;
receiving, from the additional user, a selection of one of the logical structures presented to the additional user;
associating the additional user with the logical structure selected by the additional user; and
transmitting the contents of the first logical structure including the first content to the additional user.

25. The method of claim 24, wherein presenting the at least some of the logical structures among the plurality of logical structures comprises:
determining, for each of the logical structures, an estimated interest in the logical structure by the additional user; and
presenting the at least some of the logical structures among the plurality of logical structures according to the estimated interest.

26. The method of claim 25, wherein the estimated interest in the logical structure is determined based on the additional user's association with one or more other logical structures among the plurality of logical structures.

27. The method of claim 1, further comprising:
receiving, from the first user, third content to be shared with a fifth user independent from the plurality of logical structures; and
transmitting the third content from the first user to the fifth user independent from the plurality of logical structures.

28. The method of claim 1, further comprising:
enabling each user of the communications platform to access the contents of the first logical structure.

29. The method of claim 1, further comprising:
indicating, to one or more fifth users not associated with the first logical structure, an existence of the first logical structure; and
preventing the one or more fifth users from accessing the contents of the first logical structure.

30. The method of claim 1, further comprising:
not indicating, to one or more fifth users not associated with the first logical structure, an existence of the first logical structure; and
preventing the one or more fifth users from accessing the contents of the first logical structure.

31. The method of claim 1, further comprising:
receiving, from the first user, a request to transfer ownership of the first logical structure to a fifth user;
responsive to receive the request, transmitting a notification to the fifth user regarding the request;
receiving, from the fifth user, an indication that the fifth user consents to the request; and
responsive to receiving the indication that the fifth user consents to the request, transferring ownership of the first logical structure to the fifth user.

32. The method of claim 1, further comprising:
receiving, from the first user, a request to transfer ownership of the first logical structure to a fifth user upon death or incapacity of the first user;
determining that the first user has died or has become incapacitated; and
responsive to determining that the first user has died or has become incapacitated, transferring ownership of the first logical structure to the fifth user.

33. The method of claim 1, further comprising:
retrieving, using the communications platform, data regarding one or more third logical structures implemented using a second communications platform different from the communications platform; and
generating, using the communications platform, one or more fourth logical structures based on the data regarding the one or more third logical structures.

34. The method of claim 33, wherein retrieving the data regarding the one or more third logical structures comprises retrieving contents of the one or more third logical structures, and
wherein generating the one or more fourth logical structures comprises presenting the retrieved contents of the one or more third logical structures in the one or more fourth logical structures.

35. The method of claim 34, wherein the retrieved contents of the one or more third logical structures are retrieved using an automated application executed on the second communications platform and having access to the one or more third logical structures.

36. The method of claim 1, further comprising:
determining, using the communications platform, that one or more fifth users are permitted to access the second logical structure and are not permitted to access the first logical structure; and transmitting, using the communications platform, the contents of the second logical structure including the second content to the one or more fifth users.

37. The method of claim 1, wherein the method further comprises:
displaying a first indication of the first logical structure in a directory listing associated with the second logical structure; and
displaying a second indication of the first logical structure in a directory listing associated with a third logical structure different from the second logical structure.

38. The method of claim 37, further comprising:
receiving, from a fifth user, a selection of the first indication or the second indication, and
responsive to receiving the selection of the first indication or the second indication, transmitting the contents of the first logical structure including the first content to the fifth user.

\* \* \* \* \*